United States Patent
Oyman et al.

(10) Patent No.: US 11,140,581 B2
(45) Date of Patent: Oct. 5, 2021

(54) SESSION DESCRIPTION PROTOCOL MECHANISMS FOR SIGNALING RADIO ACCESS NETWORK CAPABILITIES IN MULTIMEDIA TELEPHONY SESSIONS

(71) Applicant: Intel Corporation, Santa Clara, CA (US)

(72) Inventors: Ozgur Oyman, Palo Alto, CA (US); Thomas Luetzenkirchen, Taufkirchen BY (DE); Fabrice Plante, Hillsboro, OR (US); Usharani Ayyalasomayajula, Bangalore (IN); Ganesh Vijayan, Bangalore (IN); Jerome Parron, Fuerth BY (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/408,360

(22) Filed: May 9, 2019

(65) Prior Publication Data
US 2019/0373511 A1     Dec. 5, 2019

Related U.S. Application Data

(63) Continuation of application No. 16/353,783, filed on Mar. 14, 2019, now abandoned.
(Continued)

(51) Int. Cl.
*H04W 28/20*     (2009.01)
*H04W 8/24*     (2009.01)
(Continued)

(52) U.S. Cl.
CPC .......... *H04W 28/20* (2013.01); *H04L 5/0082* (2013.01); *H04L 65/1016* (2013.01); *H04W 8/24* (2013.01);
(Continued)

(58) Field of Classification Search
None
See application file for complete search history.

(56) References Cited

U.S. PATENT DOCUMENTS 9,094,256 B1 * 7/2015 Ress ..................... H04L 65/80
2006/0251093 A1 * 11/2006 Curcio ............. H04L 29/06027
370/412

(Continued)

OTHER PUBLICATIONS

3GPP TR 26.910 (Study on Media Handling Aspects of RAN Delay Budget Reporting in MTSI) (Year: 2018).*
(Continued)

*Primary Examiner* — Christopher T Wyllie
(74) *Attorney, Agent, or Firm* — Schwabe, Williamson & Wyatt, P.C.

(57) ABSTRACT

Systems, apparatuses, methods, and computer-readable media are provided for negotiating Radio Access Network (RAN)-level capabilities toward improving end-to-end quality of Internet Protocol Multimedia Subsystem (IMS) communication sessions, such as Voice over Long-Term Evolution (VoLTE) calls. Disclosed embodiments include Session Description Protocol-based mechanisms to signal the RAN-level capabilities. The RAN-level capabilities may include, for example, delay budget information signaling, Transmission Time Interval bundling, RAN frame aggregation, RAN-assisted codec adaptation or access network bitrate recommendation, and/or other like capabilities. Other embodiments may be described and/or claimed.

19 Claims, 13 Drawing Sheets

Related U.S. Application Data

(60) Provisional application No. 62/643,541, filed on Mar. 15, 2018.

(51) Int. Cl.
| | |
|---|---|
| *H04W 80/02* | (2009.01) |
| *H04L 5/00* | (2006.01) |
| *H04W 76/27* | (2018.01) |
| *H04W 76/28* | (2018.01) |
| *H04W 80/10* | (2009.01) |
| *H04L 29/06* | (2006.01) |

(52) U.S. Cl.
CPC ........... *H04W 76/27* (2018.02); *H04W 76/28* (2018.02); *H04W 80/02* (2013.01); *H04W 80/10* (2013.01)

(56) References Cited

U.S. PATENT DOCUMENTS

| | | | | |
|---|---|---|---|---|
| 2008/0013528 | A1* | 1/2008 | Miller | H04W 28/22 370/352 |
| 2008/0146208 | A1* | 6/2008 | Ejzak | H04L 65/1043 455/416 |
| 2010/0134590 | A1* | 6/2010 | Lindstrom | H04L 69/24 348/14.11 |
| 2010/0135368 | A1* | 6/2010 | Mehta | H04L 27/3881 375/219 |
| 2013/0073295 | A1* | 3/2013 | Johnson | H04M 1/6025 704/500 |
| 2014/0086123 | A1* | 3/2014 | Deivasigamani | H04W 52/0225 370/311 |
| 2014/0341192 | A1* | 11/2014 | Venkob | H04L 1/00 370/336 |
| 2015/0230179 | A1* | 8/2015 | Gupta | H04W 24/10 370/311 |
| 2016/0100099 | A1* | 4/2016 | Oyman | H04L 65/608 348/14.08 |
| 2016/0285720 | A1* | 9/2016 | Maenpaa | H04L 67/10 |
| 2016/0353316 | A1* | 12/2016 | Boettger | H04W 36/0066 |
| 2018/0077001 | A1* | 3/2018 | Noldus | H04L 29/06278 |
| 2018/0102871 | A1* | 4/2018 | Wu | H04W 36/00 |
| 2018/0352092 | A1* | 12/2018 | Rajendran | H04L 65/80 |
| 2019/0007464 | A1* | 1/2019 | Hori | H04W 80/10 |
| 2019/0045578 | A1* | 2/2019 | Oyman | H04L 65/607 |
| 2019/0215729 | A1* | 7/2019 | Oyman | H04L 65/80 |
| 2019/0274186 | A1* | 9/2019 | Oyman | H04W 80/10 |
| 2019/0357036 | A1* | 11/2019 | Leung | H04W 88/08 |
| 2019/0373511 | A1* | 12/2019 | Oyman | H04W 76/28 |

OTHER PUBLICATIONS

United States Patent Office—Office Action dated May 1, 2020 from U.S. Appl. No. 16/353,783, 16 pages.

3GPP, "Technical Specification Group Radio Access Network; Evolved Universal Terrestrial Radio Access (E-UTRA); Radio Resource Control (RRC); Protocol specification (Release 15)," 3GPP TS 36.331 V15.0.1 (Jan. 2018), Lte Advanced Pro, 105 pages.
3GPP, "Technical Specification Group Services and System Aspects; IP Multimedia Subsystem (IMS); Multimedia Telephony; Media handling and interaction (Release 15)," 3GPP TS 26.114 V15.1.0 (Dec. 2017), 5G, 399 pages.
3GPP, "Technical Specification Group Radio Access Network; Evolved Universal Terrestrial Radio Access (E-UTRA); Medium Access Control (MAC) protocol specification (Release 15)," 3GPP TS 36.321 V15.0.0 (Dec. 2017), Lte Advanced Pro, 109 pages.
3GPP, "Technical Specification Group Radio Access Network; NR; Medium Access Control (MAC) protocol specification (Release 15)," 3GPP TS 38.321 V15.0.0 (Dec. 2017), 5G, 55 pages.
3GPP, "Technical Specification Group Radio Access Network NR Radio Resource Control (RRC) protocol specification (Release 15)," 3GPP TS 38.331 V15.0.0 (Dec. 2017), 5G, 188 pages.
3GPP, "Technical Specification Group Core Network and Terminals; IP multimedia call control protocol based on Session Initiation Protocol (SIP) and Session Description Protocol (SDP); Stage 3 (Release 15)," 3GPP TS 24.229 V15.1.0 (Dec. 2017), 5G, 999 pages.
3GPP, "Technical Specification Group Core Network and Terminals; Messaging service using the IP Multimedia (IM) Core Network (CN) subsystem; Stage 3 (Release 14)," 3GPP TS 24.247 V14.0.0 (Mar. 2017), Lte Advanced Pro, 78 pages.
3GPP, "Technical Specification Group Services and System Aspects; Study on Media Handling Aspects of Conversational Services in 5G Systems (Release 15 )," 3GPP TR 26.919 V0.32.0 (20187-0211), 5G, 19 pages.
3GPP, "Technical Specification Group Services and System Aspects; Mandatory speech CODEC speech processing functions; AMR speech CODEC; General description (Release 14)," 3GPP TS 26.071 V14.0.0 (Mar. 2017), Lte Advanced Pro, 12 pages.
Rosenberg et al., "SIP: Session Initiation Protocol," Network Working Group, Request for Comments: 3261, Obsoletes: 2543, Category: Standards Track, Jun. 2002, 269 pages.
3GPP, "Technical Specification Group Radio Access Network; Evolved Universal Terrestrial Radio Access (E-UTRA) and Evolved Packet Core (EPC); User Equipment (UE) conformance specification; Part 1: Protocol conformance specification elease 15)," 3GPP TS 36.523-1 V15.0.0 (Dec. 2017), Lte Advanced Pro, 6191 pages.
Rosenberg et al., "An Offer/Answer Model with the Session Description Protocol (SDP)," Network Working Group, Request for Comments: 3264, Obsoletes: 2543, Category: Standards Track, Jun. 2002, 25 pages.
Handley et al., "SDP: Session Description Protocol," Network Working Group, Request for Comments: 4566, Obsoletes: 2327, 3266, Category: Standards Track, Jul. 2006, 49 pages.
R. Sparks, "Clarifications for When to Use the name-addr Production in SIP Messages," Internet Engineering Task Force (IETF), Request for Comments: 8217, Updates: 3261, 3325, 3515, 3892, 4508, 5002, 5318, 5360, 5502, Category: Standards Track, ISSN: 2070-1721, Aug. 2017, 6 pages.

* cited by examiner

SESSION DESCRIPTION PROTOCOL MECHANISMS FOR SIGNALING RADIO ACCESS NETWORK CAPABILITIES IN MULTIMEDIA TELEPHONY SESSIONS

RELATED APPLICATIONS

The present application is a continuation of U.S. patent application Ser. No. 16/353,783, filed Mar. 14, 2019, entitled "SESSION DESCRIPTION PROTOCOL MECHANISMS FOR SIGNALING RADIO ACCESS NETWORK CAPABILITIES IN MULTIMEDIA TELEPHONY SESSIONS," which claims priority under 35 U.S.C. § 119 to U.S. Provisional App. No. 62/643,541 filed Mar. 15, 2018, the contents of which are hereby incorporated by reference in their entireties.

FIELD

Various embodiments of the present application generally relate to the field of wireless communications, and in particular, to Multimedia Telephony Service for IMS technologies.

BACKGROUND

MTSI supports conversational speech, video, and text transported over RTP to deliver a user experience equivalent to or better than that of circuit switched conversational services using the same amount of network resources. MTSI defines media handling (e.g., signaling, transport, jitter buffer management, packet-loss handling, and adaptation), as well as interactivity (e.g., adding or dropping media during a call). The focus is to ensure a reliable and interoperable service with a predictable media quality, while allowing for flexibility in the service offerings. MTSI uses SIP, SDP, and SDP capabilities negotiation protocols for media negotiation and configuration. No signaling mechanisms are currently defined to provide e2e coordination between UEs with respect to radio capabilities.

DETAILED DESCRIPTION

Embodiments herein are related to SDP-based mechanisms to signal specific RAN-level capabilities toward improving e2e quality of VoLTE/ViLTE calls. Signaled RAN-level capabilities may include, for example, Delay Budget Reporting, TTI bundling, RAN frame aggregation, RAN-assisted codec adaptation, etc. According to various embodiments, a first UE is operable to perform multimedia telephony with a second UE, wherein the second UE is remote from the first UE. The first UE is configured to receive an SDP offer message from the second UE with an attribute describing radio capabilities of the second UE, and send an SDP answer message to the second UE with an attribute describing the radio capabilities of the first UE. In some embodiments, the attribute describing radio capabilities includes descriptors, configurations, and/or parameters pertaining to specific RF circuitry or modem (or baseband circuitry) capabilities. In some embodiments, the specific RF circuitry or modem (or baseband circuitry) capabilities include one or more of a delay budget reporting capability, a TTI bundling capability, a RAN frame aggregation and RAN-assisted codec adaptation capability, and/or other like capabilities. Other embodiments may be described and/or claimed.

Figure 1:
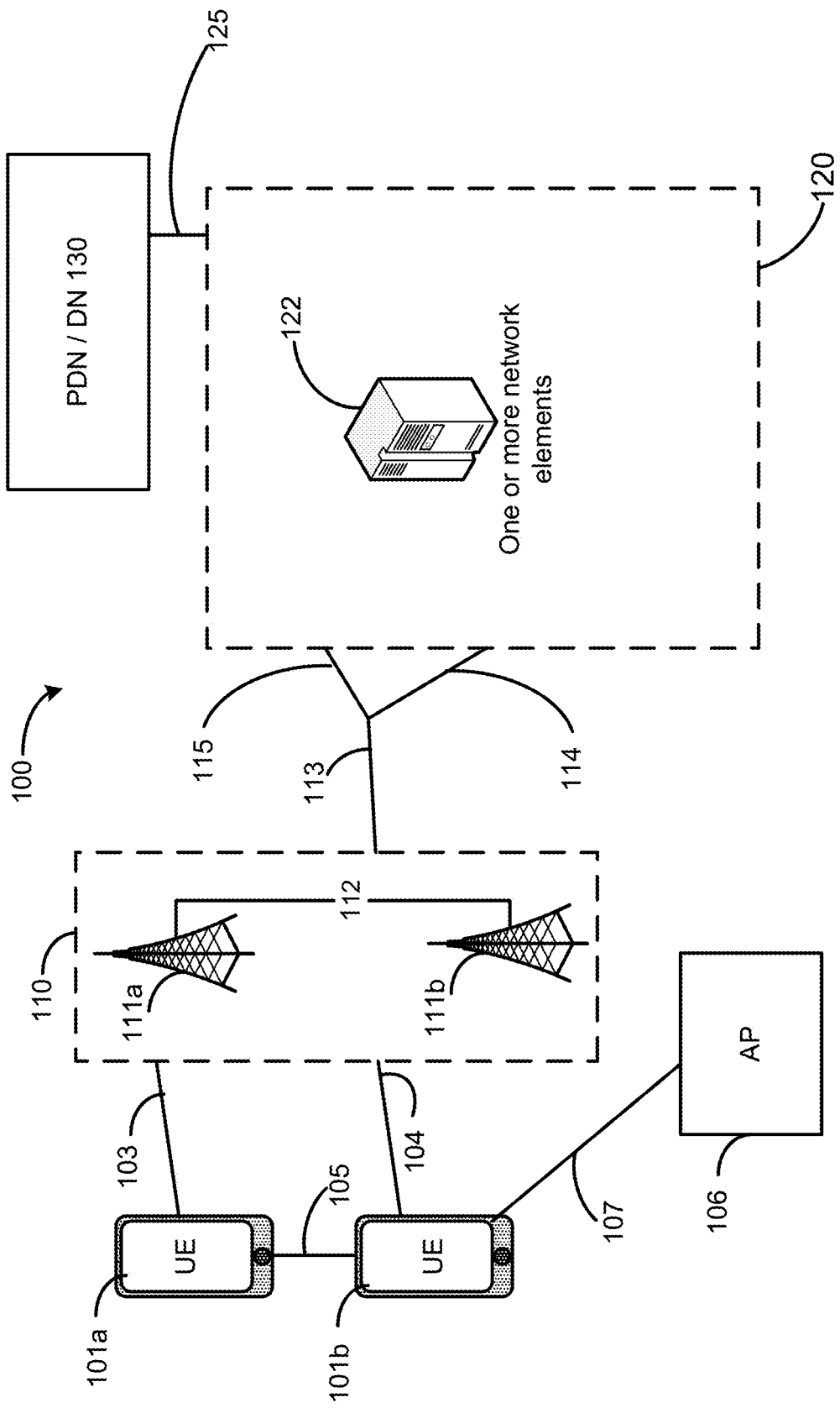
FIG. 1 depicts an architecture of a system of a network in accordance with some embodiments.

Referring now to FIG. 1, in which an example architecture of a system 100 of a network according to various embodiments, is illustrated. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants, pagers, wireless handsets, desktop computers, laptop computers, in-vehicle infotainment, in-car entertainment devices, an Instrument Cluster, head-up display (HUD) devices, onboard diagnostic devices, dashtop mobile equipment, mobile data terminals, Electronic Engine Management System, electronic/engine control units, electronic/engine control modules, embedded systems, microcontrollers, control modules, engine management systems, networked or "smart" appliances, MTC devices, M2M, IoT devices, and/or or the like. As discussed in more detail infra, the UEs 101

(and the RAN nodes 111) incorporate the SDP-based signaling embodiments discussed herein. In these embodiments, the UEs 101 are capable of, inter alia, signaling specific RAN-level capabilities using SDP toward improving e2e quality of VoLTE calls. The RAN-level capabilities may include, for example, delay budget reporting, TTI bundling, RAN frame aggregation, RAN-assisted codec adaptation, and/or the like. These and other embodiments are discussed in more detail infra.

In some embodiments, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, for example, communicatively couple, with an or RAN 110. In embodiments, the RAN 110 may be an NG RAN or a 5G RAN, an E-UTRAN, or a legacy RAN, such as a UTRAN or GERAN. The term "NG RAN" or the like refers to a RAN 110 that operates in an NR or 5G system 100, and the term "E-UTRAN" or the like refers to a RAN 110 that operates in an LTE or 4G system 100. The UEs 101 utilize connections (or channels) 103 and 104, respectively, each of which comprises a physical communications interface or layer.

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a WiFi® router. In this example, the AP 106 is shown to be connected to the Internet without connecting to the core network of the wireless system (described in further detail below). In various embodiments, the UE 101b, RAN 110, and AP 106 may be configured to utilize LWA operation and/or LWIP operation. The LWA operation may involve the UE 101b in RRC_CONNECTED being configured by a RAN node 111a-b to utilize radio resources of LTE and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). The term "NG RAN node" or the like refers to a RAN node 111 that operates in an NR or 5G system 100 (for example, a gNB), and the term "E-UTRAN node" or the like refers to a RAN node 111 that operates in an LTE or 4G system 100 (e.g., an eNB). According to various embodiments, the RAN nodes 111 may be implemented as one or more of a dedicated physical device such as a macrocell base station, and/or a low power base station for providing femtocells, picocells or other like cells having smaller coverage areas, smaller user capacity, or higher bandwidth compared to macrocells.

In some embodiments, all or parts of the RAN nodes 111 may be implemented as one or more software entities running on server computers as part of a virtual network, which may be referred to as a CRAN and/or a vBBUP. In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs (see, e.g., FIG. 6), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC 120 via an NG interface.

In V2X scenarios one or more of the RAN nodes 111 may be or act as RSUs. The term "Road Side Unit" or "RSU" refers to any transportation infrastructure entity used for V2X communications. An RSU may be implemented in or by a suitable RAN node or a stationary (or relatively stationary) UE. In one example, an RSU is a computing device coupled with RF circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, RNC functions such as radio bearer management, uplink and downlink dynamic radio resource management and data packet scheduling, and mobility management. In embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or SL communications), although the scope of the embodiments is not limited in this respect. The OFDM signals can comprise a plurality of orthogonal subcarriers.

In embodiments, the UEs 101 implement or operate a client for MTSI supporting conversational speech (including DTMF), video, and text transported over RTP with the scope to deliver a user experience equivalent to or better than that of Circuit Switched (CS) conversational services using the same amount of network resources. MTSI defines media handling (e.g., signaling, transport, jitter buffer management, packet-loss handling, adaptation, etc.), as well as interactivity (e.g., adding or dropping media during a call). In these embodiments, the UEs 101 may connect to the IMS (e.g., AS 130) using 3GPP access (e.g., via RAN 110 and CN 120) or using non-3GPP access (e.g., via WLAN 106, Bluetooth, DECT/NG DECT).

According to various embodiments, UEs 101 may communicate with one another using VoLTE mechanisms. VoLTE is a standard for high-speed wireless communication, which is based on IMS networks where specific profiles for control and media planes of voice service over an LTE network may be defined. In various embodiments, SIP is used to convey information during a call setup procedure. SIP is an application-layer control protocol for creating, modifying, and terminating sessions (e.g., Internet multimedia conferences, Internet telephone calls, and multimedia distribution using an offer/answer model) that works independently of underlying transport protocols and without dependency on the type of session that is being established. SIP works in concert with various protocols for carrying various forms of real-time multimedia session data such as voice, video, and/or text messages. SIP works in concert with these protocols by enabling Internet endpoints (referred to as "user agents") to discover one another and to agree on a characterization of a session they would like to share. For locating prospective session participants, and for other functions, SIP enables the creation of an infrastructure of network hosts (referred to as "proxy servers") to which user agents can send registrations, invitations to sessions, and other requests.

SIP messages used to create sessions may carry session descriptions that allow participants to agree on a set of compatible media types to be used during the communication session. The session descriptions may be formatted according to SDP, wherein media type and parameter negotiation and media setup is performed with SDP that is carried as payload in SIP messages. SIP employs many aspects of the HTTP request/response model, including reuse of header fields, encoding rules, and status codes of HTTP. Furthermore, a suitable transport layer protocol may be used to convey data before session establishment (e.g., audio and/or video as early media) or during an established session. The transport layer protocol may include, for example, UDP, TCP, RSTP, SCTP, RTP, SRTP, and/or the like for the transmission of media streams (e.g., voice, video). Moreover, the SIP messages may be encrypted using TLS, SRTP, and/or the like. In some embodiments, another encapsulation protocol, such as RTSP, may be used to convey SDP messages. RTSP is an application-level protocol for controlling the delivery of data with real-time properties. RTSP provides an extensible framework to enable controlled, on-demand delivery of real-time data, such as audio and video. An RTSP client and server negotiate an appropriate set of parameters for media delivery, partially using SDP syntax to describe those parameters.

SDP is used to set up a call and create a session, such as a real-time text, voice, or video call. The purpose of SDP is to convey information about media streams in multimedia sessions to allow the recipients of a session description to participate in the session. SDP provides a means to communicate the existence of a session, and a means to convey sufficient information to enable joining and participating in the session. Media streams can be many-to-many, and sessions need not be continually active. An SDP session description includes the following: session name and purpose; time(s) the session is active; the media comprising the session; and information needed to receive those media (e.g., addresses, ports, formats, etc.). The session description may also include information about the bandwidth to be used by the session, and contact information for the person responsible for the session.

During the creation of the session, two endpoints (e.g., UE 101a and UE 101b) that are supposed to later on exchange media packets, send each other SDP offer messages and answer messages so that the two endpoints exchange respective capability information. For example, a sender (e.g., UE 101a) may want to understand what kind of decoders the receiver (e.g., UE 101b) can support, what kind of codecs the receiver can support, and so forth. The sender and the receiver need to agree on the parameters to be used during the session, such as the codecs, protocols, payload formats, and other like parameters related to the delivery of content. And on top of it our proposal here is to. According to various embodiments, various radio capabilities of the UEs 101 may also be indicated during the SDP offer/answer exchanges.

The offer/answer exchange of session descriptions assumes the existence of a higher layer protocol (e.g., SIP), which is capable of exchanging SDP for the purposes of session establishment between agents. SDP protocol operation begins when one agent (e.g., UE 101a) sends an initial offer to another agent (e.g., UE 101b). An agent is the protocol implementation involved in the offer/answer exchange, and there are at least two agents involved in an offer/answer exchange. An offer is an SDP message sent by an offerer, and an offerer is an agent that generates a session description in order to create or modify a session. An offer is an initial offer if it is outside of any context that may have already been established through the higher layer protocol. It is assumed that the higher layer protocol provides maintenance of some kind of context which allows the various SDP exchanges to be associated together.

The agent receiving the offer may generate an answer, or the agent may reject the offer. An answer is an SDP message sent by an answerer in response to an offer, and an answerer is an agent which receives a session description from another agent describing aspects of desired media communication, and then responds to that with its own session description. The means for rejecting an offer are dependent on the higher layer protocol. The offer/answer exchange is atomic in that if the answer is rejected, the session reverts to the state prior to the offer, which may be absence of a session. At any time, either agent may generate a new offer that updates the session. However, the agents may not generate a new offer if it has received an offer to which it has not yet answered or rejected. Furthermore, an agent may not generate a new offer if the agent has generated a prior offer for which it has not yet received an answer or a rejection. If an agent receives an offer after having sent one, but before receiving an answer to it, this is considered a glare condition. The term "glare" was originally used in circuit switched telecommunications networks to describe the condition where two switches both attempt to seize the same available circuit on the same trunk at the same time. For purposes of the present disclosure, "glare" may mean that both agents have attempted to send an updated offer at the same time.

For example, an originating UE 101*a* may generate and send an SIP INVITE request to be delivered to a terminating UE 101*b*. The INVITE request message may include an SDP offer, at least one media description, and one or more radio capabilities of the UE 101*a*. The SDP offer may reflect the capabilities and user preferences of the UE 101*a* for the session. In this example, after the INVITE message is conveyed to the terminating UE 101*b*, a response message including response code 180 may be conveyed to the originating UE 101*b*. The response code 180 may indicate that the destination user agent (e.g., terminating UE 101*b*) received the INVITE, and is alerting the user of the terminating UE 101*b* of the call/session. While the call/session is in a ringing state, early media may be conveyed between the two UEs 101 using a suitable mechanism, such encoding media data in RTP packets and conveying those RTP packets according to RTP. Response messages may be sent by a user agent server indicating a result of a received request. Several classes of responses are recognized, determined by the numerical range of result codes. For example, the 200 response code may indicate a successful completion of the request and/or may indicate that a call/session has been established in response to the INVITE message. The SIP and/or SDP messages may include or indicate other information than that described previously such as, for example, user location which is a determination of the end system to be used for communication, and user availability: determination of the willingness of the called party to engage in communications.

An SDP session description itself is entirely textual, and includes a number of lines of text in the form of <type>=<value>. In general, <value> is either a number of fields delimited by a single space character or a free format string, and is case-significant unless a specific field defines otherwise. An SDP session description comprises a session level section followed by zero or more media level sections. The session level part starts with a "v=" line and continues to the first media level section. Each media-level section starts with an "m=" line and continues to the next media-level section or end of the whole session description. Generally, session level values are the default for all media unless overridden by an equivalent media-level value. Example SDP session description parameters are shown by table 1.

TABLE 1

SDP Session Descriptions

| Session level description | |
|---|---|
| v=(protocol version) | Specifies the version of Session Description Protocol |
| o=<username><sess-id><sess-version><nettype><addrtype><unicast-address> | Details about the originator and identification of the session.<br><username> - user login.<br><sess-id> - numeric string used as unique identifier for the session<br><sess-version> - numeric string used as version number for this session description<br><nettype> - Text string, specifying the network type, e.g., IN for internet<br><addrtype> - Text string specifying the type of the address of originator E.g. IP4 or IP6<br><unicast-address> - The address of the machine from where the session is originating, which can be both FQDN or IP address. |
| s=<session name> | Only one session name per session description can be specified. It must not be empty; therefore if no name is assigned to the session, a single empty space should be used as session name |
| i=< Session information> | Only one session-level "i" field can be specified in the Session description. The "i" filed can be used in session or media description. It is primarily intended for labeling media streams when used in media description section. It can be a human readable description |

TABLE 1-continued

| SDP Session Descriptions | |
|---|---|
| u=<URI> | The URI (Uniform Resource Identifier) specified in the "u" filed, is a pointer to additional information about the session |
| e=<email address> | Email address of person responsible for conference or session |
| p=<phone number> | Specifies contact information for the person responsible for the conference or session |
| c=<connection information>; c=<nettype> <addrtype> <connection-address> | Connection information can be included in Session description or in media description. A session description MUST contain either at least one "c=" field in each media description or a single "c=" field at the session level.<br>    <nettype> A text string describing the network type, e.g., IN for internet.<br>    <addrype> A text string describing the type of the address used in connection-address; E.g., IP4 or IP6.<br>    <connection-address> A Multicast IP address is specified including TTL, e.g., 224.2.36.42/127 |
| b=<bwtype>:<bandwidth> | Bandwidth field can be used both in the session description, specifying the total bandwidth of the whole session and can also be used in media description, per media session.<br>    <bwtype> Bandwidth type can be CT; conference total upper limit of bandwidth to be used, or AS; application specific, therefore it will be the application's concept of maximum bandwidth.<br>    <bandwidth> is interpreted as kilobits per second by default. |
| z=<adjustment time> <offset> <adjustment time> <offset> | To schedule a repeated session that specifies a change from daylight saving time to standard time or vice versa, it is necessary to specify difference from the originating time |
| k=<method>:<encryption key> | If channel is secure and trusted, SDP can be used to convey encryption keys. A key can be specified for the whole session or for each media description. |
| a=<attribute>:<value> | Zero or more session attribute lines. Attributes may be defined at "session-level" or at "media-level" or both. Session level attributes are used to advertise additional information that applies to conference as a whole. Media level attributes are specific to the media, i.e. advertising information about the media stream |
| Time description | |
| t=<start-time>:<value> | Specifies the start and stop times for a session. If a session is active at irregular intervals, multiple time entries can be used |
| r=<repeat interval> <active duration> <offsets from start-time> | Zero or more repeat times; If a session is to be repeated at fixed intervals, the "r" field is used. By default all values should be specified in seconds, but to make description more compact, time can also be given in different units, such as days, hours or minutes; e.g., r = 6 d 2 h 14 m |
| Media description | |
| m=<media> <port>/<number of ports> <proto> <fmt> | Media name and transport address. This field is used in the media description section to advertise properties of the media stream, such as the port it will be using for transmitting, the protocol used for streaming and the format or codec.<br>    <media> Used to specify media type, generally this can be audio, video, text etc.<br>    <port> The port to which the media stream will be sent. Multiple ports can also be specified if more than 1 port is being used.<br>    <proto> The transport protocol used for streaming, e.g., RTP (real time protocol).<br>    <fmt> The format of the media being sent, e.g., in which codec is the media encoded; e.g., PCMU, GSM etc. |

TABLE 1-continued

SDP Session Descriptions

| | |
|---|---|
| i=<media title> | media title or information field |
| c=<connection information> | connection information - optional if included at session level |
| b=<bwtype>:<bandwidth> | bandwidth information |
| k=<method>:<encryption key> | encryption key |
| a=<attribute>:<value> | zero or more media attribute lines |

Recent voice and video enhancements for LTE include several VoLTE/ViLTE enhancement features including RAN-assisted codec adaptation, VoLTE/ViLTE signaling optimization and VoLTE/ViLTE quality/coverage enhancement. In addition to RAN-assisted codec adaptation, another important feature is VoLTE quality/coverage enhancement functionality. As part of this functionality, a delay budget reporting framework has been specified so that the VoLTE coverage can be effectively enhanced by relaxing the air interface delay budget. This involves the UE 101 using RRC signaling to report DBI. Based on the reported DBI, when the UE 101 is in "good" coverage, the RAN node 111 (e.g., an eNB or gNB) can configure longer DRX for power saving purpose. When a remote UE 101 is in "bad" coverage, the RAN node 111 (e.g., an eNB or gNB) can reduce DRX cycle in order to reduce e2e delay and jitter, and/or configure the remote UE 101 in the "bad" coverage to increase the retransmission times in order to reduce the packet loss.

While RAN-layer delay budget reporting allows UEs 101 to locally adjust their own air interface delay, such a mechanism does not provide coordination between the UEs 101 to manage delay and jitter on an e2e basis. In particular, considering the autonomous operation of the MTSI sender and MTSI receiver (as discussed in more detail with respect to FIG. 4), an MTSI receiver's decision to turn cDRX off may be dependent on the remote MTSI sender's ability to leverage the available delay budget to further improve the reliability of its transmissions. As such, it would be desirable for the UEs 101 to exchange information about specific RAN capabilities that would be relevant in influencing the remote UE's 101 adaptation and impact the e2e quality of the VoLTE call. Such RAN capabilities may include RAN delay budget reporting, TTI bundling, HARQ support and RAN-assisted codec adaptation or ANBR, and/or other like RAN capabilities.

Embodiments herein provide mechanisms to enable SDP-based methods to signal specific RAN-level capabilities toward improving e2e quality of VoLTE calls. Signaled RAN-level capabilities may include Delay Budget Reporting, TTI bundling, RAN frame aggregation, RAN-assisted codec adaptation or ANBR, and the like. In various embodiments, a new SDP attribute 'RANCapabilities' is defined, which includes dedicated parameters that allow UEs 101 to indicate support for specific RAN capabilities. The RAN-Capabilities may include individual parameters that correspond to support of each of RAN delay budget reporting, TTI bundling, RAN frame aggregation, RAN-assisted codec adaptation or ANBR, and/or the like. These aspects are discussed in more detail with respect to FIG. 5.

With respect to ANBR, it has been observed that the ANBR procedures, in the absence of e2e coordination, may suffer from unfavorable consequences such as relatively high PLR and poor quality. Enabling such e2e coordination may be useful for a UE 101 to learn the ANBR capabilities of its remote UE 101 and may accordingly determine the most suitable media adaptation on its end, for example, in response to ANBR information received from its local RAN node 111 (e.g., an eNB and/or gNB). Moreover, as also observed in 3GPP TR 26.919, such signaling can allow the PCF/PCRF when setting GBR<MBR bearers. Furthermore, from a conformance point of view, the LTE_VoLTE_ViLTE_enh test case included in 3GPP TS 36.523-1 assumes that if a UE 101 is capable of receiving ANBR information then it is also capable of using this ANBR information as an adaptation trigger. Such a conformance point is currently not supported by the existing media handling requirements on ANBR in 3GPP TS 26.114, where ANBR is an optional/recommended feature, for example, the UE 101 is free to ignore ANBR information as an adaptation trigger. The present disclosure introduces SDP-based indications of ANBR-capabilities. In embodiments, if a UE 101 signals the ANBR SDP capability, then the UE 101 is capable of receiving ANBR information from its access network and its MTSI client is capable of ANBR as defined in clause 10.7 of 3GPP TS 26.144 v16.0.0 (2018-12).

RAN-assisted codec adaptation or ANBR functionality, as defined in 3GPP TS 26.114, 3GPP TS 36.321, and 3GPP TS 38.321 provides a means for the RAN node 111 (e.g., an eNB or gNB) to send a codec adaptation indication with recommended bit rate to assist the UE 101 to select or adapt to a codec rate for voice or video. The RAN-assisted codec adaptation mechanism supports the uplink/downlink bit rate increase or decrease. For a bearer associated with configuration of MBR greater than GBR, the recommended uplink/downlink bit rate is within boundaries set by the MBR and GBR of the concerned bearer. For uplink or downlink bit rate adaptation, the RAN node 111 may send a recommended bit rate to the UE 101 to inform the UE 101 on the currently recommended transport bit rate on the local uplink or downlink, which the UE 101 may use in combination with other information to adapt the bit rate. For example, the UE 101*a* may send a bit rate request to the peer UE 101*b* via application layer messages as specified in 3GPP TS 26.114, which the peer UE 101*b* may use in combination with other information to adapt the codec bit rate. The recommended bit rate is in kbps at the physical layer at the time when the decision is made. The recommended bit rate for UL and DL is conveyed as a MAC CE from the RAN node 111 to the UE 101. Based on the recommended bit rate from the RAN node 111, a UE 101 may initiate an e2e bit rate adaptation with its peer (e.g., another UE 101 or MGW). The UE 101 may also send a query message to its local RAN node 111 to check if a bit rate recommended by its peer can be provided by the RAN node 111. The UE 101 is not expected to go beyond the recommended bit rate from the RAN node 111.

According to various embodiments, a session description may include a media-level SDP attribute to indicate support for ANBR. For example, the media-level SDP attribute may be "anbr." Use of ANBR with dynamic bitrate adaptation is described in 3GPP TS 26.144 v16.0.0 (2018-12) clause 10.7.3, and related adaptation of sent and received media is described in 3GPP TS 26.144 v16.0.0 (2018-12) clauses 10.7.3.2 and 10.7.3.3, respectively. At the radio signaling level, ANBR signaling capability, also known as RAN-assisted codec adaptation as specified in 3GPP TS 36.321 for LTE access and 3GPP TS 38.321 for NR access. The embodiments discussed herein allow for little or no e2e coordination between the UEs 101 on their ANBR-triggered adaptation capabilities.

If an MTSI client in terminal signals the ANBR attribute in the SDP, then the MTSI client in terminal supports ANBR as described in 3GPP TS 26.144 v16.0.0 (2018-12) clause 10.7, including the use of ANBR with dynamic bitrate adaptation as described in 3GPP TS 26.144 v16.0.0 (2018-12) clause 10.7.3. An MTSI client in terminal is an MTSI client that is implemented in a terminal or UE 101, and an MTSI client is a function in a terminal (or UE 101) or in a network entity (e.g., a MRFP) that supports MTSI. An MTSI client capable of supporting multiple streams may be referred to as an "MSMTSI client." If the MTSI client in terminal signals the ANBR attribute in the SDP, then its UE 101 is capable of RAN-assisted codec adaptation specified in 3GPP TS 36.321 for LTE access and/or 3GPP TS 38.321 for NR access. For LTE access, inclusion of "anbr" in the SDP indicates whether the UE 101 is able to query and receive ANBR information (for both downlink and uplink ANBR) from its eNB. Likewise, for NR access inclusion of this attribute indicates whether the UE 101 is able to query and receive ANBR information. In various embodiments, the "a=anbr" attribute may only be used on media level.

Informing the remote MTSI client via the SDP about the ANBR support using the "anbr" attribute helps the remote MTSI client to determine the most suitable media adaptation on its end, this is especially valid if the remote MTSI client itself is also capable of performing ANBR-triggered adaptation, e.g., in response to ANBR information received from its local RAN node 111 (e.g., an eNB or gNB). As an example, for ANBR-triggered rate up-switching, an MTSI client may adapt its sent bitrate and also perform CMR/RTCP-APP/TMMBR/TMMBN signaling more responsively based on the ANBR information it receives from its local RAN node 111, if it knows that the remote MTSI client also supports ANBR. In the absence of the knowledge of the ANBR capabilities of the remote UE 101, an MTSI client may not have dynamic knowledge on the feasibility of the new bitrate based on ANBR over the access network of the remote UE 101, and this may not be desirable especially in a rate up-switching scenario. Furthermore, signaling of ANBR capabilities in the SDP via "a=anbr" can also be useful for the PCF/PCRF when setting GBR<MBR bearers. An example use of the "a=anbr" attribute relative to a media line is as follows: a=anbr. The IANA registration information for the "a=anbr" SDP attribute is provided in table 2.

TABLE 2

Contact name, email address, and telephone number:
  3GPP Specifications Manager
  3gppContact@etsi.org
  +33 (0)492944200
Attribute Name (as it will appear in SDP)
  anbr
Long-form Attribute Name in English:
  3GPP access network bitrate recommendation (ANBR) support attribute
Type of Attribute
  Media level
Is Attribute Value subject to the Charset Attribute?
  This Attribute is not dependent on charset.

TABLE 2-continued

Purpose of the attribute:
  This attribute is used to indicate the UE's ability to use ANBR as an adaptation trigger and also its ability to receive ANBR information from the access network.
Appropriate Attribute Values for this Attribute:
  No values. See clause 6.2.X for detailed usage.

Referring back to FIG. 1, the RAN nodes 111 are configured to communicate with one another via interface 112. In embodiments where the system 100 is an LTE system (e.g., when CN 120 is an EPC 120), the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2-U and an X2-C. The X2-U may provide flow control mechanisms for user data packets transferred over the X2 interface, and may be used to communicate information about the delivery of user data between eNBs. For example, the X2-U may provide specific sequence number information for user data transferred from a master eNB (MeNB) to an secondary eNB (SeNB); information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system (e.g., when CN 120 is an 5GC 120), the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn-U interface and an Xn-C interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a CM-CONNECTED mode including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on IP transport layer, and a GTP-U layer on top of a UDP and/or IP layer(s) to carry user plane PDUs. The Xn-C protocol stack may include an application layer signaling protocol (referred to as XnAP) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, CN 120. The CN 120 may comprise one or more network elements 122, which are configured to offer various data and telecommunications services to customers/subscribers (e.g., users of UEs 101) who are connected to the CN 120 via the RAN 110. The CN 120 includes one or more servers 122, which may implement various core network elements or AFs such as those discussed herein. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

In some embodiments, the CN 120 may be an EPC (referred to as "EPC 120"). In these embodiments, the one or more network elements 122 may include or operate one or more an MMEs, SGSNs, S-GWs, P-GWs, HSSs, PCRFs, and/or other like LTE core network elements. Additionally, the RAN 110 (referred to as "E-UTRAN 110" or the like) may be connected with the EPC 120 via an S1 interface 113. In embodiments, the S1 interface 113 may be split into two parts, an S1-U interface 114, which carries traffic data between the RAN nodes 111 and the S-GW, and the S1-MME interface 115, which is a signaling interface between the RAN nodes 111 and MMEs. Additionally, the P-GW within the EPC 120 may route data packets between the EPC 120 and external networks such as a network including a PDN 130 via an IP interface 125. The PDN 130 may be an operator external public, a private PDN (e.g., enterprise network, etc.), or an intra-operator PDN (e.g., for provision of IMS and/or IP-CAN services).

In some embodiments, the CN 120 may be a 5GC (referred to as "5GC 120"). In these embodiments, the network elements 122 may implement, inter alia, an AUSF, AMF, SMF, NEF, PCF, NRF, UDM, AF, UPF, SMSF, N3IWF, NSSF and/or other like NR NFs. Additionally, the RAN 110 (referred to as "5G-RAN 110," "NG-RAN 110," or the like) may be connected with the 5GC 120 via an NG interface 113. In these embodiments, the NG interface 113 may be split into two parts, an NG-U interface 114, which carries traffic data between the RAN nodes 111 and a UPF, and the NG-C interface 115, which is a signaling interface between the RAN nodes 111 and AMFs. Additionally, the UPF within the 5GC 120 may perform packet routing, filtering, inspection, forwarding, etc., between the 5GC 120 and external networks such as a DN 130 via an IP interface 125. The DN 130 may represent one or more data networks, including one or more LADNs, and may be an operator external public, a private PDN (e.g., enterprise network, etc.), or an intra-operator PDN, for example, for provision of IMS and/or IP-CAN services.

The CN 120 is shown to be communicatively coupled to PDN/DN 130 via an IP communications interface 125. The PDN/DN 130 may include one or more application servers, for example, the AS 250a and 250b depicted by FIG. 2. The application server(s) comprise one or more physical and/or virtualized systems for providing functionality (or services) to one or more clients (e.g., UEs 101) over a network. The server(s) within PDN/DN 130 and/or the server(s) 122 may include various computer devices with rack computing architecture component(s), tower computing architecture component(s), blade computing architecture component(s), and/or the like. The server(s) may represent a cluster of servers, a server farm, a cloud computing service, or other grouping or pool of servers, which may be located in one or more datacenters. The server(s) may also be connected to, or otherwise associated with one or more data storage devices (not shown). Moreover, the server(s) may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) offer applications or services that use IP/network resources. As examples, the server(s) may provide traffic management services, cloud analytics, content streaming services, immersive gaming experiences, social networking and/or microblogging services, and/or other like services. In addition, the various services provided by the server(s) 130 may include initiating and controlling software and/or firmware updates for applications or individual components implemented by the UEs 101. The server(s) can also be configured to support one or more communication services (e.g., VoIP sessions, PTT sessions, group communication sessions, social networking services, etc.) for the UEs 101 via the CN 120.

Figure 2:
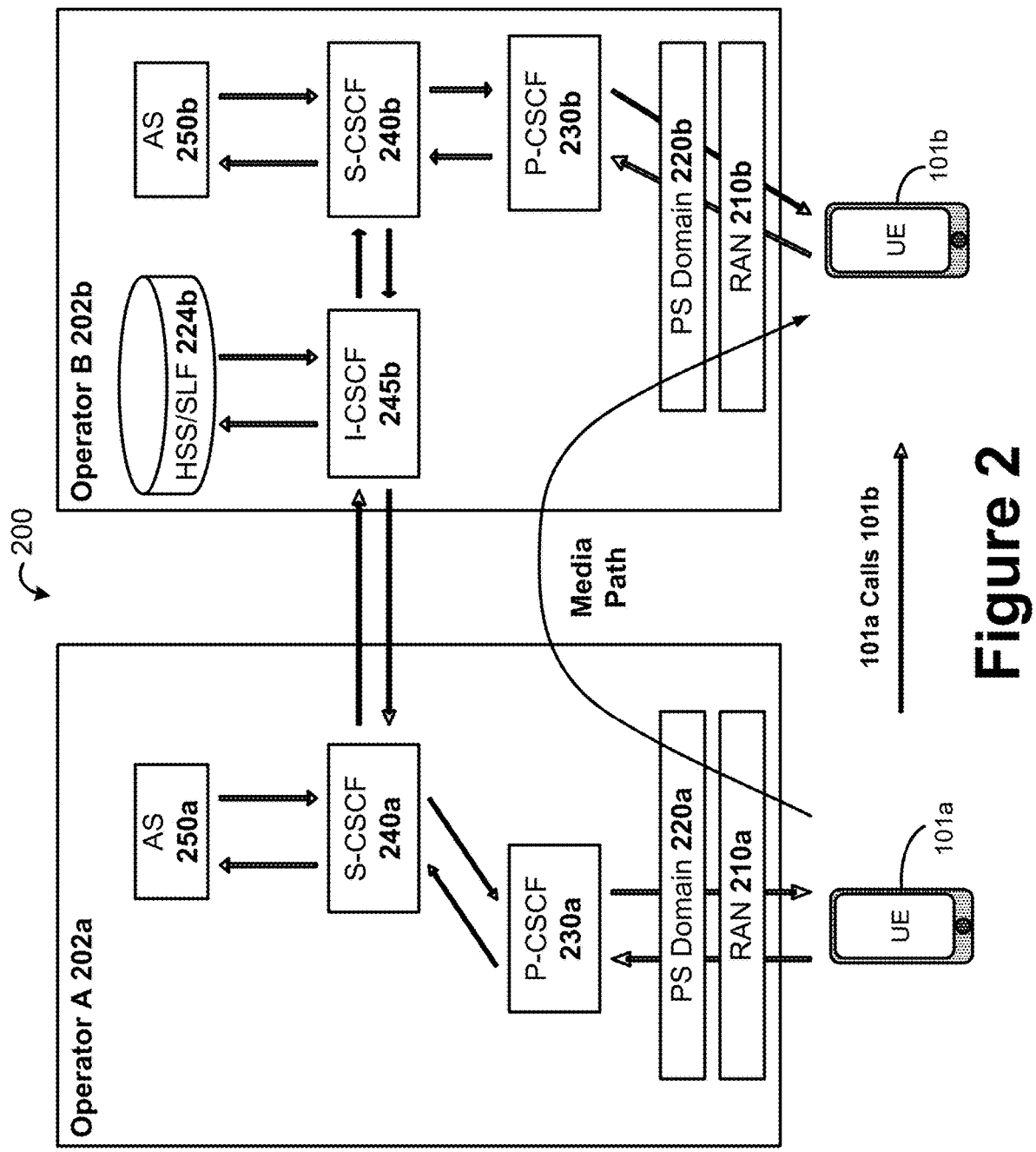
FIG. 2 illustrates an example Multimedia Telephony Service for IMS architecture according to various embodiments.

FIG. 2 illustrates an example Multimedia Telephony Service for IMS (MTSI) architecture 200 according to various embodiments. MTSI (also referred to as "Multimedia Telephony") is an IMS telephony service that builds on IMS capabilities to establish multimedia communications between terminals (e.g., UEs 101a, 101b) within and in-between operator networks (operator networks 202a, 202b). The terminals connect to the IMS using either a fixed access network or a 3GPP access network.

The MTSI architecture 200 includes two operator networks, including an operator A network 202a and an operator B network 202b. In this example, operator A network 202a serves UE 101a and operator B network 202b serves UE 101b. The UEs 101a, 101b may include MTSI clients and/or MSMTSI clients. An MTSI client in terminal is an MTSI client that is implemented in a terminal or UE 101. The term "MTSI client in terminal" is used in the present disclosure when entities such as MRFP, MRFC or media gateways are excluded. An MSMTSI client is a multi-stream capable MTSI client supporting multiple streams. An MTSI client may support multiple streams, even of the same media type, without being an MSMTSI client. Such an MTSI client may, for example, add a second video to an ongoing video telephony session.

Each of the operator networks 202a and 202b include RAN 210 (including RAN 210a in the operator A network 202a and RAN 210b in the operator B network 202b) and a PS domain 220 (including PS domain 220a in the operator A network 202a and PS domain 220b in the operator B network 202b), which may be the same or similar to the RAN 110 and CN 120 of FIG. 1, respectively. Each of the operator networks include various CSCF mechanisms to route control-plane signaling between the UEs 101a and 101b involved in a call, including a P-CSCF 230 (including P-CSCF 230a in the operator A network 202a and P-CSCF 230b in the operator B network 202b) and a S-CSCF 240 (including S-CSCF 240a in the operator A domain and S-CSCF 240b in the operator B domain). Operator B network 202b includes an I-CSCF 245b, however, in other embodiments the operator A network 202a may also include an I-CSCF. In some embodiments, the operator networks 202 may include other elements that are not shown by FIG. 2, such as an MFRP, MRFC, MGW, and/or the like.

The P-CSCF 230 is the first contact point for the UE 101a, 101b within the IMS. An address of the P-CSCF 230 is discovered by UEs using the mechanism described in the clause "Procedures related to Local CSCF Discovery". The P-CSCF 230 behaves like a proxy (also referred to as "SIP proxy servers" or the like) in that the P-CSCF 230 accepts requests and services the requests internally or forwards them to an appropriate entity. In particular, the P-CSCF 230 forwards SIP register requests received from the UE 101 to an entry point determined using the home domain name, as provided by the UE 101, forwards SIP messages received from the UE 101 to an SIP server (e.g., the S-CSCF 240) whose name the P-CSCF 230 has received as a result of the registration procedure, and forwards the SIP request or response to the UE 101. The P-CSCF 230 may behave as a UA wherein the P-CSCF 230 may terminate and independently generate SIP transactions in abnormal conditions. The P-CSCF 230 also performs SIP message compression/decompression.

The S-CSCF 240 handles session states in the network. For registration, the S-CSCF 240 may behave as a registrar (also referred to as an "SIP registration server" or the like) in that the S-CSCF 240 accepts registration requests and makes its information available through a location server (e.g., HSS 224). The S-CSCF 240 also notifies subscribers about registration changes including the GRUU sets assigned to registered instances. During registration process, the S-CSCF 240 provides policy information, if available, for a Public User Identity from the HSS 224 to the P-CSCF 230 and/or UE 101. For example, the policy information includes MPS IMS Subscription status and policy applicable to enterprise network subscribers. For session-related and session-unrelated flows, the S-CSCF 240 provides session control for the registered endpoint's (e.g., UEs 101) sessions, and rejects IMS communication to/from Public User Identity(s) that are barred for IMS communications after completion of registration. The S-CSCF 240 may behave as a proxy server in that the S-CSCF 240 accepts requests and services them internally or forwards them on, possibly after translation. The S-CSCF 240 may behave as a UA in that the S-CSCF 240 may terminate and independently generate SIP transactions. Based on the determined served user, the S-CSCF 240 handles interactions with the services platforms for the support of services. The S-CSCF 240 provides endpoints with service event related information (e.g., notification of tones/announcement together with location of additional media resources, billing notification).

The I-CSCF 245b is the contact point within an operator's network (e.g., the operator B network 202b) for all IMS connections destined to a subscriber of that network operator (e.g., the UE 101b), or a roaming subscriber currently located within that network operator's service area. The I-CSCF 245b also generates CDRs for charging and resource utilization.

Each operator network in the IMS architecture 200 also include an AS 250 (including AS 250a in the operator A network 202a and AS 250b in the operator B network 202b). The AS 250 may influence and impact the SIP session on behalf of the services supported by the operator's network. An AS 250 may host and execute services. The AS 250 may resides either in the user's home network or in a third party location. The third party could be a network or simply a stand-alone AS. In the control plane, AS 250 provides supplementary services such as call hold/resume, call forwarding, multi-party calls, and/or the like. The AS 250 may be an SIP AS, OSA AS, or CAMEL IM-SSF. The OSA AS does not directly interact with the IMS network entities but through the OSA SCS-s. The SIP Application Server supports IMS reference points (e.g., ISC, Sh, Ut (not shown by FIG. 2)), in support of an application, is considered as part of the IM CN subsystem. Examples of such ASs are SCC AS and TAS. The AS (SIP AS, OSA SCS, and/or IM-SSF) can communicate with the HSS 224 over the Sh and Si interfaces (not shown by FIG. 2). An S-CSCF to AS interface is used to provide services residing in an AS, and an I-CSCF to AS interface is used to forward SIP requests destined to a Public Service Identity hosted by the AS directly to that AS.

The HSS/SLF 224b is a master database wherein the HSS portion of the HSS/SLF 224 (hereinafter referred to as "HSS 224") includes (or stores) subscription-related information to support the network entities actually handling calls/sessions, and the SLF portion of the HSS/SLF 224 (hereinafter referred to as "SLF 224") includes (or stores) information used to locate the subscription-related information. Although FIG. 2 only depicts HSS/SLF 224b located in the operator B network 202b, in other embodiments, the operator A network 202a may also include an HSS/SLF 224. In some embodiments, the SLF is not required such as in a single HSS environment (e.g., a server farm architecture) or when an AS 250 are configured/managed to use pre-defined HSS 224. A home network may contain one or several HSSs 224 depending on the number of mobile subscribers, the capacity of the equipment, and on the organization of the network. As an example, the HSS 224 provides support to the call control servers in order to complete the routing/roaming procedures by solving authentication, authorization, naming/addressing resolution, location dependencies, etc.

The HSS 224 is responsible for holding (or storing) the following user related information: user identification, numbering, and addressing information; user security information including network access control information for authentication and authorization; user location information at inter-system level wherein the HSS 224 supports the user registration and stores inter-system location information, etc.; and user profile information. The HSS 224 also generates user security information for mutual authentication, communication integrity check and ciphering. Based on this information, the HSS 224 also supports the call control and session management entities of the different domains and subsystems of the operator network. The HSS 224 may integrate heterogeneous information, and enable enhanced features in the core network to be offered to the application & services domain, at the same time hiding the heterogeneity. Furthermore, the HSS 224 includes IP multimedia functionality, which provides support to control functions of the IM subsystem such as the CSCF 230, 240, 245. The IP multimedia functionality enables subscriber usage of the IM CN subsystem services and is independent of the access network used to access the IM CN subsystem.

The SLF 224 is queried by the I-CSCF 245b via a Dx interface (not shown by FIG. 2) during the registration and session setup to get the name of the HSS 224 containing the required subscriber specific data. Furthermore the SLF 224 is also queried by the S-CSCF 240 via the Dx interface (not shown by FIG. 2) during registration. The SLF 224 is queried by the AS 250 via the Dh interface (not shown by FIG. 2) in conjunction with the Sh interface (not shown by FIG. 2) operation to get the name of the HSS 224 containing the required subscriber specific data. The SLF 224 is queried by an 3GPP AAA server (not shown by FIG. 2) via the Dw interface (not shown by FIG. 2) to get the name of the HSS 224 containing the required subscriber specific data.

As mentioned previously, the UEs 101 may use SIP, SDP, and SDPCapNeg for media negotiation and configuration. General SIP signaling (see e.g., 3GPP TS 24.229) is used to convey SDP offer and answer messages. The SIP messages include SDP offer and answer messages in the message body portion of the SIP messages. In some implementations, the MTSI client in terminal may use the OMA-DM solutions for enhancing SDP negotiation and resource reservation process.

The session setup for RTP transported media may determine, for each media, IP address(es), RTP profile, UDP port number(s); codec(s); RTP Payload Type number(s), RTP Payload Format(s), the maximum bandwidth that is allowed in the session, and/or the like. The session setup may also determine ECN usage and any additional session parameters. The session setup for UDP transported media without RTP may determine IP address(es), UDP port number(s) and additional session parameters.

An MTSI client (e.g., a UE 101) offers at least one RTP profile for each RTP media stream. Multiple RTP profiles may be offered using SDPCapNeg. For voice and real-time text, the first SDP offer may include at least the AVP profile. For video, the first SDP offer for a media type may include at least the AVPF profile. Subsequent SDP offers may include only other RTP profiles if it is known from a preceding offer that this RTP profile is supported by the answerer. The MTSI client may be capable of receiving an SDP offer containing both AVP and AVPF offers in order to support interworking. The configuration of ECN for media transported with RTP for speech and for video.

SDPCapNeg is used to negotiate RTP profiles for all media types where AVPF is supported. MTSI clients supporting SDPCapNeg may support the complete SDPCapNeg framework. SDPCapNeg attributes that are directly applicable for the RTP profile negotiation include, inter alia, tcap, pcfg and acfg attributes. For voice and real-time text, SDPCapNeg may be used when offering AVPF the first time for a new media type in the session since the support for AVPF in the answering client is not known at this stage. For video, an MTSI client may either offer AVPF and AVP together using SDPCapNeg, or the MTSI client may offer only AVPF without using SDPCapNeg. When offering AVP and AVPF using SDPCapNeg, the MTSI client may offer AVP on the media (m=) line and may offer AVPF using SDPCapNeg mechanisms. The SDPCapNeg mechanisms are used as follows: The support for AVPF is indicated in an attribute (a=) line using the transport capability attribute 'tcap'. AVPF may be preferred over AVP. At least one configuration using AVPF may be listed using the attribute for potential configurations 'pcfg'.

An invited MTSI client should accept using AVPF whenever supported. If AVPF is to be used in the session then the MTSI client selects one configuration out of the potential configurations defined in the SDP offer for using AVPF; indicates in the media (m=) line of the SDP answer that the profile to use is AVPF; and indicates the selected configuration for using AVPF in the attribute for actual configurations 'acfg'. If AVP is to be used then the MTSI may not indicate any SDPCapNeg attributes for using AVPF in the SDP answer.

The SDP may include bandwidth information for each media stream and also for the session in total. The bandwidth information for each media stream and for the session is defined by the application specific bandwidth modifier as defined in RFC 4566. An MTSI client in terminal may include the 'a=bw-info' attribute in the SDP offer. When accepting a media type where the 'a=bw-info' attribute is included the MTSI client in terminal may include the 'a=bw-info' attribute in the SDP answer if it supports the attribute. When the 'a=bw-info' attribute is supported, the following bandwidth properties may be included for each RTP payload type in the SDP: Maximum Supported Bandwidth for sending direction; Maximum Desired Bandwidth for sending direction; Minimum Desired Bandwidth for sending direction; Minimum Supported Bandwidth for sending direction; Maximum Supported Bandwidth for receiving direction (with some exceptions); Maximum Desired Bandwidth for receiving direction; Minimum Desired Bandwidth for receiving direction; and Minimum Supported Bandwidth for receiving direction.

When an MTSI client in terminal receives an SDP offer or answer it may determine the maximum sending rate for the selected codec by selecting the smallest of the following: the bandwidth value, if the b=AS parameter was included in the received SDP offer or answer; the Maximum Supported Bandwidth for the receiving direction, if included in the received SDP; the preconfigured data rate for the selected codec, if the MTSI client has been preconfigured by the operator to use a particular data rate for the selected codec; the maximum data rate for the selected codec as determined by examining the codec information (e.g., codec, mode, profile, level) and any other media information (e.g., ptime and maxptime) included in the received SDP offer or answer. The maximum data rate is determined assuming no extra bandwidth is allowed for redundancy. The maximum sending rate may be further updated by the MTSI client in terminal based on receiving an indication of the granted QoS.

The MTSI client in terminal may not transmit at a rate above the maximum sending rate. For speech, the MTSI client should transmit using the codec mode with the highest data rate allowed by the maximum sending rate, except if limited to a lower codec mode by the initial codec mode procedures or by adaptation procedures. With respect to ANBR, the SDP offer/answer re-negotiation may not be used as a replacement for dynamic media bitrate adaptation. ANBR contains information on short-term bandwidth and SDP offer/answer re-negotiations should be avoided or minimized since they consume network resources. Therefore, SDP offer/answer re-negotiation (e.g., in SIP UPDATE) may not be initiated based on ANBR information other than in the following cases: the received ANBR from the access network is below the established GBR; the received ANBR cannot be supported by any of the negotiated codec configurations; potentially increased loss and/or delay due to not lowering the bitrate are not acceptable; the MTSI client in terminal supports one or more codec configurations that supports the received ANBR; and ANBR messages with values meeting all the aforementioned conditions are received consistently for an extensive period of time (e.g., 5 seconds or more). Then the MTSI client in terminal may re-negotiate the session to switch to a codec or codec configuration that can support the lower bitrate in the ANBR (if any); and/or to reduce the number of used RTP streams (e.g., turning off the affected media); and if the session re-negotiation fails, may not initiate further re-negotiation based on ANBR for that bearer in the session. For video, if TMMBR/TMMBN are not supported in the session; and for an extensive period of time (e.g., 5 seconds), the MTSI client in terminal consistently receives ANBR messages with values significantly below the video bitrate sent (as estimated by the receiving MTSI client in terminal) from the remote peer. Then the MTSI client in terminal may re-negotiate the session to set the session bitrate for video to a value corresponding to the minimum of the received ANBR and GBR (if >0); or to turn the video off.

The UEs 101 may also support adaptive mechanisms, which are used to optimize the session quality given the current transport characteristics. The mechanisms provided in MTSI are bit-rate, packet-rate and error resilience adaptation. These mechanisms can be used in different ways; however, they should only be used when the result of the adaptation is assumed to increase the session quality even if e.g., the source bit-rate is reduced. Adaptive mechanisms that act upon measured or signaled changes in the transport channel characteristics may be used in a conservative manner. Examples of measured changes in transport characteristics are variations in PLR and delay jitter. Examples of signaled changes in transport characteristics are ANBR and ECN Congestion Experienced (ECN-CE) marking in IP packet headers. A conservative use of adaptation is characterized by a fast response to degrading conditions, and a slower, careful upwards adaptation intended to return the session media settings to the original default state of the session. The long-term goal of any adaptive mechanism is assumed to be a restoration of the session quality to the originally negotiated quality. The short-term goal is to maximize the session quality given the current transport characteristics, even if that means that the adapted state of the session will give a lower session quality compared to the session default state if transported on an undisturbed channel.

Some access networks may provide the MTSI client in terminal with ANBR messages, separately per local access bearer and separately for the local uplink and downlink. An ANBR message is sent to the MTSI client in terminal whenever the access network finds it reasonable to inform about a change in the recommended bitrate, such that the MTSI client in terminal is generally provided with up-to-date recommended bitrate information. In general, a single access bearer can carry multiple RTP streams, in which case ANBR applies to the sum of the individual RTP stream bitrates on that bearer. Access networks supporting ANBR may also support a corresponding ANBRQ message, which allows the MTSI client in terminal to query the network for updated ANBR information. ANBRQ may only be used to query for an ANBR update when media bitrate is to be increased, not for media bitrate decrease.

The ANBR and ANBRQ messages are conceptual messages that allows generalization of the description between different accesses, for example, LTE, NR, and wireless LAN. Where ANBR/ANBRQ signaling is to be used, a mapping between the conceptual ANBR/ANBRQ and the actual messages for each access may be defined. The format of such access-specific ANBR/ANBRQ messages may differ between different types of access networks, and there may not even exist a one-to-one mapping of messages. The bitrate value in ANBR/ANBRQ may include IP and higher layer overhead, including bitrate used for RTCP signaling, as opposed to for example, b=AS line in SDP, which does not include RTCP. Other definitions can be used by the individual access network mappings, for example, including overhead below IP layer that is added by the access network, and the UE 101 may then perform appropriate value translation, for example, adjusting for use of ROHC and removing the lower layer overhead.

When using LTE access, ANBR is mapped to a MAC level message named "Recommended bit rate MAC Control Element" sent by the RAN node 111 (e.g., an eNB) and applicable to a specific dedicated bearer. Similarly, when using LTE access, ANBRQ is mapped to a MAC level message named "Recommended bit rate query MAC Control Element" sent to the the RAN node 111 (e.g., an eNB) and applicable to a specific, existing dedicated bearer. An MTSI client in terminal using LTE access may support ANBR and ANBRQ signaling. When using NR access, ANBR is mapped to a MAC level message named "Recommended bit rate MAC Control Element" sent by the RAN node 111 (e.g., an gNB) and applicable to a specific logical channel which is mapped to the single media flow (e.g., audio or video) to which the recommended bit rate applies. Similarly, when using NR access, ANBRQ is mapped to a MAC level message named "Recommended bit rate query MAC Control Element" sent to the RAN node 111 (e.g., an gNB) and applicable to a specific, existing logical channel which is mapped to the single media flow to which the recommended bit rate applies. An MTSI client in terminal using NR access may support ANBR and ANBRQ signaling.

An MTSI client in terminal may use the ANBR message as an adaptation trigger, taking other available triggers into account. This may apply for both speech and video, adapting to the lowest bitrate resulting from any of the possibly multiple, available triggers. An adaptation trigger is used to indicate a currently allowed bitrate. The currently allowed bitrate is the minimum of the bitrate negotiated in SDP offer/answer and the bitrate allowed after the latest preceeding adaptation (e.g., a last previous TMMBR message) that increased or decreased the allowed bitrate for the encoder. When no bitrate reduction trigger is received, the value from SDP offer/answer is used. Therefore, the currently allowed bitrate may vary over time. Multiple adaptation trigger algorithms can be used in parallel, for example ECN-triggered adaptation, adaptation based on ANBR, and PLR-triggered adaptation. When multiple adaptation algorithms are used for the rate adaptation, the rate that the MTSI client is allowed to use should be no higher than any of the rates determined by each adaptation algorithm. A received ANBR message for a certain access bearer and media direction may be considered valid for use as input to adaptation trigger evaluation until either another ANBR message is received for the same access bearer and media direction, until that access bearer is closed, or until the SIP session is either re-negotiated or closed. No signaling is currently present to provide e2e coordination between the UEs 101 in regards to ANBR support. These ANBR procedures, in the absence of e2e coordination, may suffer from unfavorable consequences such as high PLR and poor quality.

The UEs 101 may also support RAN delay budget reporting through the use of RRC signaling to a RAN node 111 (e.g., an eNB or gNB) allows UEs 101 to locally adjust air interface delay. Based on the reported delay budget information, a good coverage UE 101 on the receiving end (e.g., the UE 101 that contains the MTSI receiver) can reduce its air interface delay, for example, by turning off CDRX or via other means. This additional delay budget can then be made available for the sending UE 101 (e.g., the UE 101 that contains the MTSI sender), and can be quite beneficial for the sending UE 101 when it suffers from poor coverage. When the sending UE 101 is in bad coverage, that UE 101 may request the additional delay from its local RAN node 111 (e.g., an eNB or gNB), and if granted, that UE 101 would utilize the additional delay budget to improve the reliability of its uplink transmissions in order to reduce packet loss, for example, via suitable repetition or retransmission mechanisms, and thereby improve end-to-end delay and quality performance.

While RAN-layer delay budget reporting allows UEs 101 to locally adjust air interface delay, such a mechanism does not provide coordination between the UEs 101 to manage delay and jitter on an e2e basis. In particular, these approaches do not allow UEs 101 to coordinate the delay adjustments on an e2e basis. To alleviate this issue, embodiments herein define SDP and/or RTCP signaling to realize the following capabilities on signaling of DBI across UEs 101: (i) an MTSI receiver can indicate available delay budget to an MTSI sender, and (ii) an MTSI sender can explicitly request delay budget from an MTSI receiver.

More specifically, the RTCP-based signaling of DBI is composed of a dedicated RTCP feedback (FB) message type to carry available additional delay budget during the RTP streaming of media, signaled from the MTSI receiver to the MTSI sender. In addition, the defined RTCP feedback message type may also be used to carry requested additional delay budget during the RTP streaming of media, signaled from the MTSI sender to the MTSI receiver. A corresponding dedicated SDP parameter on the RTCP-based ability to signal available or requested additional delay budget during the IMS/SIP based capability negotiations is also defined. For example, an MTSI client (e.g., a UE 101) supporting DBI may offer 'Delay Budget Information' (DBI) signaling in SDP for all media streams containing speech and/or video. DBI may be offered by including the a=rtcp-fb attribute with the DBI type under the relevant media line scope. DBI signaling involves RTCP feedback signaling to carry both available additional delay budget from the MTSI receiver to the MTSI sender, and requested additional delay budget from the MTSI sender to the MTSI receiver. The DBI type in conjunction with the RTCP feedback method may be expressed with the following parameter: 3gpp-delay-budget. A wildcard payload type ("*") may be used to indicate that the RTCP feedback attribute for DBI signaling applies to all payload types. Here is an example usage of this attribute to signal DBI relative to a media line based on the RTCP feedback method: a=rtcp-fb:* 3gpp-delay-budget. The ABNF for rtcp-fb-val corresponding to the feedback type "3gpp-delay-budget" is given as follows: rtcp-fb-val=/ "3gpp-delay-budget". Such RTCP-based signaling of DBI can also be used by an MTSI receiver to indicate delay budget availability created via other means such as jitter buffer size adaptation. The signaling of available or requested additional DBI may use RTCP feedback messages as specified in IETF RFC 4585. The RTCP feedback message is identified by PT (payload type)=RTPFB (205), which refers to RTP-specific feedback message. The RTCP feedback method may involve signaling of available or requested additional delay budget in both of the immediate feedback and early RTCP modes.

As such, the RTCP feedback message may be sent from the MTSI receiver to the MTSI sender to convey to the sender the available additional delay budget from the perspective of the receiver. The recipient UE 101 of the RTCP feedback message (e.g., the UE 101 containing the MTSI sender) may then use this information in determining how much delay budget it may request from its eNB/gNB over the RAN interface, for example, by using RRC signaling based on UEAssistanceInformation as discussed in more detail infra.

Figure 3:
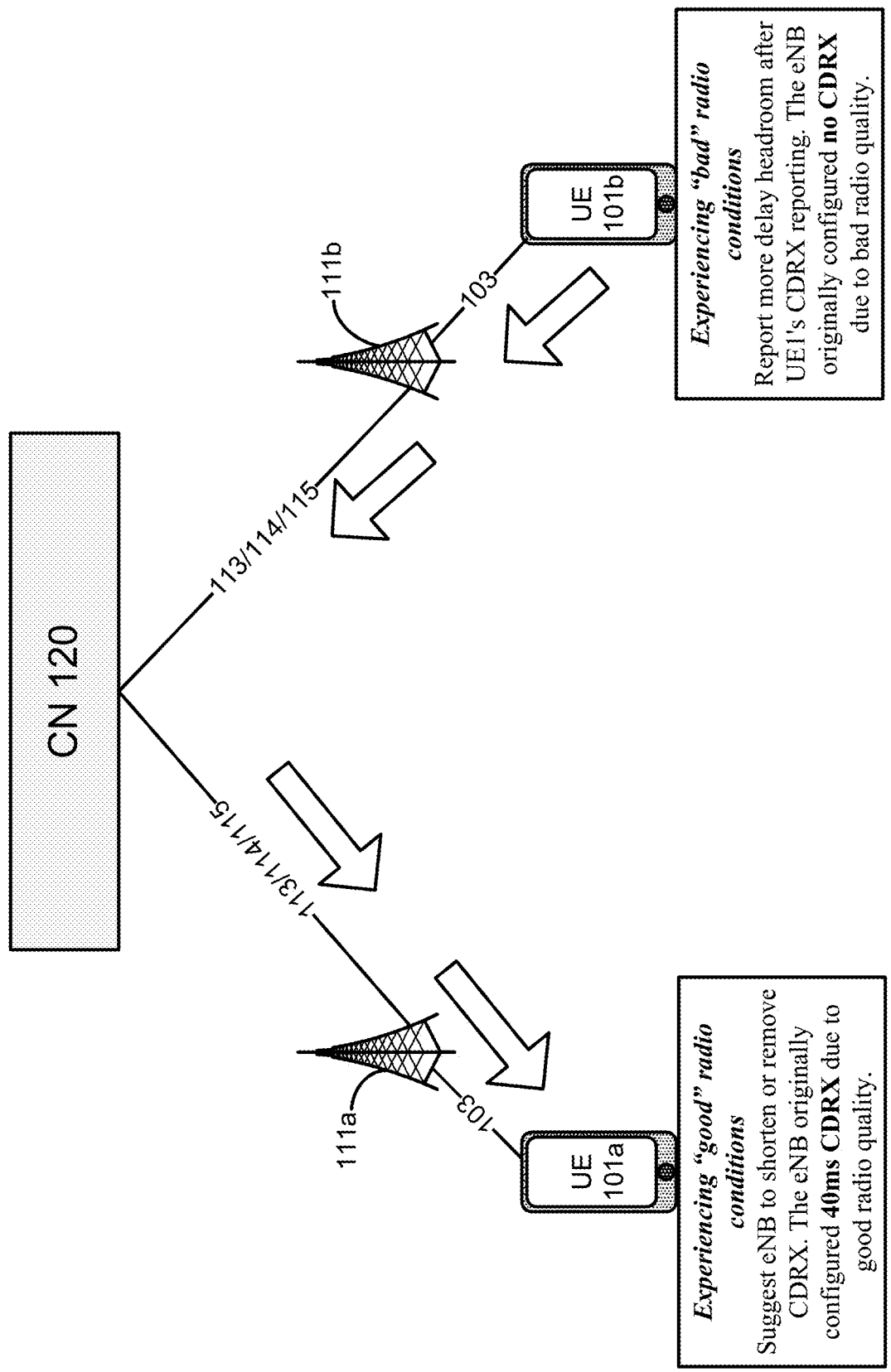
FIG. 3 depicts an example use case for RAN delay budget reporting.

FIG. 3 depicts an example use case for RAN delay budget reporting. The example of FIG. 3 is a shortening cDRX cycle for a degraded VoLTE call. In FIG. 3, UE 101a is experiencing "good" radio conditions and is configured with 40 ms connected mode DRX (cDRX). Radio conditions may be considered "good" (or "better" than threshold radio conditions) if the UE 101a detects or measures a channel quality and/or signal strength to be at or above some predefined threshold (within some margin of error), or detects or measures a signal noise or interference to be below a predefined threshold (within some margin of error). Additionally, UE 101b is experiencing "bad" radio conditions and is configured with no cDRX. Radio conditions may be considered "bad" if the UE 101b detects or measures a channel quality and/or signal strength to be below some predefined threshold (within some margin of error), or detects or measures a signal noise or interference to be at or above a predefined threshold (within some margin of error). As examples, a bad radio condition may be declared when a UE 101 detects or determines a high BLER (e.g., at or above a threshold BLER value), a large jitter or delay (e.g., at or above a threshold jitter or delay values), and/or the like.

The example of FIG. 3 may operate as follows. When the UE 101b detects bad radio conditions, the UE 101b may send multiple HARQ retransmissions, which may cause long jitter and/or e2e delay at the receiver UE 101a. Next, when the UE 101a detects that VoLTE quality is bad (e.g., large jitter or delay), the UE 101a suggests to the RAN node 111a to deconfigure cDRX or shorten a cDRX cycle. In response, the RAN node 111a may adjust the cDRX cycle, and the e2e delay and jitter may be reduced. According to various embodiments, the UE 101a may indicate to its local RAN node 111 (e.g., RAN node 111a in FIG. 3) a cDRX cycle value that is different than a currently configured cDRX cycle value. In these embodiments, the UE 101a indicates a preferred cDRX cycle length via a new RRC message, and the RAN node 111a decides which cDRX cycle to use. A prohibit timer may also be configured by the RAN node 111a to prevent the UE 101a from sending the indication too frequently. Next, when the UE 101b detects that VoLTE e2e delay has dropped, the UE 101b reports a larger delay headroom to RAN node 111b, and the RAN node 111b may apply more eMTC repetitions and/or more HARQ retransmissions.

In order to realize the solution of FIG. 3, RRC signaling procedures have been adopted based on the UEAssistanceInformation message (see e.g., tables 4-5 and 7-8 infra) that allows the UE 101a to signal to delay budget reporting information to the RAN node 111a as follows: the UE 101a in good coverage indicates a preference to the RAN node 111a to reduce the local air interface delay by sending a UEAssistanceInformation message with delayBudgetReport value and indication of type1 to decrease the connected mode DRX cycle length so that the e2e delay and jitter can be reduced; and the peer UE 101b in bad coverage can send a UEAssistanceInformation message with delayBudgetReport value and indication of type2 to its eNB to indicate a preference on Uu air interface delay adjustments. When a UE 101 detects changes such as e2e MTSI voice quality or local radio quality, the UE 101 may inform the eNB its new preference by sending UEAssistanceInformation messages with updated contents on delayBudgetReport. Air interface delay adjustments made through RAN delay budget reporting impact the e2e delay and quality performance of MTSI in 3GPP TS 26.114. MTSI as in 3GPP TS 26.114 currently does not specify when and how the UEs 101 should use RAN-based delay adjustment mechanisms in an end-to-end fashion.

RAN delay budget reporting may be used by MTSI UEs 101 in order to locally adjust air interface delay, towards improving e2e delay and quality performance. RAN delay budget reporting allows a good coverage UE 101a on the receiving end to reduce its air interface delay by turning off cDRX. This additional delay budget can then be made available for the sending UE 110a, which suffers from poor coverage. The sending UE 101b in such poor coverage condition would typically keep its cDRX off and seek improving the reliability of its uplink transmissions. The sending UE 101a would request the additional delay from its local RAN node 111a using the RAN delay budget reporting procedures, and if granted, it would utilize the additional delay budget to improve the reliability of its uplink transmissions in order to reduce packet loss (e.g., via suitable repetition or retransmission mechanisms).

Toward developing an e2e operational perspective for MTSI, the following mode of operation is considered. MTSI sender and MTSI receiver independently use RAN delay budget reporting mechanisms toward adjusting air interface delay in their respective RANs. As such there is no coordination between them. In the meantime, both sending and receiving UEs 101 utilize available e2e metrics and other information available at their MTSI client to trigger RAN delay budget reporting.

Figure 4:
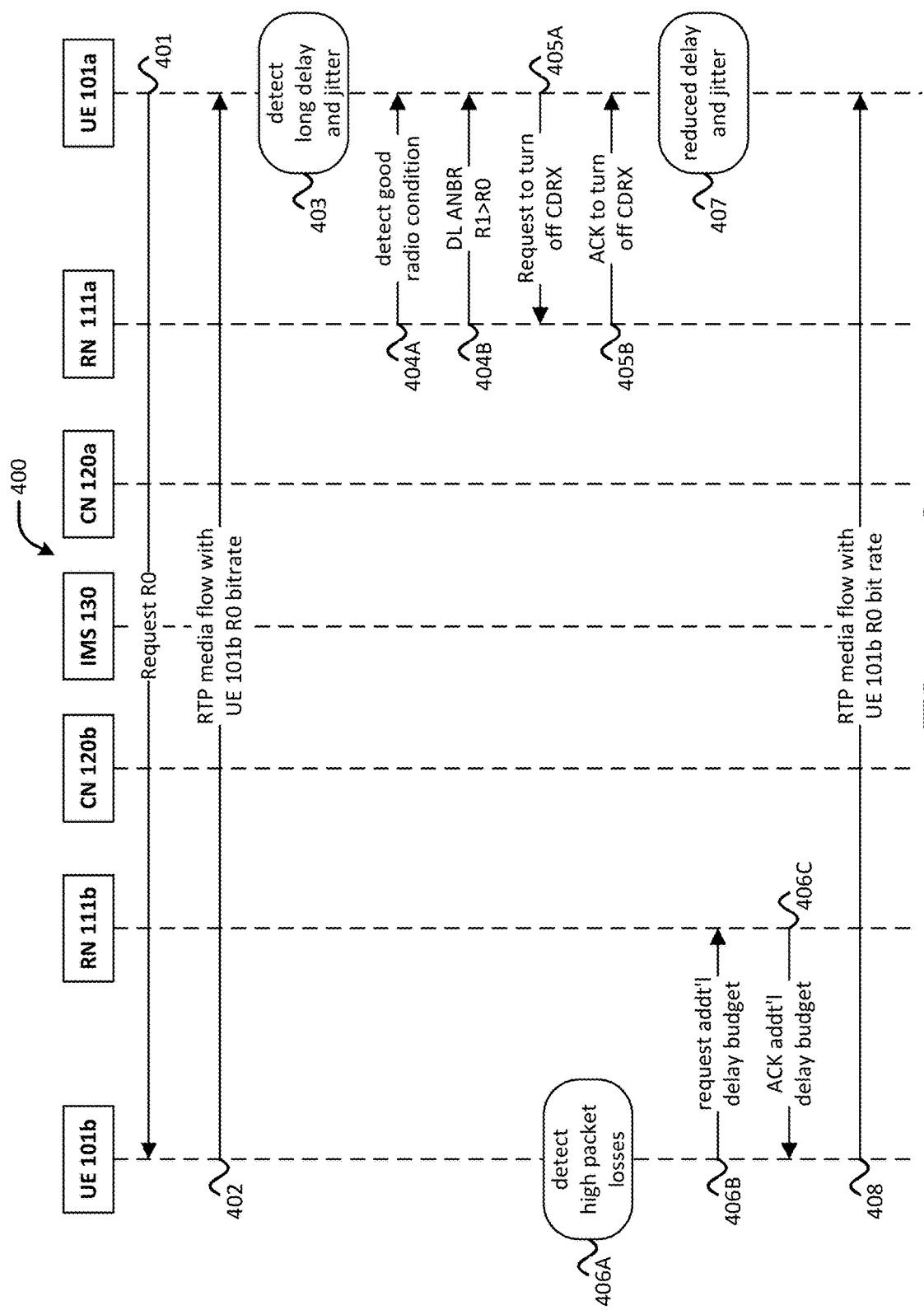
FIG. 4 depicts an example procedure for RAN delay budget reporting in MTSI according to some embodiments.

FIG. 4 depicts an example procedure 400 for RAN delay budget reporting in MTSI according to some embodiments. Procedure 400 involves RAN delay budget reporting usage for voice in MTSI without DBI signaling. However, aspects of procedure 400 may be applicable to RAN delay budget reporting usage for other media types (e.g., video) in MTSI without DBI signaling. In the example of FIG. 4, the UE 101a is served by RAN node 111a which is communicatively coupled with a first CN 120a and IMS 130; and the UE 101b is served by RAN node 111b which is communicatively coupled with a second CN 120b and IMS 130.

Procedure 400 begins at operation 401 where UE 101a sends UE 101b a rate request for bitrate R0. The "Request" message in this example is a generalized application level rate request message that corresponds to CMR or RTCP-APP for voice. Where video is used, the request may also be a generalized application level rate request message that corresponds to RTCP TMMBR for video. At operation 402, UE 101b sends an RTP media flow with bitrate R0. In some embodiments, prior to sending the RTP media flow at operation 402, the UE 101b may send a rate notification message to indicate acceptance of bitrate R0. In these embodiments, the notification may be a "Notify" message, which is a generalized application level message that corresponds to RTCP TMMBN for video. At operation 403, the UE 101a detects a long delay and jitter. Additionally or alternatively, the UE 101a may detect a relatively high PLR. At operation 404 (including operations 404A and 404B), the UE 101a detects relatively good radio conditions locally. For example, RAN node 111a may send a DL ANBR of bitrate R1>R0 to the UE 101a (e.g., operation 404B), and the UE 101a measures a relatively low BLER over a local radio link based on the monitoring of successful downlink packet transmissions. Additionally or alternatively, the UE 101a may measure downlink throughput over the radio air interface that is much higher than the received bitrate after accounting for the relevant headers. In the meantime, UE 101a detects relatively high packet losses (e.g., operation 403) after monitoring reception of RTP packets, also by monitoring RTCP sender and receiver reports, and applying the highest possible jitter buffer according to the reference JBM subject to the JBM compliance (performance) requirement(s) of MTSI. The JBM performance requirements may be a threshold for a CDF of the speech-frame delay introduced by a reference delay computation algorithm, where the CDF threshold may be set by shifting the reference delay computation algorithm CDF 60 ms. The speech-frame delay CDF is defined as: P(x)=Probability (delay_compensation_by_JBM≤x). The video-frame delay CDF may be the same or similar as the speech-frame delay CDF. Hence, UE 101a concludes that the local radio conditions experienced by UE 101b are relatively poor.

The adaptation of media in RTP streams that the MTSI client in terminal receives in the downlink direction (e.g., operation 404B) may require sending application-level messages to adapt the remote media encoder bitrate. When an MTSI client in terminal receives an ANBR message for the local DL that triggers an adaptation decision (e.g., operation 404B in FIG. 4), for the case of video and if TMMBR/TMMBN are supported in the session, then a corresponding TMMBR message requesting the remote media sender to change its rate to match the local downlink restriction may be sent, as described in clause 10.3.2 of 3GPP TS 26.114 (2018-12). For the case of voice, adaptation signaling to match the local downlink restriction may be initiated towards the remote media sender, as described in clause 10.2 of 3GPP TS 26.114 (2018-12). When an MTSI client in terminal receives application signaling for bitrate adaptation related to received media, such as TMMBN (for video), the media receiver receiving a TMMBN with increased bitrate and where the remote media sender owns the restriction may re-evaluate its downlink adaptation triggers and, if an adaptation decision arrives at a lower bitrate value than in the received TMMBN, send a TMMBR with that lower bitrate. When deciding whether or not to send TMMBR, the media receiver may take all available adaptation triggers into account, e.g., bitrate limit from the most recently received downlink ANBR message. If the media receiver has reason to believe the most recently received ANBR for its downlink no longer applies, it may send an ANBRQ message for its downlink, if supported, to trigger receiving an ANBR message with recent information.

At operation 405A, the UE 101a sends an RRC message including a UEAssistanceInformation message to RAN node 111a with type-1 to turn off cDRX. It is assumed that RAN node 111a grants this request and turns off CDRX for UE 101a, and at operation 405B, the RAN node 111a sends an ACK to the UE 101a to indicate that the cDRX has been turned off. Turning off cDRX is relevant when PLR is relatively high, which is the conclusion of UE 101a in the example of FIG. 4, as per operations 403, 404A, and 404B. However, it should be noted that UE 101a can increase the JBM depth to compensate the delay if PLR is relatively low and the detected jitter is relatively high. In this scenario, delay budget request from the UE 101a to the RAN node 111a is not necessary and UEAssistanceInformation message may not be sent. Moreover, even in a relatively high PLR situation and/or based on other considerations, the UE 101a may choose not to turn cDRX off, for example, when saving battery power is critical or otherwise desired.

At operation 406A, the UE 101b detects relatively high packet losses on its uplink due to poor coverage conditions. For example, the UE 101b may measure high BLER over its local radio link based on the monitoring of successful uplink packet transmissions, for example, by monitoring the HARQ acknowledgements received. At operation 406B, the UE 101*b* requests additional delay budget from its local RAN node 111*b* in order to perform additional re-transmissions to increase the reliability of its UL transmissions. When requesting this additional delay budget, the UE 101*b* may also consider e2e RTT measured based on RTCP reports. In this example, RAN node 111*b* grants the request for additional delay budget, and at operation 406C, the RAN node 111*b* sends an ACK message to the UE 101*b* to indicate acceptance of the additional delay budget. Because the UE 101*a* has already turned its cDRX off, it is unlikely that the JBM constraint at UE 101*a* will lead to packet losses in response to the increase air interface delay over the RAN 110 corresponding to UE 101*b*. At operation 407, the UE 101*a* measures reduced e2e delay and jitter. Additionally or alternatively, the UE 101*a* may detect reduced PLR, in comparison with the PLR detected at operation 403 (if a PLR was detected at operation 403), and improved voice quality. At operation 408, UE 101*b* sends an RTP media flow for voice with bitrate R0. The actions of the UE 101*a* in operations 403-405B and the actions of UE 101*b* in operations 406A-C may be completely independent, and there may be no coordination between the two UEs 101 for this autonomous mode of operation.

Figure 5:
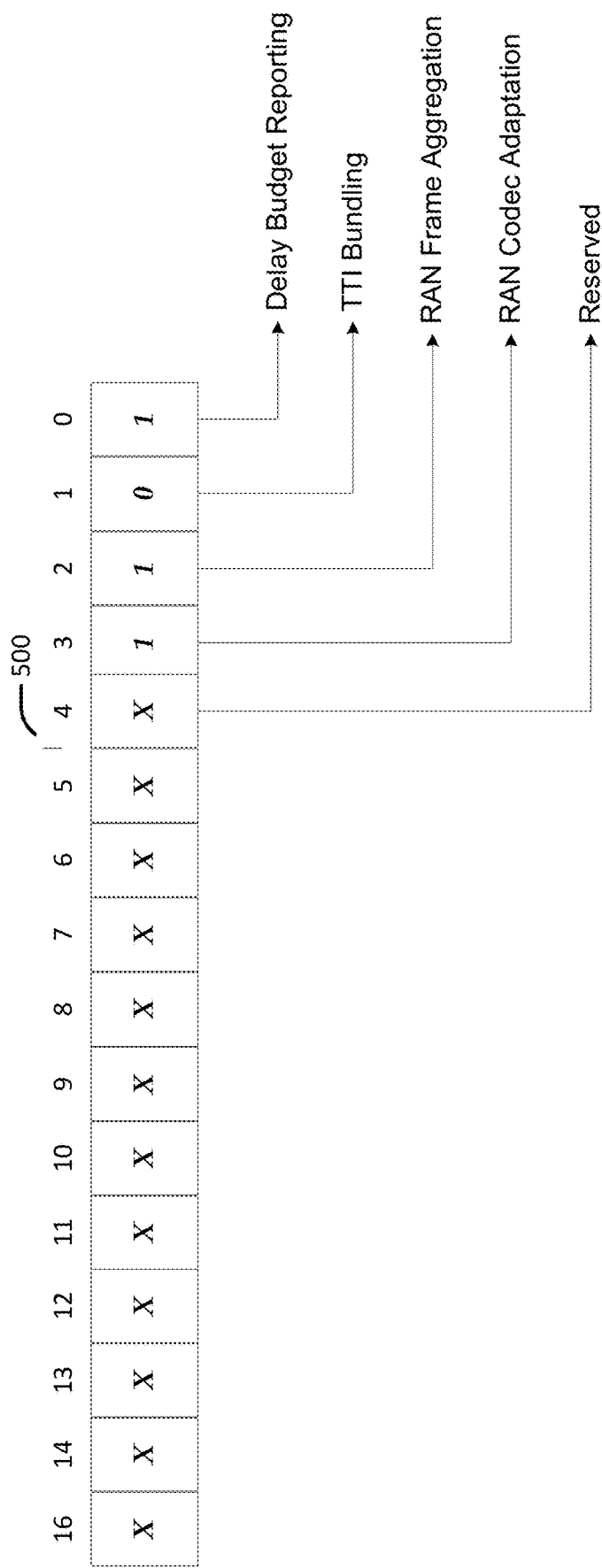
FIG. 5 shows an example bitmask, which may be used for SDP-based negotiation of RAN capabilities, in accordance with various embodiments.

FIG. 5 shows an example bitmask 500, which may be used for SDP-based negotiation of RAN capabilities, in accordance with various embodiments. While RAN-layer delay budget reporting allows UEs 101 to locally adjust air interface delay, such a mechanism does not provide coordination between the UEs to manage delay and jitter on an e2e basis. In particular, considering the autonomous operation of the MTSI sender and receiver as described previously, an MTSI receiver's decision to turn cDRX off may be dependent on the remote MTSI sender's ability to leverage the available delay budget to further improve the reliability of its transmissions. As such, it would be desirable for the UEs 101 to exchange information about specific RAN capabilities that would be relevant in influencing the remote UE's 101 adaptation and impact the e2e quality of the VoLTE call. Such RAN capabilities may include RAN delay budget reporting, TTI bundling, HARQ support, and RAN-assisted codec adaptation or ANBR, and/or the like.

According to various embodiments, during SDP capability negotiation, each UE 101 may include a RANCapabilities attribute to describe its capabilities. Using the RANCapabilities attribute, each UE 101 may know the other UE's 101 radio capabilities after the SDP offer and answer exchange. Each UE 101 may use this knowledge as part of its media and radio level adaptation. For instance, upon learning during the SDP exchange that the remote UE 101*b* (e.g., an MTSI sender) supports delay budget reporting and TTI bundling, a local UE 101*a* (e.g., the MTSI receiver) may decide to turn off cDRX when it detects good radio conditions locally, but high packet loss on an e2e basis after monitoring RTP reception statistics. However, if the remote UE 101*b* does not support delay budget reporting as indicated in the SDP, then the local UE 101*a* may decide not to turn of cDRX, since even if cDRX was turned off, the remote UE 101*b* may not be able to make use of the additional delay budget.

In various embodiments, the RAN capabilities may be signaled in an SDP message using the "a=RANCapabilities" attribute at the session level. The following parameters may be provided in the RANCapabilities attribute: a Delay Budget field including a Boolean value indicating whether the UE 101 supports delay budget reporting; a TTI_Bundling field including a Boolean value indicating whether the UE supports TTI bundling; a RAN frame aggregation field including a Boolean value indicating whether the UE supports RAN frame aggregation; and RAN_Codec field including a Boolean value indicating whether the UE supports RAN-assisted codec adaptation (or ANBR). In the example bitmask 500 of FIG. 5, the Delay_Budget field is included in the bit position 0 (i.e., the least significant bit), the TTI_Bundling field is bit position 1, the RAN frame aggregation field is the 2 bit position, the RAN_Codec field is bit position 3, and a reserved bit field is in the bit position 4. The other bits of the example bitmask 500 may be used to convey other parameters or other types of information. Additionally, other arrangements are possible in other embodiments.

In addition to indicating whether various RAN capabilities are supported, the RANCapabilities attribute may also contain parameters that describe specific RAN configurations (e.g., that may be configured by the UE's 101 local RAN node 111) in the UE 101 that may be relevant in influencing the remote UE's 101 adaptation and impact the end to end quality of the VoLTE call. An example use of the RANCapabilities attribute in the SDP is shown by table 3.

TABLE 3 a=RANCapabilities[Delay Budget=1,TTI Bundling=1,RAN Codec=0]

Figure 6:
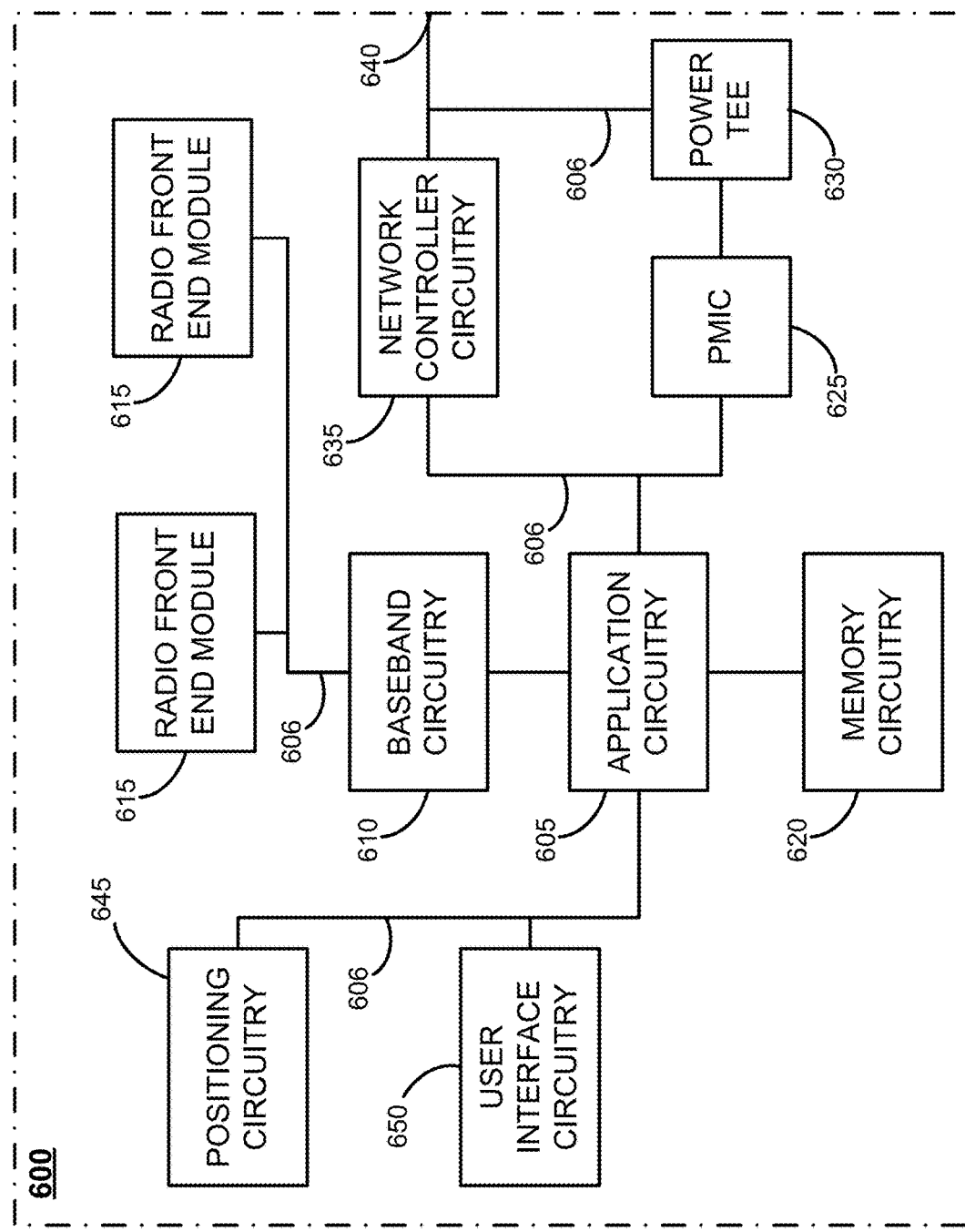
FIG. 6 depicts an example of infrastructure equipment in accordance with various embodiments.

FIG. 6 illustrates an example of infrastructure equipment 600 in accordance with various embodiments. The infrastructure equipment 600 (or "system 600") may be implemented as a base station, radio head, RAN node such as the RAN nodes 111 and/or AP 106 shown and described previously, application server(s) 130, and/or any other element/device discussed herein. In other examples, the system 600 could be implemented in or by a UE 101. The system 600 includes application circuitry 605, baseband circuitry 610, one or more radio front end modules (RFEMs) 615, memory circuitry 620, power management integrated circuitry (PMIC) 625, power tee circuitry 630, network controller circuitry 635, network interface connector 640, satellite positioning circuitry 645, and user interface 650. In some embodiments, the device 600 may include additional elements such as, for example, memory/storage, display, camera, sensor, or I/O interface. In other embodiments, the components described below may be included in more than one device. For example, said circuitries may be separately included in more than one device for CRAN, vBBU, or other like implementations.

Application circuitry 605 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose I/O, memory card controllers such as Secure Digital (SD) MultiMediaCard (MMC) or similar, USB interfaces, Mobile Industry Processor Interface (MIPI) interfaces and Joint Test Access Group (JTAG) test access ports. The processors (or cores) of the application circuitry 605 may be coupled with or may include memory/storage elements and may be configured to execute instructions stored in the memory/storage to enable various applications or operating systems to run on the system 600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 605 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 605 may comprise, or may be, a special-purpose processor/controller to operate according to the various embodiments herein. As examples, the processor(s) of application circuitry 605 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 600 may not utilize application circuitry 605, and instead may include a special-purpose processor/controller to process IP data received from an EPC or 5GC, for example.

In some implementations, the application circuitry 605 may include one or more hardware accelerators, which may be microprocessors, programmable processing devices, or the like. The one or more hardware accelerators may include, for example, computer vision and/or deep learning accelerators. As examples, the programmable processing devices may be one or more FPGAs; programmable logic devices (PLDs) such as complex PLDs (CPLDs), high-capacity PLDs (HCPLDs); ASICs such as structured ASICs; programmable SoCs (PSoCs); and the like. In such implementations, the circuitry of application circuitry 605 may comprise logic blocks or logic fabric, and other interconnected resources that may be programmed to perform various functions, such as the procedures, methods, functions, etc. of the various embodiments discussed herein. In such embodiments, the circuitry of application circuitry 605 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 610 are discussed infra with regard to FIG. 9. User interface circuitry 650 may include one or more user interfaces designed to enable user interaction with the system 600 or peripheral component interfaces designed to enable peripheral component interaction with the system 600. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 615 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 911 of FIG. 9 infra), and the RFEM may be connected to multiple antennas. In alternative implementations, both mmWave and sub-mmWave radio functions may be implemented in the same physical RFEM 615, which incorporates both mmWave antennas and sub-mmWave. The memory circuitry 620 may include one or more of volatile memory including dynamic random access memory (DRAM) and/or synchronous dynamic random access memory (SDRAM), and non-volatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 620 may be implemented as one or more of solder down packaged integrated circuits, socketed memory modules and plug-in memory cards.

The PMIC 625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 630 may provide for electrical power drawn from a network cable to provide both power supply and data connectivity to the infrastructure equipment 600 using a single cable. The network controller circuitry 635 may provide connectivity to a network using a standard network interface protocol such as Ethernet, Ethernet over GRE Tunnels, Ethernet over MPLS, or some other suitable protocol. Network connectivity may be provided to/from the infrastructure equipment 600 via network interface connector 640 using a physical connection, which may be electrical (commonly referred to as a "copper interconnect"), optical, or wireless. The network controller circuitry 635 may include one or more dedicated processors and/or FPGAs to communicate using one or more of the aforementioned protocols. In some implementations, the network controller circuitry 635 may include multiple controllers to provide connectivity to other networks using the same or different protocols.

The positioning circuitry 645 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 645 may include a Micro-Technology for Positioning, Navigation, and Timing (Micro-PNT) IC that uses a master timing clock to perform position tracking/estimation without GNSS assistance. The positioning circuitry 645 may also be part of, or interact with, the baseband circuitry 610 and/or RFEMs 615 to communicate with the nodes and components of the positioning network. The positioning circuitry 645 may also provide position data and/or time data to the application circuitry 605, which may use the data to synchronize operations with various infrastructure (e.g., RAN nodes 111, etc.), or the like.

The components shown by FIG. 6 communicate with one another using interface circuitry, which may include interconnect (IX) 606. The IX 606 may include any number of bus and/or IX technologies such as industry standard architecture (ISA), extended ISA (EISA), inter-integrated circuit ($I^2C$), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

Figure 7:
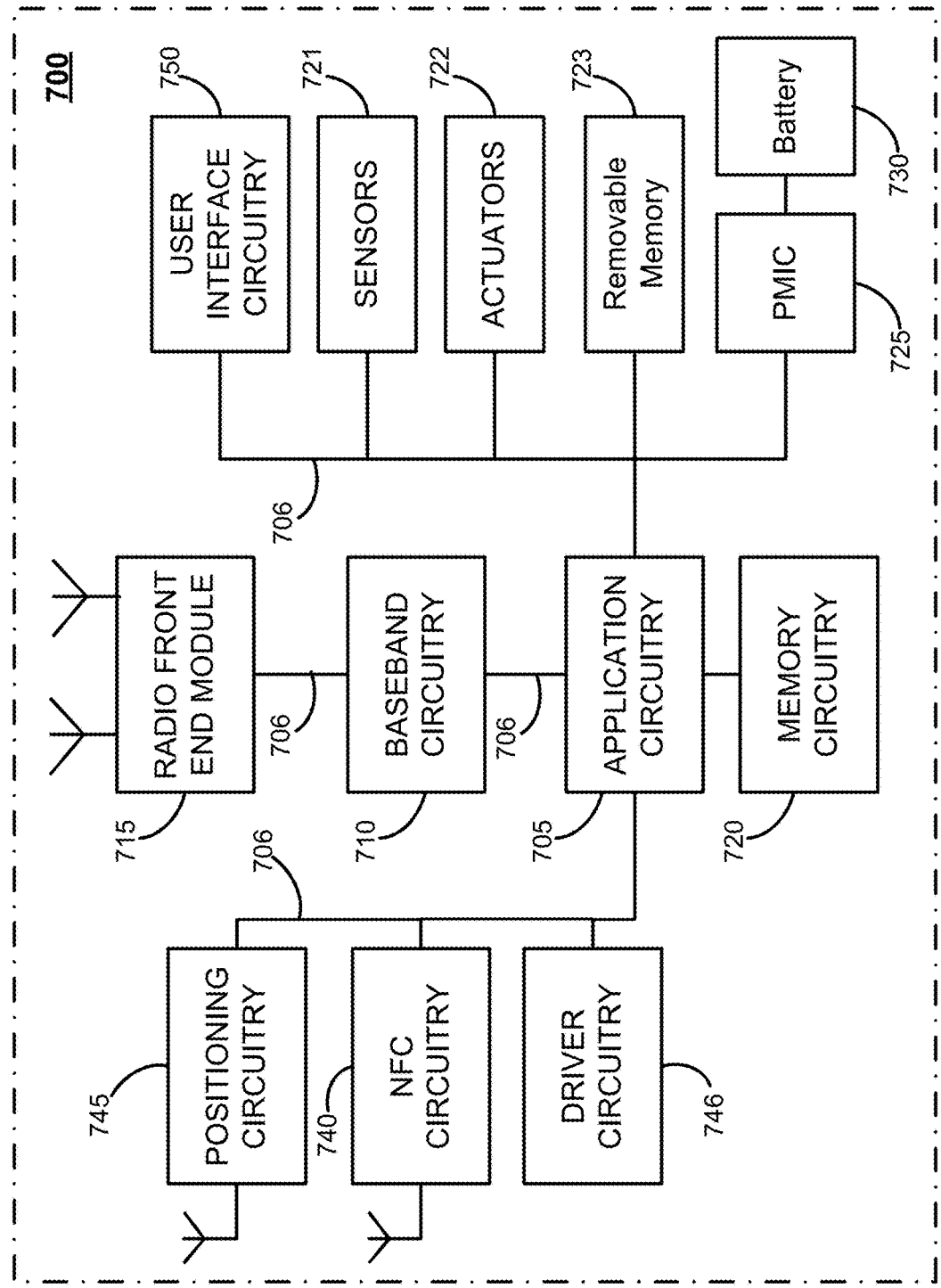
FIG. 7 depicts example components of a computer platform in accordance with various embodiments.

FIG. 7 illustrates an example of a platform 700 (or "device 700") in accordance with various embodiments. In embodiments, the computer platform 700 may be suitable for use as UEs 101, application servers 130, and/or any other element/device discussed herein. The platform 700 may include any combinations of the components shown in the example. The components of platform 700 may be implemented as integrated circuits (ICs), portions thereof, discrete electronic devices, or other modules, logic, hardware, software, firmware, or a combination thereof adapted in the computer platform 700, or as components otherwise incorporated within a chassis of a larger system. The block diagram of FIG. 7 is intended to show a high level view of components of the computer platform 700. However, some of the components shown may be omitted, additional components may be present, and different arrangement of the components shown may occur in other implementations.

Application circuitry 705 includes circuitry such as, but not limited to one or more processors (or processor cores), cache memory, and one or more of LDOs, interrupt controllers, serial interfaces such as SPI, $I^2C$ or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. The processors (or cores) of the application circuitry 705 may be coupled with or may include memory/storage and may be configured to execute instructions stored in the memory/storage to enable various applications or operating systems to run on the system 700. In these embodiments, the processors (or cores) of the application circuitry 705 are configured to operate application software to provide a specific service to a user of the system 700. In some embodiments, the application circuitry 705 may comprise, or may be, a special-purpose processor/controller to operate according to the various embodiments herein.

As examples, the processor(s) of application circuitry 705 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 705 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 705 may be a part of a system on a chip (SoC) in which the application circuitry 705 and other components are formed into a single integrated circuit, or a single package, such as the Edison™ or Galileo™ SoC boards from Intel® Corporation. Other examples of the processor circuitry of application circuitry 605 are mentioned elsewhere in the present disclosure.

Additionally or alternatively, application circuitry 705 may include circuitry such as, but not limited to, one or more FPGAs; programmable logic devices (PLDs) such as CPLDs, HCPLDs, etc.; ASICs such as structured ASICs; PSoCs; and the like. In such embodiments, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., EPROM, EEPROM, flash memory, static memory (e.g., SRAM, anti-fuses, etc.)) used to store logic blocks, logic fabric, data, etc. in LUTs and the like.

The baseband circuitry 710 may be implemented, for example, as a solder-down substrate including one or more integrated circuits, a single packaged integrated circuit soldered to a main circuit board or a multi-chip module containing two or more integrated circuits. The baseband circuitry 710 may include circuitry such as, but not limited to, one or more single-core or multi-core processors (e.g., one or more baseband processors) or control logic to process baseband signals received from a receive signal path of the RFEMs 715, and to generate baseband signals to be provided to the RFEMs 715 via a transmit signal path. In various embodiments, the baseband circuitry 710 may implement a real-time OS (RTOS) to manage resources of the baseband circuitry 710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. The various hardware electronic elements of baseband circuitry 710 are discussed infra with regard to FIG. 9.

The RFEMs 715 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 911 of Figure XT infra), and the RFEM may be connected to multiple antennas. In alternative implementations, both mmWave and sub-mmWave radio functions may be implemented in the same physical RFEM 715, which incorporates both mmWave antennas and sub-mmWave.

The memory circuitry 720 may include any number and type of memory devices used to provide for a given amount of system memory. As examples, the memory circuitry 720 may include one or more of volatile memory including RAM, DRAM and/or SDRAM, and NVM including high-speed electrically erasable memory (commonly referred to as Flash memory), PRAM, MRAM, etc. The memory circuitry 720 may be developed in accordance with a Joint Electron Devices Engineering Council (JEDEC) low power double data rate (LPDDR)-based design, such as LPDDR2, LPDDR3, LPDDR4, or the like. Memory circuitry 720 may be implemented as one or more of solder down packaged integrated circuits, single die package, dual die package, or quad die package (Q17P), socketed memory modules, dual inline memory modules (DIMMs) including microDIMMs or MiniDIMMs, and/or soldered onto a motherboard via a ball grid array. In low power implementations, the memory circuitry 720 may be on-die memory or registers associated with the application circuitry 705. To provide for persistent storage of information such as data, applications, operating systems and so forth, memory circuitry 720 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 700 may incorporate the three-dimensional (3D) cross-point (XPOINT) memories from Intel® and Micron®.

Removable memory circuitry 723 may include devices, circuitry, enclosures/housings, ports or receptacles, etc. used to couple portable data storage devices with the platform 700. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

In some implementations, the memory circuitry 720 and/or the removable memory 723 provide persistent storage of information such as data, applications, operating systems (OS), and so forth. The persistent storage circuitry is configured to store computational logic (or "modules") in the form of software, firmware, or hardware commands to implement the techniques described herein. The computational logic may be employed to store working copies and/or permanent copies of computer programs (or data to create the computer programs) for the operation of various components of platform 700 (e.g., drivers, etc.), an operating system of platform 700, one or more applications, and/or for carrying out the embodiments discussed herein. The computational logic may be stored or loaded into memory circuitry 720 as instructions (or data to create the instructions) for execution by the application circuitry 705 to provide the functions described herein. The various elements may be implemented by assembler instructions supported by processor circuitry or high-level languages that may be compiled into such instructions (or data to create the instructions). The permanent copy of the programming instructions may be placed into persistent storage devices of persistent storage circuitry in the factory or in the field through, for example, a distribution medium (not shown), through a communication interface (e.g., from a distribution server (not shown)), or OTA.

Figure 12:
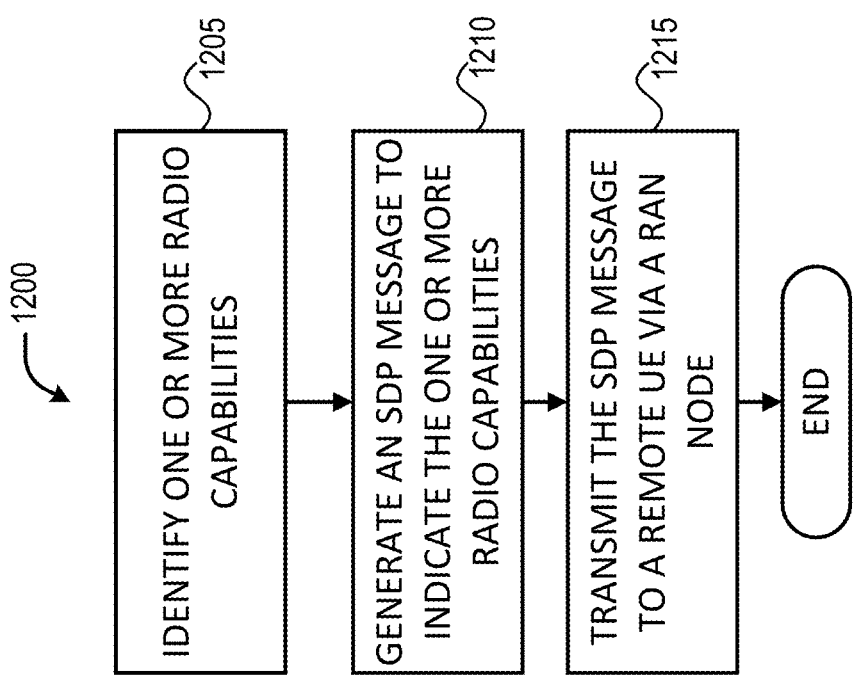
FIGS. 12-13 depict example processes for practicing the various embodiments discussed herein.
Figure 13:
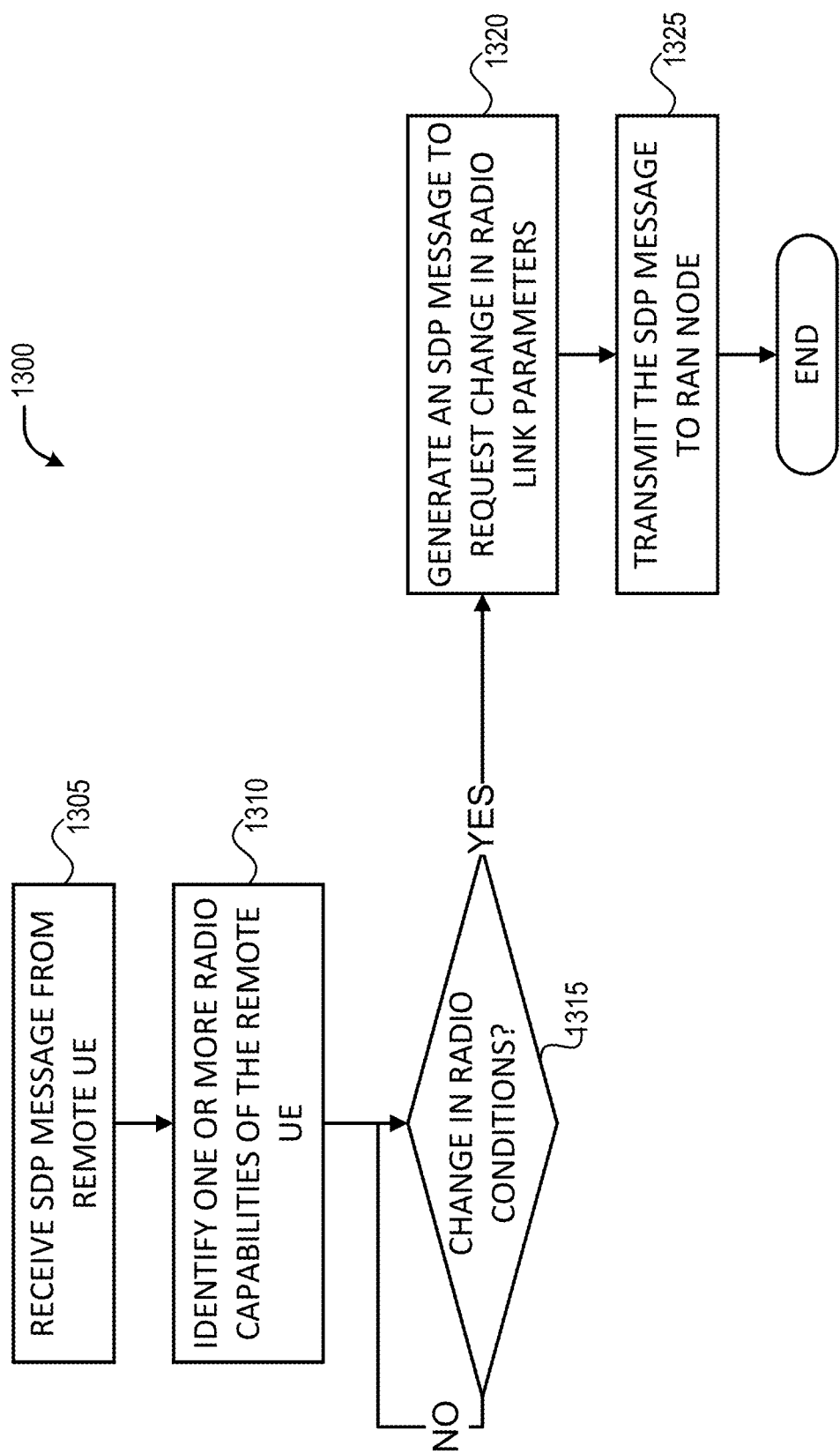

In an example, the instructions provided via the memory circuitry 720 and/or the persistent storage circuitry are embodied as one or more non-transitory computer readable storage media including program code, a computer program product (or data to create the computer program) with the computer program or data, to direct the application circuitry 705 of platform 700 to perform electronic operations in the platform 700, and/or to perform a specific sequence or flow of actions, for example, as described with respect to the flowchart(s) and block diagram(s) of operations and functionality depicted infra (see e.g., FIGS. 12-13). The application circuitry 705 accesses the one or more non-transitory computer readable storage media over the IX 706.

Although the instructions and/or computational logic have been described as code blocks included in the memory circuitry 720 and/or code blocks in the persistent storage circuitry, it should be understood that any of the code blocks may be replaced with hardwired circuits, for example, built into an FPGA, ASIC, or some other suitable circuitry. For example, where application circuitry 705 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The platform 700 may also include interface circuitry (not shown) that is used to connect external devices with the platform 700. The external devices connected to the platform 700 via the interface circuitry include sensor circuitry 721 and actuators 722, as well as removable memory devices coupled to removable memory circuitry 723.

The sensor circuitry 721 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., IR radiation detector and the like), depth sensors, ambient light sensors, ultrasonic transceivers; microphones or other like audio capture devices; etc.

Actuators 722 include devices, modules, or subsystems whose purpose is to enable platform 700 to change its state, position, and/or orientation, or move or control a mechanism or (sub)system. The actuators 722 comprise electrical and/or mechanical devices for moving or controlling a mechanism or system, and converts energy (e.g., electric current or moving air and/or liquid) into some kind of motion. The actuators 722 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 722 may include one or more electro-mechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 1000 may be configured to operate one or more actuators 722 based on one or more captured events and/or instructions or control signals received from a service provider and/or various client systems.

In some implementations, the interface circuitry may connect the platform 700 with positioning circuitry 745. The positioning circuitry 745 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-PNT IC that uses a master timing clock to perform position tracking/estimation without GNSS assistance. The positioning circuitry 745 may also be part of, or interact with, the baseband circuitry 710 and/or RFEMs 715 to communicate with the nodes and components of the positioning network. The positioning circuitry 745 may also provide position data and/or time data to the application circuitry 705, which may use the data to synchronize operations with various infrastructure (e.g., radio base stations), for turn-by-turn navigation applications, or the like In some implementations, the interface circuitry may connect the platform 700 with Near-Field Communication (NFC) circuitry 740. NFC circuitry 740 is configured to provide contactless, short-range communications based on radio frequency identification (RFID) standards, wherein magnetic field induction is used to enable communication between NFC circuitry 740 and NFC-enabled devices external to the platform 700 (e.g., an "NFC touchpoint"). NFC circuitry 740 comprises an NFC controller coupled with an antenna element and a processor coupled with the NFC controller. The NFC controller may be a chip/IC providing NFC functionalities to the NFC circuitry 740 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 740, or initiate data transfer between the NFC circuitry 740 and another active NFC device (e.g., a smartphone or an NFC-enabled POS terminal) that is proximate to the platform 700.

The driver circuitry 746 may include software and hardware elements that operate to control particular devices that are embedded in the platform 700, attached to the platform 700, or otherwise communicatively coupled with the platform 700. The driver circuitry 746 may include individual drivers allowing other components of the platform 700 to interact with or control various I/O devices that may be present within, or connected to, the platform 700. For example, driver circuitry 746 may include a display driver to control and allow access to a display device, a touchscreen driver to control and allow access to a touchscreen interface of the platform 700, sensor drivers to obtain sensor readings of sensor circuitry 721 and control and allow access to sensor circuitry 721, actuator drivers to obtain actuator positions of the actuators 722 and/or control and allow access to the actuators 722, a camera driver to control and allow access to an embedded image capture device, audio drivers to control and allow access to one or more audio devices.

The power management integrated circuitry (PMIC) 725 (also referred to as "power management circuitry 725") may manage power provided to various components of the platform 700. In particular, with respect to the baseband circuitry 710, the PMIC 725 may control power-source selection, voltage scaling, battery charging, or DC-to-DC conversion. The PMIC 725 may often be included when the platform 700 is capable of being powered by a battery 730, for example, when the device is included in a UE 101.

In some embodiments, the PMIC 725 may control, or otherwise be part of, various power saving mechanisms of the platform 700. For example, if the platform 700 is in an RRC_Connected state, where it is still connected to the RAN node as it expects to receive traffic shortly, then it may enter a state known as DRX after a period of inactivity. During this state, the platform 700 may power down for brief intervals of time and thus save power. If there is no data traffic activity for an extended period of time, then the platform 700 may transition off to an RRC Idle state, where it disconnects from the network and does not perform operations such as channel quality feedback, handover, etc. The platform 700 goes into a very low power state and it performs paging where again it periodically wakes up to listen to the network and then powers down again. The platform 700 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 730 may power the platform 700, although in some examples the platform 700 may be mounted deployed in a fixed location, and may have a power supply coupled to an electrical grid. The battery 730 may be a lithium ion battery, a metal-air battery, such as a zinc-air battery, an aluminum-air battery, a lithium-air battery, and the like. In some implementations, such as in V2X applications, the battery 730 may be a typical lead-acid automotive battery.

In some implementations, the battery 730 may be a "smart battery," which includes or is coupled with a Battery Management System (BMS) or battery monitoring integrated circuitry. The BMS may be included in the platform 700 to track the state of charge (SoCh) of the battery 730. The BMS may be used to monitor other parameters of the battery 730 to provide failure predictions, such as the state of health (SoH) and the state of function (SoF) of the battery 730. The BMS may communicate the information of the battery 730 to the application circuitry 705 or other components of the platform 700. The BMS may also include an analog-to-digital (ADC) convertor that allows the application circuitry 705 to directly monitor the voltage of the battery 730 or the current flow from the battery 730. The battery parameters may be used to determine actions that the platform 700 may perform, such as transmission frequency, network operation, sensing frequency, and the like.

A power block, or other power supply coupled to an electrical grid may be coupled with the BMS to charge the battery 730. In some examples, the power block XS 30 may be replaced with a wireless power receiver to obtain the power wirelessly, for example, through a loop antenna in the computer platform 700. In these examples, a wireless battery charging circuit may be included in the BMS. The specific charging circuits chosen may depend on the size of the battery 730, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 750 includes various I/O devices present within, or connected to, the platform 700, and includes one or more user interfaces designed to enable user interaction with the platform 700 and/or peripheral component interfaces designed to enable peripheral component interaction with the platform 700. The user interface circuitry 750 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 700. The output device circuitry may also include speakers or other audio emitting devices, printer(s), and/or the like. In some embodiments, the sensor circuitry 721 may be used as the input device circuitry (e.g., an image capture device, motion capture device, or the like) and one or more actuators 722 may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

The components shown by FIG. 7 communicate with one another using interface circuitry, which may include IX 706. The IX 706 may include any number of bus and/or IX technologies such as ISA, EISA, I²C, SPI, point-to-point interfaces, PMBus, PCI) PCIe, Intel® UPI, IAL, CAPI, Intel® QPI, UPI, Intel® OPA IX, RapidIO™ system IXs, CCIA, Gen-Z Consortium IXs, OpenCAPI IX, a Hyper-Transport interconnect, Time-Trigger Protocol (TTP) system, a FlexRay system, and/or any number of other IX technologies. The IX technology may be a proprietary bus, for example, used in an SoC based system.

According to various embodiments, the various components of the system 700 may implement an MTSI client in terminal using 3GPP access. The MTSI client in terminal may include speech decoder and/or encoder circuitry, video decoder and/or encoder circuitry, text decoder and/or encoder circuitry, session setup and control circuitry, and a packet-based network interface. The packet-based network interface handles the transport of media, which includes the encapsulation of the coded media in a transport protocol as well as handling of coded media received from the network. The packet-based network interface interfaces with 3GPP L2 for the transport of media and control data. The various decoder and/or encoder circuitries interface with the user interface circuitry 750 to obtain media data to be encoded for transmission, and to provide decoded media data to the user interface circuitry 750 to be output. The various decoder and/or encoder circuitries interface with the packet-based network interface to obtain respective encoded media data to be decoded. General control-related elements of an MTSI client for conversational media, such as SIP signaling, are handled by the session setup handling and session control circuitry. These control-related elements include, for example, usage of SDP (see e.g., RFC 4566) and SDPCap-Neg in SIP invitations for capability negotiation and media stream setup, set-up and control of the individual media streams between clients, and interactivity such as adding and dropping of media components.

Various combinations of the components of the system 700 may implement the elements of the MTSI client in terminal. In one example, all of the MTSI client in terminal elements may be implemented in the baseband circuitry 710. In a second example, the application circuitry 705 may implement the speech decoder and/or encoder circuitry, video decoder and/or encoder circuitry, text decoder and/or encoder circuitry, and the session setup and control circuitry; and the packet-based network interface may be implemented by the baseband circuitry 710.

The Multimedia Telephony Service for IMS supports simultaneous transfer of multiple media components with real-time characteristics. Media components denote the actual components that the end-user experiences. Multiple media components (including media components of the same media type) may be present in a session, where at least one of these components is present in all conversational multimedia telephony sessions. All media components can be added or dropped during an ongoing session as required either by the end-user or by controlling nodes in the network, assuming that when adding components, the capabilities of the MTSI client support the additional component. The media components may include core media components including, for example, speech (e.g., the sound that is picked up by a microphone of a first terminal (e.g., UE 101*a*), transferred from the first terminal to a second terminal (e.g., UE 101b), and played out in an earphone/loudspeaker of the second terminal; speech includes detection, transport and generation of DTMF events), video (e.g., moving image(s) captured by a camera of a first terminal (e.g., UE 101a), transmitted to a second terminal (e.g., UE 101b), and rendered on a display of the second terminal), and text (e.g., characters typed on a keyboard or drawn on a screen on a first terminal (e.g., UE 101a) and rendered in real time on the display of a second terminal (e.g., UE 101b); the flow is time-sampled so that no specific action is needed from the user to request transmission). For the purposes of the present disclosure, the terms "voice," "speech," and "audio" may be synonymous and used interchangeably. The aforementioned media components may be transported in real time over RTP with each respective payload format mapped onto one or more RTP streams (see e.g., IETF RFC 3550). Other media types than those mentioned previously may be included in a session, for example, facsimile (fax) transmission data and non-conversational media such as IMS messaging (see e.g., 3GPP TS 24.247).

The MTSI client specifies various media codecs for individual media components. A "codec" refers to program code or process/procedure for encoding or decoding a digital data stream or signal. Examples of the codecs that may be used include AMR (see e.g., 3GPP TS 26.071) including AMR-NB, AMR-WB, and EVS AMR-WB IO (i.e., AMR-WB IO included in the EVS codec); EVS; DSR Extended Advanced Front-end codec; DTMF codecs; H.224; H.281; H.263; H.264 (MPEG-4/AVC); H.265 (HEVC); H.324 and/or 3G-324M; EVRC including EVRC-WB; G.729-based codecs including CS-ACELP codecs, the G.729.1 Audio Codec; ITU-T Recommendation T.140 codecs (including presentation control functions from ISO 6429); and/or other like codecs.

In various embodiments, the application circuitry 705 and/or the baseband circuitry 710 may implement JBM circuitry. JBM denotes the actual buffer as well as any control, adaptation and media processing algorithm (excluding speech decoder) used in the management of the jitter induced in a transport channel. In some implementations, the JBM circuitry of an MTSI client with an adaptive jitter buffer may include a jitter buffer, network analyzer, adaption control logic, a decoder, and an adaptation unit. The network analyzer and the adaptation control logic, together with the information on buffer status form the actual buffer, control the JBM functionality, whereas the decoder and the adaptation unit provide the media processing functionality.

In these implementations, the jitter buffer is configured to unpack incoming RTP payloads and to store received media frames (e.g., speech or video). The buffer status may be used as input to the adaptation control logic. Furthermore, the buffer is also linked to the decoder to provide frames for decoding when requested for decoding by the decoder. The decoder may be the same or similar to the decoder circuitry mentioned previously. For example, the decoder may be a speech decoder implementing standard AMR, AMR-WB, and/or EVS speech codecs. In some implementations, the decoder may include error concealment and/or bad frame handling functionality. The decoder may be used with or without the adaptation unit. The network analyzer is configured to monitor the incoming packet stream and to collect reception statistics (e.g., jitter, packet loss) that are needed for jitter buffer adaptation. In implementations where RTCP is used, the network analyzer is also configured to maintain statistics required by the RTCP.

The adaptation control logic (also referred to as "buffer control logic") is configured to adjust playback delay, and the operation of the adaptation functionality makes decisions on the buffering delay adjustments and required media adaptation actions based on the buffer status (e.g., average buffering delay, buffer occupancy, etc.) and input from the network analyzer. External control input, including RTCP inputs/statistics from the sender, can be used, for example, to enable inter-media synchronization, to adapt the jitter buffer, and/or other external scaling requests. In these cases, the adaptation control logic provides scaling requests and scaling window information to the adaptation unit. The adaptation control logic may utilize different adaptation strategies such as fixed jitter buffer (without adaptation and time scaling), simple adaptation during comfort noise periods or buffer adaptation also during active speech. The general operation is controlled with desired proportion of frames arriving late, adaptation strategy and adaptation rate.

The adaptation unit is configured to shorten or extend the output signal length according to requests given by the adaptation control logic to enable buffer delay adjustment in a transparent manner. The adaptation is performed using the frame based or sample based time scaling on the decoder output signal during comfort noise periods only or during active speech and comfort noise. The buffer control logic may have a mechanism to limit the maximum scaling ratio. Providing a scaling window in which the targeted time scale modifications are performed improves the situation in certain scenarios (e.g., when reacting to the clock drift or to a request of inter-media (re)synchronization) by allowing flexibility in allocating the scaling request on several frames and performing the scaling on a content-aware manner. The adaptation unit may be implemented either in a separate entity from the decoder or embedded within the decoder.

Speech JBM used in MTSI may support source-controlled rate operation as well as non-source-controlled rate operation; is capable to receive the de-packetized frames out of order and present them in order for decoder consumption; is capable to receive duplicate speech frames and only present unique speech frames for decoder consumption; and is capable of handling clock drift between the encoding and decoding end-points. JBM may also be used for video frames/data wherein the overall design of the buffer may aim to minimize delay, maintain synchronization with speech, and minimize dropping of late packets. In some implementations, JBM for text may not be needed, but may still be used according to section 5 of RFC 4103 where a calculation is described for the time allowed before an extra delayed text packet may be regarded to be lost.

Figure 8:
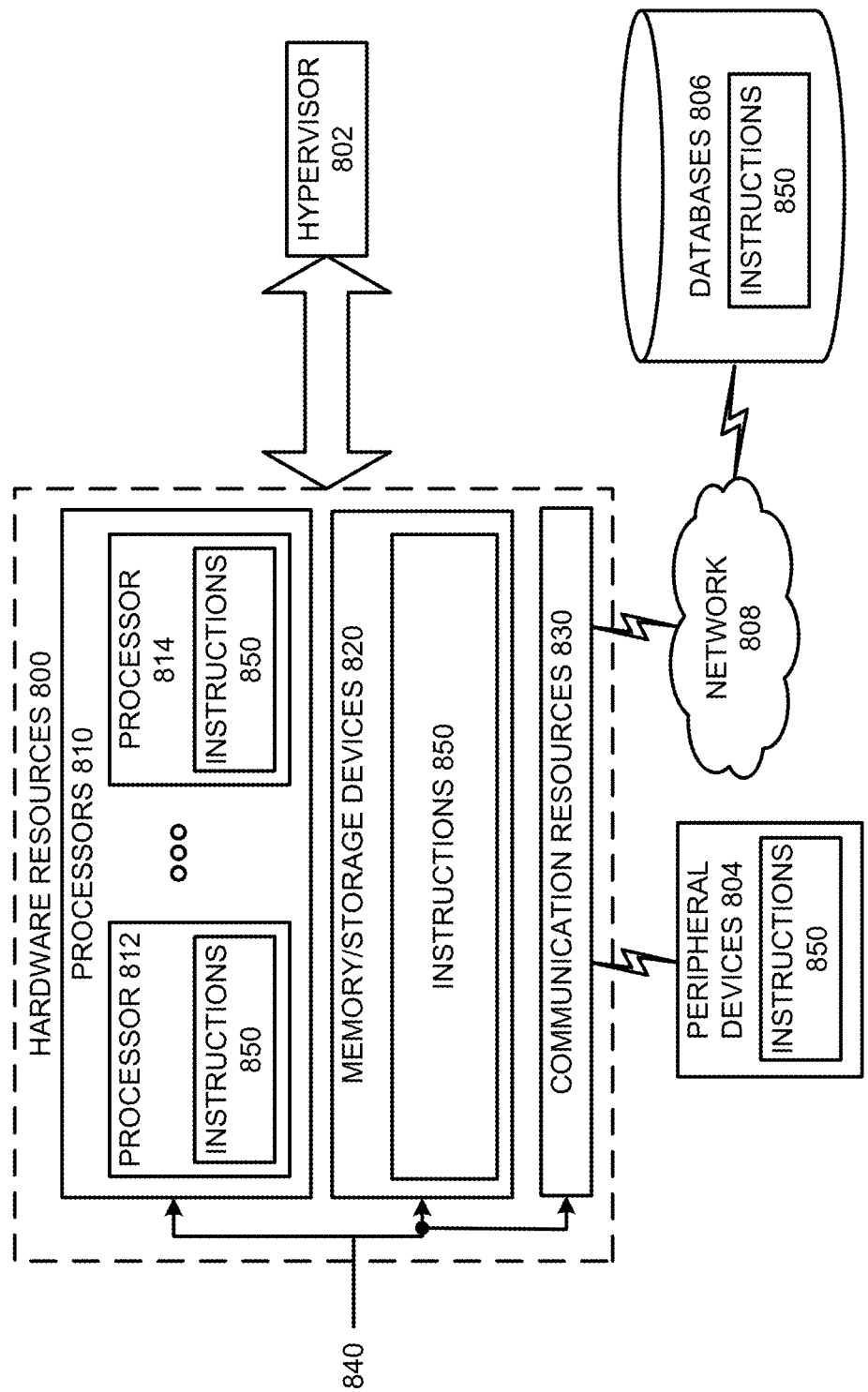
FIG. 8 depicts a block diagram illustrating components, according to some example embodiments, able to read instructions from a machine-readable or computer-readable medium (e.g., a non-transitory machine-readable storage medium) and perform any one or more of the methodologies discussed herein.

FIG. 8 illustrates components, according to some example embodiments, able to read instructions from a machine-readable or computer-readable medium (e.g., a non-transitory machine-readable storage medium) and perform any one or more of the methodologies discussed herein. Hardware resources 800 include one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 may include, for example, a processor 812 and a processor 814. The processor(s) 810 may be, for example, a CPU, a reduced instruction set computing (RISC) processor, a CISC processor, a GPU, a DSP such as a baseband processor, an ASIC, an FPGA, a RFIC, another processor (including those discussed herein), or any suitable combination thereof. The memory/storage devices 820 may include main memory, disk storage, or any suitable combination thereof. The memory/storage devices 820 may include, but are not limited to, any type of volatile or nonvolatile memory such as DRAM, SRAM, EPROM, EEPROM, Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via USB), cellular communication components, NFC components, Bluetooth® (or Bluetooth® Low Energy) components, Wi-Fi® components, and other communication components, such as those discussed herein.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Figure 9:
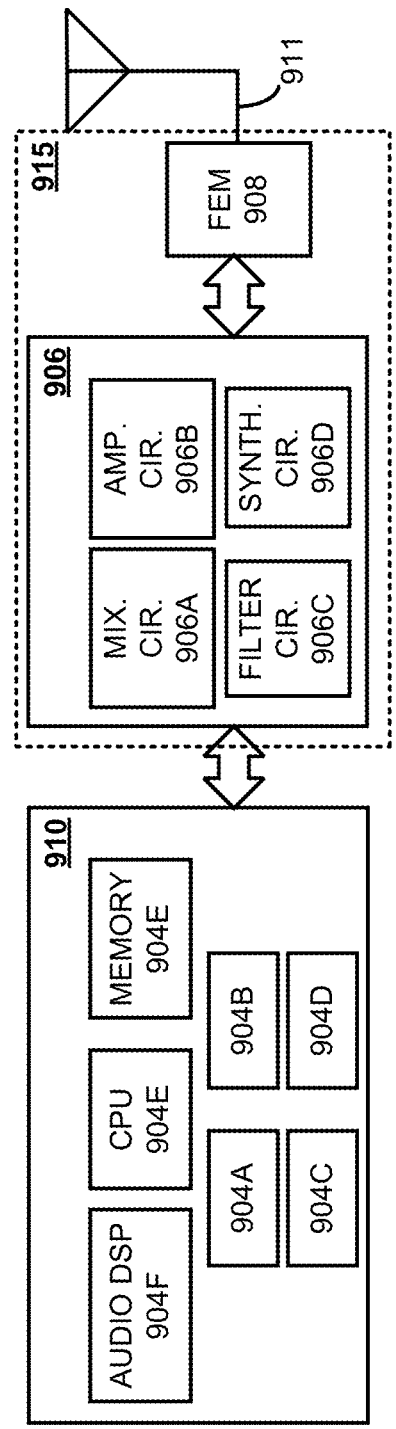
FIG. 9 depicts example components of baseband circuitry and radio frequency circuitry in accordance with various embodiments.

FIG. 9 illustrates example components of baseband circuitry 910 and RFEM 915 in accordance with various embodiments. The baseband circuitry 910 corresponds to the baseband circuitry 610 and 710 of FIGS. 6 and 7, respectively. The RFEM 915 corresponds to the RFEM 615 and 715 of FIGS. 6 and 7, respectively. As shown, the RFEMs 915 may include RF circuitry 906, front-end module (FEM) circuitry 908, antenna array 911 coupled together at least as shown.

The baseband circuitry 910 includes circuitry and/or control logic configured to carry out various radio/network protocol and radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 910 may include Fast-Fourier Transform (FFT), precoding, or constellation mapping/demapping functionality. In some embodiments, encoding/decoding circuitry of the baseband circuitry 910 may include convolution, tail-biting convolution, turbo, Viterbi, LDPC, and/or polar code encoder/decoder functionality. Embodiments of modulation/demodulation and encoder/decoder functionality are not limited to these examples and may include other suitable functionality in other embodiments. The baseband circuitry 910 is configured to process baseband signals received from a receive signal path of the RF circuitry 906 and to generate baseband signals for a transmit signal path of the RF circuitry 906. The baseband circuitry 910 is configured to interface with application circuitry 605/705 (see FIGS. 6 and 7) for generation and processing of the baseband signals and for controlling operations of the RF circuitry 906. The baseband circuitry 910 may handle various radio control functions.

The aforementioned circuitry and/or control logic of the baseband circuitry 910 may include one or more single or multi-core processors. For example, the one or more processors may include a 3G baseband processor 904A, a 4G/LTE baseband processor 904B, a 5G/NR baseband processor 904C, or some other baseband processor(s) 904D for other existing generations, generations in development or to be developed in the future (e.g., 6G, etc.). In other embodiments, some or all of the functionality of baseband processors 904A-D may be included in modules stored in the memory 904G and executed via a CPU 904E. In other embodiments, some or all of the functionality of baseband processors 904A-D may be provided as hardware accelerators (e.g., FPGAs, ASICs, etc.) loaded with the appropriate bit streams or logic blocks stored in respective memory cells. In various embodiments, the memory 904G may store program code of a real-time OS (RTOS), which when executed by the CPU 904E (or other baseband processor), is to cause the CPU 904E (or other baseband processor) to manage resources of the baseband circuitry 910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 910 includes one or more audio DSPs 904F. The audio DSP(s) 904F include elements for compression/decompression and echo cancellation and may include other suitable processing elements in other embodiments.

In some embodiments, each of the processors 904A-904E include respective memory interfaces to send/receive data to/from the memory 904G. The baseband circuitry 910 may further include one or more interfaces to communicatively couple to other circuitries/devices, such as an interface to send/receive data to/from memory external to the baseband circuitry 910; an application circuitry interface to send/receive data to/from the application circuitry 605/705 of FIGS. 6 and 7); an RF circuitry interface to send/receive data to/from RF circuitry 906 of FIG. 9; a wireless hardware connectivity interface to send/receive data to/from one or more wireless hardware elements (e.g., NFC components, Bluetooth®/Bluetooth® Low Energy components, Wi-Fi® components, and/or the like); and a power management interface to send/receive power or control signals to/from the PMIC 725.

In alternate embodiments (which may be combined with the above described embodiments), baseband circuitry 910 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 910 may include protocol processing circuitry with one or more instances of control circuitry (not shown) to provide control functions for the digital baseband circuitry and/or radio frequency circuitry (e.g., the radio front end modules 915).

Although not shown by FIG. 9, in some embodiments, the baseband circuitry 910 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 910 and/or RF circuitry 906 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 910 and/or RF circuitry 906 are part of a Wi-Fi communication system. In the second example, the protocol processing circuitry would operate Wi-Fi MAC and LLC functions. The protocol processing circuitry may include one or more memory structures (e.g., 904G) to store program code and data for operating the protocol functions, as well as one or more processing cores to execute the program code and perform various operations using the data. The baseband circuitry 910 may also support radio communications for more than one wireless protocol.

The various hardware elements of the baseband circuitry 910 discussed herein may be implemented, for example, as a solder-down substrate including one or more integrated circuits (ICs), a single packaged IC soldered to a main circuit board or a multi-chip module containing two or more ICs. In one example, the components of the baseband circuitry 910 may be suitably combined in a single chip or chipset, or disposed on a same circuit board. In another example, some or all of the constituent components of the baseband circuitry 910 and RF circuitry 906 may be implemented together such as, for example, a system on a chip (SoC) or System-in-Package (SiP). In another example, some or all of the constituent components of the baseband circuitry 910 may be implemented as a separate SoC that is communicatively coupled with and RF circuitry 906 (or multiple instances of RF circuitry 906). In yet another example, some or all of the constituent components of the baseband circuitry 910 and the application circuitry 605/705 may be implemented together as individual SoCs mounted to a same circuit board (e.g., a "multi-chip package").

In some embodiments, the baseband circuitry 910 may provide for communication compatible with one or more radio technologies. For example, in some embodiments, the baseband circuitry 910 may support communication with an E-UTRAN or other WMAN, a WLAN, a WPAN. Embodiments in which the baseband circuitry 910 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path, which may include circuitry to down-convert RF signals received from the FEM circuitry 908 and provide baseband signals to the baseband circuitry 910. RF circuitry 906 may also include a transmit signal path, which may include circuitry to up-convert baseband signals provided by the baseband circuitry 910 and provide RF output signals to the FEM circuitry 908 for transmission.

In some embodiments, the receive signal path of the RF circuitry 906 may include mixer circuitry 906*a*, amplifier circuitry 906*b* and filter circuitry 906*c*. In some embodiments, the transmit signal path of the RF circuitry 906 may include filter circuitry 906*c* and mixer circuitry 906*a*. RF circuitry 906 may also include synthesizer circuitry 906*d* for synthesizing a frequency for use by the mixer circuitry 906*a* of the receive signal path and the transmit signal path. In some embodiments, the mixer circuitry 906*a* of the receive signal path may be configured to down-convert RF signals received from the FEM circuitry 908 based on the synthesized frequency provided by synthesizer circuitry 906*d*. The amplifier circuitry 906*b* may be configured to amplify the down-converted signals and the filter circuitry 906*c* may be a low-pass filter (LPF) or band-pass filter (BPF) configured to remove unwanted signals from the down-converted signals to generate output baseband signals. Output baseband signals may be provided to the baseband circuitry 910 for further processing. In some embodiments, the output baseband signals may be zero-frequency baseband signals, although this is not a requirement. In some embodiments, mixer circuitry 906*a* of the receive signal path may comprise passive mixers, although the scope of the embodiments is not limited in this respect.

In some embodiments, the mixer circuitry 906*a* of the transmit signal path may be configured to up-convert input baseband signals based on the synthesized frequency provided by the synthesizer circuitry 906*d* to generate RF output signals for the FEM circuitry 908. The baseband signals may be provided by the baseband circuitry 910 and may be filtered by filter circuitry 906*c*. In some embodiments, the mixer circuitry 906*a* of the receive signal path and the mixer circuitry 906*a* of the transmit signal path may include two or more mixers and may be arranged for quadrature downconversion and upconversion, respectively. In some embodiments, the mixer circuitry 906*a* of the receive signal path and the mixer circuitry 906*a* of the transmit signal path may include two or more mixers and may be arranged for image rejection (e.g., Hartley image rejection). In some embodiments, the mixer circuitry 906*a* of the receive signal path and the mixer circuitry 906*a* of the transmit signal path may be arranged for direct downconversion and direct upconversion, respectively. In some embodiments, the mixer circuitry 906*a* of the receive signal path and the mixer circuitry 906*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 910 may include a digital baseband interface to communicate with the RF circuitry 906.

In some dual-mode embodiments, a separate radio IC circuitry may be provided for processing signals for each spectrum, although the scope of the embodiments is not limited in this respect. In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider. The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional NN+1 synthesizer. In some embodiments, frequency input may be provided by a voltage controlled oscillator (VCO), although that is not a requirement. Divider control input may be provided by either the baseband circuitry 910 or the application circuitry 605/705 depending on the desired output frequency. In some embodiments, a divider control input (e.g., N) may be determined from a look-up table based on a channel indicated by the application circuitry 605/705.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle. In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path, which may include circuitry configured to operate on RF signals received from antenna array 911, amplify the received signals and provide the amplified versions of the received signals to the RF circuitry 906 for further processing. FEM circuitry 908 may also include a transmit signal path, which may include circuitry configured to amplify signals for transmission provided by the RF circuitry 906 for transmission by one or more of antenna elements of antenna array 911. In various embodiments, the amplification through the transmit or receive signal paths may be done solely in the RF circuitry 906, solely in the FEM circuitry 908, or in both the RF circuitry 906 and the FEM circuitry 908. In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission by one or more antenna elements of the antenna array 911.

The antenna array 911 comprises one or more antenna elements, each of which is configured convert electrical signals into radio waves to travel through the air and to convert received radio waves into electrical signals. For example, digital baseband signals provided by the baseband circuitry 910 is converted into analog RF signals (e.g., modulated waveform) that will be amplified and transmitted via the antenna elements of the antenna array 911 including one or more antenna elements (not shown). The antenna elements may be omnidirectional, direction, or a combination thereof. The antenna elements may be formed in a multitude of arranges as are known and/or discussed herein. The antenna array 911 may comprise microstrip antennas or printed antennas that are fabricated on the surface of one or more printed circuit boards. The antenna array 911 may be formed in as a patch of metal foil (e.g., a patch antenna) in a variety of shapes, and may be coupled with the RF circuitry 906 and/or FEM circuitry 908 using metal transmission lines or the like.

Processors of the application circuitry 605/705 and processors of the baseband circuitry 910 may be used to execute elements of one or more instances of a protocol stack. For example, processors of the baseband circuitry 910, alone or in combination, may be used execute Layer 3, Layer 2, or Layer 1 functionality, while processors of the application circuitry 605/705 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail infra.

Figure 10:
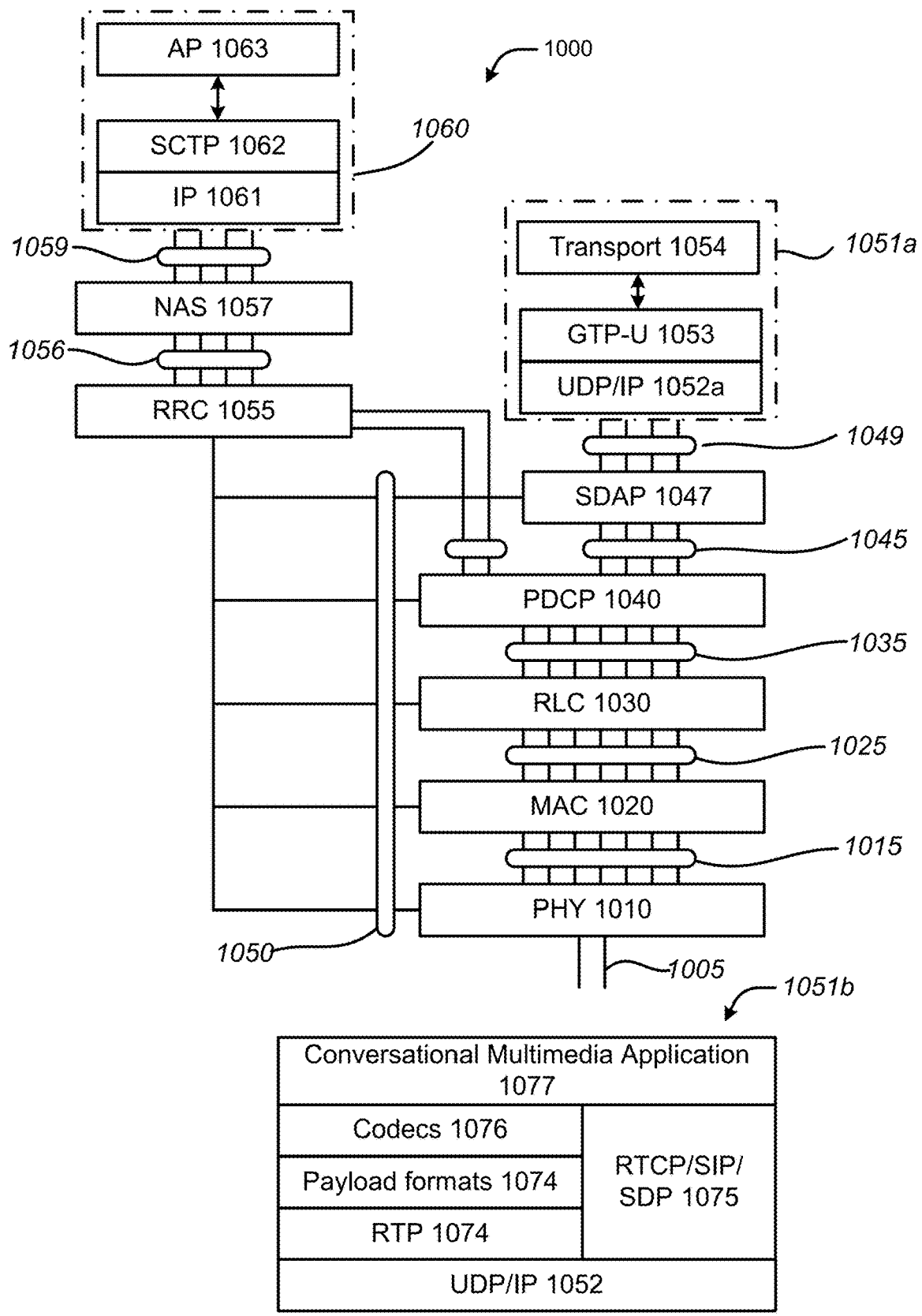
FIG. 10 is an illustration of various protocol functions that may be used for various protocol stacks in accordance with various embodiments.

FIG. 10 illustrates various protocol functions that may be implemented in a wireless communication device according to various embodiments. In particular, FIG. 10 includes protocol stack 1000 showing interconnections between various protocol layers/entities. The following description of FIG. 10 is provided for various protocol layers/entities that operate in conjunction with the 5G/NR system standards and LTE system standards, but some or all of the aspects of FIG. 10 may be applicable to other wireless communication network systems as well. The protocol layers of protocol stack 1000 may include one or more of PHY 1010, MAC 1020, RLC 1030, PDCP 1040, SDAP 1047, RRC 1055, and NAS 1057, in addition to other higher layer functions not illustrated. The protocol layers may include one or more service access points (e.g., items 1059, 1056, 1050, 1049, 1045, 1035, 1025, and 1015 in FIG. 10) that may provide communication between two or more protocol layers.

The PHY 1010 may transmit and receive physical layer signals 1005 that may be received from or transmitted to one or more other communication devices. The physical layer signals 1005 may comprise one or more physical channels, such as those discussed herein. The PHY 1010 may further perform link adaptation or adaptive modulation and coding (AMC), power control, cell search (e.g., for initial synchronization and handover purposes), and other measurements used by higher layers, such as the RRC 1055. The PHY 1010 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1010 may process requests from and provide indications to an instance of MAC 1020 via one or more PHY-SAP 1015. According to some embodiments, requests and indications communicated via PHY-SAP 1015 may comprise one or more transport channels.

Instance(s) of MAC 1020 may process requests from, and provide indications to, an instance of RLC 1030 via one or more MAC-SAPs 1025. These requests and indications communicated via the MAC-SAP 1025 may comprise one or more logical channels. The MAC 1020 may perform mapping between the logical channels and transport channels, multiplexing of MAC SDUs from one or more logical channels onto TBs to be delivered to PHY 1010 via the transport channels, de-multiplexing MAC SDUs to one or more logical channels from TBs delivered from the PHY 1010 via transport channels, multiplexing MAC SDUs onto TBs, scheduling information reporting, error correction through HARQ, and logical channel prioritization.

Instance(s) of MAC 1020 may also perform a RAN-assisted codec adaptation or ANBR (also referred to as a "recommended bit rate procedure"). The recommended bit rate procedure is used to provide the MAC 1020 implemented by a UE 101 with information about the bit rate (e.g., for PHY 1010) which the RAN node 111 (e.g., eNB or gNB) recommends. An averaging window of default value 2000 ms may apply as specified in 3GPP TS 26.114. The RAN node 111 may transmit the recommended bit rate MAC CE (see e.g., FIG. 11) to the MAC 1020 of the UE 101 to indicate the recommended bit rate for the UE 101 for a specific logical channel and a specific direction (either uplink or downlink). Upon reception of a recommended bit rate MAC CE, the MAC 1020 may indicate, to upper layers, the recommended bit rate for the indicated logical channel and direction. The MAC 1020 may request the RAN node 111 to indicate the recommended bit rate for a specific logical channel and a specific direction. If the MAC 1020 is requested by upper layers to query the RAN node 111 for the recommended bit rate for a logical channel and for a direction (e.g., for uplink or downlink), the MAC 1020 may trigger a recommended bit rate query for the logical channel, direction, and desired bit rate if/when a recommended bit rate query for the logical channel and direction has not been triggered. If the MAC 1020 has UL resources allocated for new transmission the MAC 1020 may, for each recommended bit rate query that the recommended bit rate procedure determines has been triggered and not cancelled, instruct the multiplexing and assembly entity within the MAC 1020 to generate the recommended bit rate MAC CE for the logical channel and the direction of the recommended bit rate query; start the bitRateQueryProhibitTimer for the logical channel and the direction of the recommended bit rate query; and cancel the recommended bit rate query when the bitRateQueryProhibitTimer for the logical channel and the direction of the recommended bit rate query is configured, and it is not running, and when the MAC 1020 has UL resources allocated for new transmission and the allocated UL resources can accommodate a recommended bit rate MAC CE plus its subheader as a result of LCP.

Figure 11:
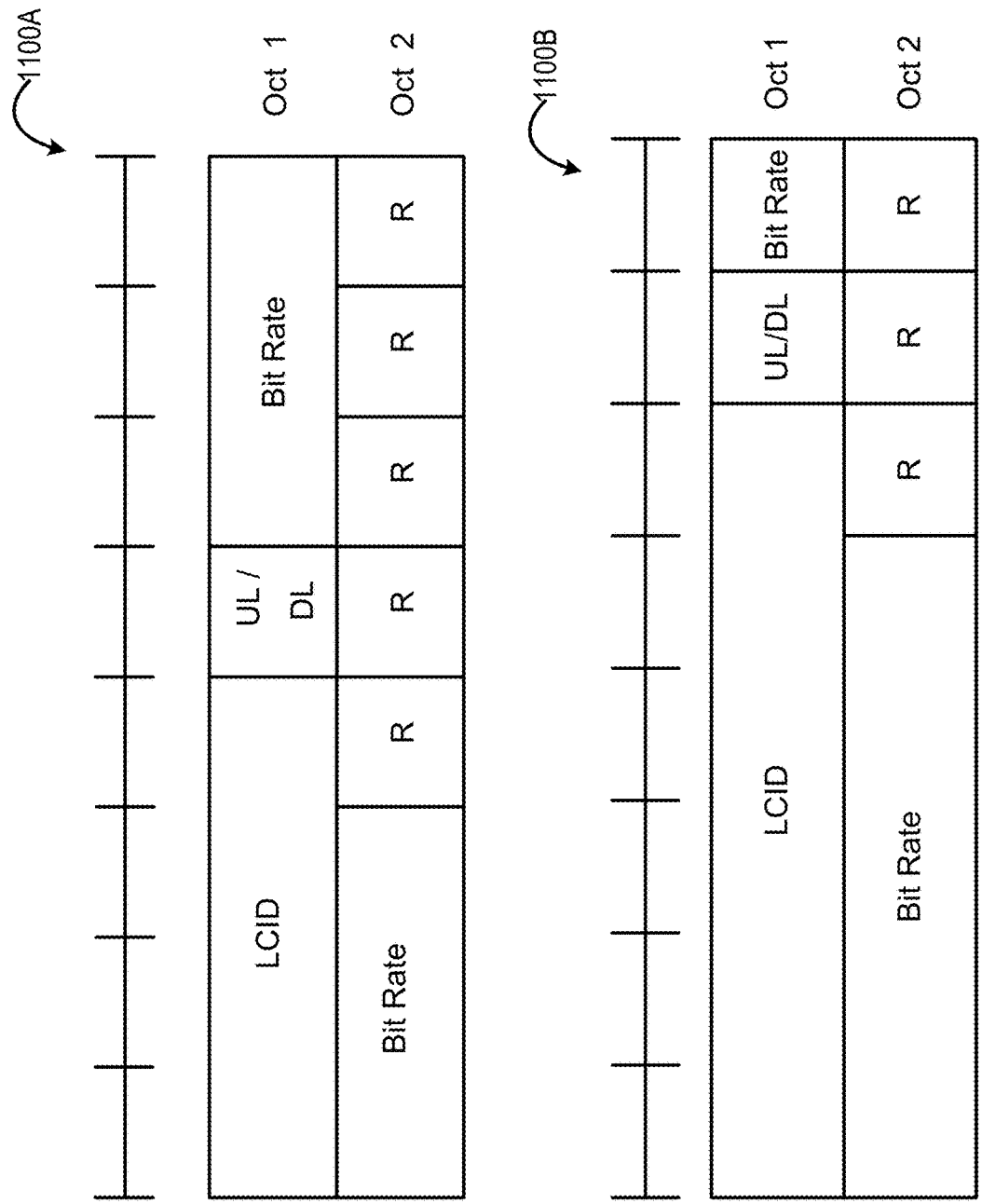
FIG. 11 depicts example bit rate recommendation MAC CEs according to various embodiments.

FIG. 11 depicts an example recommended bit rate MAC CE 1100A and an example recommended bit rate MAC CE 1100B according to various embodiments. The MAC CE 1100A is used to convey recommended bit rate queries and recommended bit rate messages in LTE implementations and the MAC CE 1100B is used to convey recommended bit rate queries and recommended bit rate messages in NR implementations. Recommended bit rate messages are used to indicate the recommended bit rate for the UE 101 for a specific logical channel and a specific direction (either UL or DL). Recommended bit rate queries are used to query or otherwise request a recommended bit rate for a specific logical channel and a specific direction from the RAN node 111. Recommended bit rate queries are also used to indicate a desired bit rate or radio level adaptation.

The recommended bit rate MAC CEs 1100A-B are each identified by a MAC PDU subheader with a first LCID value for bit rate recommendation message from the RAN node 111 to the UE 101 (e.g., over the DL-SCH) and a second LCID value for a bit rate recommendation query message from the UE 101 to the RAN node 111 (e.g., over an UL-SCH). For LTE implementations, the first LCID value may be "10110," and the second LCID value may be "10100." For NR implementations, the first LCID value may be "47," and the second LCID value may be "53." The MAC CEs 1100A-B may each have a fixed size and may include two octets. For each MAC CE 1100A-B the first octet (oct 1) includes an LCID field, Uplink/Downlink (UL/DL) field, and part of a bit rate field; and the second octet (oct 2) includes a remaining portion of the bit rat field and a plurality of reserved bit (R) fields. The LCID field indicates the identity of the logical channel for which the recommended bit rate or the recommended bit rate query is applicable. The length of the LCID field is 4 bits for MAC CE 1100A and the LCID field for MAC CE 1100B is 6 bits. The UL/DL field indicates whether the recommended bit rate or the recommended bit rate query applies to uplink or downlink. For both MAC CE 1100A and 1100B the length of the UL/DL field is 1 bit. For both MAC CE 1100A and 1100B the UL/DL field is set to "0" to indicate downlink and set to "1" to indicate uplink. The bit rate field indicates a value of the recommended bit rate for the bit rate recommendation message, and indicates a value of a desired bit rate for the bit rate recommendation query. For both MAC CE 1100A and 1100B the length of the bit rate field is 6 bits. Each of the R fields includes a reserved bit, which is/are set to "0".

Referring back to FIG. 10, instance(s) of RLC 1030 may process requests from and provide indications to an instance of PDCP 1040 via one or more radio link control service access points (RLC-SAP) 1035. These requests and indications communicated via RLC-SAP 1035 may comprise one or more RLC channels. The RLC 1030 may operate in a plurality of modes of operation, including: TM, UM, and AM. The RLC 1030 may execute transfer of upper layer protocol data units (PDUs), error correction through automatic repeat request (ARQ) for AM data transfers, and concatenation, segmentation and reassembly of RLC SDUs for UM and AM data transfers. The RLC 1030 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1040 may process requests from and provide indications to instance(s) of RRC 1055 and/or instance(s) of SDAP 1047 via one or more packet data convergence protocol service access points (PDCP-SAP) 1045. These requests and indications communicated via PDCP-SAP 1045 may comprise one or more radio bearers. The PDCP 1040 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1047 may process requests from and provide indications to one or more higher layer protocol entities via one or more SDAP-SAP 1049. These requests and indications communicated via SDAP-SAP 1049 may comprise one or more QoS flows. The SDAP 1047 may map QoS flows to DRBs, and vice versa, and may also mark QFIs in DL and UL packets. A single SDAP entity 1047 may be configured for an individual PDU session. In the UL direction, the NG-RAN 110 may control the mapping of QoS Flows to DRB(s) in two different ways, reflective mapping or explicit mapping. For reflective mapping, the SDAP 1047 of a UE 101 may monitor the QFIs of the DL packets for each DRB, and may apply the same mapping for packets flowing in the UL direction. For a DRB, the SDAP 1047 of the UE 101 may map the UL packets belonging to the QoS flows(s) corresponding to the QoS flow ID(s) and PDU session observed in the DL packets for that DRB. To enable reflective mapping, the NG-RAN 110 may mark DL packets over the Uu interface with a QoS flow ID. The explicit mapping may involve the RRC 1055 configuring the SDAP 1047 with an explicit QoS flow to DRB mapping rule, which may be stored and followed by the SDAP 1047. In embodiments, the SDAP 1047 may only be used in NR implementations and may not be used in LTE implementations.

The RRC 1055 may configure, via one or more management service access points (M-SAP), aspects of one or more protocol layers, which may include one or more instances of PHY 1010, MAC 1020, RLC 1030, PDCP 1040 and SDAP 1047. In embodiments, an instance of RRC 1055 may process requests from and provide indications to one or more NAS entities 1057 via one or more RRC-SAPs 1056. The main services and functions of the RRC 1055 may include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBS may comprise one or more IEs, which may each comprise individual data fields or data structures.

According to various embodiments, RRC 1055 is used to configure the UE 101 with specific parameters, and for the UE 101 to provide the network with UE-specific parameters. For example, the RRC 1055 of a RAN node 111 may transmit a suitable RRC message (e.g., RRC connection reconfiguration message, RRC setup message during an RRC connection establishment procedure, or the like) to the UE 101, where the RRC message includes one or more IEs, which is a structural element containing one or more fields where each field includes parameters, content, and/or data. The parameters, content, and/or data included in the one or more fields of the IEs are used to configure the UE 101 to operate in a particular manner. Additionally, the UE 101 may send a suitable RRC message to indicate supported radio capabilities, and to request a change to one or more radio link parameters as discussed herein.

As an example, a UE assistance information (UEAssistanceInformation) message may be used to indicate UE assistance information to the network, such as a RAN 110. The purpose of the UEAssistanceInformation procedure for LTE implementations is to inform an E-UTRAN 110 of the UE's 101 power saving preference and SPS assistance information, maximum PDSCH/PUSCH bandwidth configuration preference, overheating assistance information, or the UE's 101 delay budget report carrying desired increment/decrement in the Uu air interface delay or connected mode DRX cycle length and for BL UEs or UEs in CE of the RLM event ("early-out-of-sync" or "early-in-sync") and RLM information. Upon configuring the UE 101 to provide power preference indications, the E-UTRAN 110 may consider that the UE 101 does not prefer a configuration primarily optimized for power saving until the UE 101 explicitly indicates otherwise. Table 4 shows an example LTE-based UEAssistanceInformation message, and table 5 shows field descriptions for the LTE-based UEAssistanceInformation message.

TABLE 4

UEAssistanceInformation message (LTE implementations)

```
-- ASN1START
UEAssistanceInformation-r11 ::=      SEQUENCE {
    criticalExtensions               CHOICE {
        c1                                CHOICE {
            ueAssistanceInformation-r11         UEAssistanceInformation-r11-IEs,
            spare3 NULL, spare2 NULL, spare1 NULL
        },
        criticalExtensionsFuture          SEQUENCE { }
    }
}
UEAssistanceInformation-r11-IEs ::=  SEQUENCE {
    powerPrefIndication-r11              ENUMERATED {normal, lowPowerConsumption}
    OPTIONAL,
    lateNonCriticalExtension             OCTET STRING                          OPTIONAL,
    nonCriticalExtension                 UEAssistanceInformation-v1430-IEs     OPTIONAL
}
UEAssistanceInformation-v1430-IEs ::= SEQUENCE {
    bw-Preference-r14                    BW-Preference-r14                     OPTIONAL,
    sps-AssistanceInformation-r14        SEQUENCE {
        trafficPatternInfoListSL-r14         TrafficPatternInfoList-r14        OPTIONAL,
```

TABLE 4-continued

UEAssistanceInformation message (LTE implementations)

```
        trafficPatternInfoListUL-r14      TrafficPatternInfoList-r14           OPTIONAL
    }            OPTIONAL,
    rlm-Report-r14                        SEQUENCE {
        rlm-Event-r14                         ENUMERATED {earlyOutOfSync, earlyInSync},
        excessRep-MPDCCH-r14                      ENUMERATED {excessRep1, excessRep2}
OPTIONAL
    }                                                                          OPTIONAL,
    delayBudgetReport-r14                 DelayBudgetReport-r14                OPTIONAL,
    nonCriticalExtension                  UEAssistanceInformation-v1450-IEs    OPTIONAL
}
UEAssistanceInformation-v1450-IEs ::=    SEQUENCE {
    overheatingAssistance-r14             OverheatingAssistance-r14            OPTIONAL,
    nonCriticalExtension                  UEAssistanceInformation-v1530-IEs    OPTIONAL
}
UEAssistanceInformation-v1530-IEs ::=    SEQUENCE {
    sps-AssistanceInformation-v1530           SEQUENCE {
        trafficPatternInfoListSL-v1530            TrafficPatternInfoList-v1530
    }            OPTIONAL,
    nonCriticalExtension                  SEQUENCE { }                         OPTIONAL
}
BW-Preference-r14 ::= SEQUENCE {
    dl-Preference-r14      ENUMERATED {mhz1dot4, mhz5, mhz20 }                 OPTIONAL,
    ul-Preference-r14      ENUMERATED {mhz1dot4, mhz5}                         OPTIONAL
}
TrafficPatternInfoList-r14 ::= SEQUENCE (SIZE (1..maxTrafficPattern-r14)) OF TrafficPatternInfo-r14
TrafficPatternInfo-r14 ::=    SEQUENCE {
    trafficPeriodicity-r14            ENUMERATED {
                                          sf20, sf50, sf100, sf200, sf300, sf400, sf500,
                                          sf600, sf700, sf800, sf900, sf1000},
    timingOffset-r14                  INTEGER (0..10239),
    priorityInfoSL-r14                SL-Priority-r13                          OPTIONAL,
    logicalChannelIdentityUL-r14      INTEGER (3..10)                          OPTIONAL,
    messageSize-r14                   BIT STRING (SIZE (6))
}
TrafficPatternInfoList-v1530 ::= SEQUENCE (SIZE (1..maxTrafficPattern-r14)) OF TrafficPatternInfo-v1530
TrafficPatternInfo-v1530 ::= SEQUENCE {
    trafficDestination-r15            SL-DestinationIdentity-r12               OPTIONAL,
    reliabilityInfoSL-r15             SL-Reliability-r15                       OPTIONAL
}
DelayBudgetReport-r14::= CHOICE {
    type1                             ENUMERATED {
                                          msMinus1280, msMinus640, msMinus320, msMinus160,
                                          msMinus80, msMinus60, msMinus40, msMinus20, ms0,
ms20,                                         ms40, ms60, ms80, ms160, ms320, ms640,
ms1280},
    type2                             ENUMERATED {
                                          msMinus192, msMinus168, msMinus144, msMinus120,
                                          msMinus96, msMinus72, msMinus48, msMinus24, ms0,
ms24,                                         ms48, ms72, ms96, ms120, ms144, ms168, ms192}
}
OverheatingAssistance-r14 ::=   SEQUENCE {
        reducedUE-Category            SEQUENCE {
            reducedUE-CategoryDL          INTEGER (0..19),
            reducedUE-CategoryUL          INTEGER (0..21)
        }            OPTIONAL,
        reducedMaxCCs                 SEQUENCE {
            reducedCCsDL                  INTEGER (0..31),
            reducedCCsUL                  INTEGER (0..31)
        }            OPTIONAL
}
-- ASN1STOP
```

TABLE 5

UEAssistanceInformation field descriptions (LTE implementations)
UEAssistanceInformation field descriptions delayBudgetReport
Indicates the UE-preferred adjustment to connected mode DRX or coverage enhancement configuration.
dl-Preference
Indicates UE's preference on configuration of maximum PDSCH bandwidth. The value mhz1dot4 corresponds to CE mode usage in 1.4 MHz bandwidth, mhz5 corresponds to CE mode usage in 5 MHz bandwidth, and mhz20 corresponds to CE mode usage in 20 MHz bandwidth or normal coverage.
excessRep-MPDCCH
Indicates the excess number of repetitions on MPDCCH. Value excessRep1 and excessRep2 indicate the excess TABLE 5-continued UEAssistanceInformation field descriptions (LTE implementations)
UEAssistanceInformation field descriptions number of repetitions defined in TS 36.133.
logicalChannelIdentityUL
Indicates the logical channel identity associated with the reported traffic pattern in the uplink logical channel.
messageSize
Indicates the maximum TB size based on the observed traffic pattern. The value refers to the index of TS 36.321, table 6.1.3.1-1.
powerPrefIndication
Value lowPowerConsumption indicates the UE prefers a configuration that is primarily optimised for power saving. Otherwise the value is set to normal.
priorityInfoSL
Indicates the traffic priority (i.e., PPPP) associated with the reported traffic pattern for V2X SL communication.
reducedCCsDL
Indicates the UE's preference on reduced configuration corresponding to the maximum number of downlink SCells indicated by the field, to address overheating. This maximum number includes both SCells of E-UTRA and PSCell/SCells of NR in EN-DC.
reducedCCsUL
Indicates the UE's preference on reduced configuration corresponding to the maximum number of uplink SCells indicated by the field, to address overheating. This maximum number includes both SCells of E-UTRA and PSCell/SCells of NR in EN-DC.
reducedUE-CategoryDL, reducedUE-CategoryUL
Indicates that UE prefers a configuration corresponding to the reduced UE category, to address overheating. The reduced UE DL category and reduced UE UL category should be indicated according to supported combinations for UE UL and DL Categories, see TS 36.306, Table 4.1A-6.
reliabilityInfoSL
Indicates the traffic reliability (i.e., PPPR) associated with the reported traffic pattern for V2X SL communication.
rlm-Event
This field provides the RLM event ("early-out-of-sync" or "early-in-sync").
rlm-Report
This field provides the RLM report for BL UEs and UEs in CE.
sps-AssistanceInformation
Indicates the UE assistance information to assist E-UTRAN to configure SPS.
timingOffset
This field indicates the estimated timing for a packet arrival in a SL/UL logical channel. Specifically, the value indicates the timing offset with respect to subframe#0 of SFN#0 in milliseconds.
trafficDestination
Indicates the destination associated with the reported traffic pattern for V2X SL communication.
trafficPatternInfoListSL
This field provides the traffic characteristics of SL logical channel(s) that are setup for V2X SL communication. If trafficPatternInfoListSL-v1530 is included, it includes the same number of entries, and listed in the same order, as in trafficPatternInfoListSL-r14.
trafficPatternInfoListUL
This field provides the traffic characteristics of uplink logical channel(s).
trafficPeriodicity
This field indicates the estimated data arrival periodicity in a SL/UL logical channel. Value sf20 corresponds to 20 ms, sf50 corresponds to 50 ms and so on.
type1
Indicates the preferred amount of increment/decrement to the connected mode DRX cycle length with respect to the current configuration. Value in number of milliseconds. Value ms40 corresponds to 40 milliseconds, msMinus40 corresponds to −40 milliseconds and so on.
type2
Indicates the preferred amount of increment/decrement to the coverage enhancement configuration with respect to the current configuration so that the Uu air interface delay changes by the indicated amount. Value in number of milliseconds. Value ms24 corresponds to 24 milliseconds, msMinus24 corresponds to −24 milliseconds and so on.
ul-Preference
Indicates UE's preference on configuration of maximum PUSCH bandwidth. The value mhz1dot4 corresponds to CE mode usage in 1.4 MHz bandwidth, and mhz5 corresponds to CE mode usage in 5 MHz bandwidth.

When the UE 101 is capable of providing power preference indications in RRC_CONNECTED, the UE 101 may initiate the UEAssistanceInformation procedure in several cases including upon being configured to provide power preference indications and upon change of power preference. When the UE 101 is capable of providing SPS assistance information in RRC_CONNECTED, the UE 101 may initiate the UEAssistanceInformation procedure in several cases including upon being configured to provide SPS assistance information and upon change of SPS assistance information. When the UE 101 is capable of providing delay budget report in RRC_CONNECTED, the UE 101 may initiate the UEAssistanceInformation procedure in several cases, including upon being configured to provide delay budget report and upon change of delay budget preference. When the UE 101 is capable of CE mode and providing maximum PDSCH/PUSCH bandwidth preference in RRC_CONNECTED, the UE 101 may initiate the UEAssistanceInformation procedure upon being configured to provide maximum PDSCH/PUSCH bandwidth preference and/or upon change of maximum PDSCH/PUSCH bandwidth preference. When the UE 101 is capable of providing overheating assistance information in RRC_CONNECTED, the UE 101 may initiate the UEAssistanceInformation procedure if it was configured to do so, upon detecting internal overheating, or upon detecting that it is no longer experiencing an overheating condition. In LTE implementations, the UEAssistanceInformation message may be included in an UL-DCCH-Message. The UL-DCCH-Message class is the set of RRC messages that may be sent from the UE to the E-UTRAN or from the RN to the E-UTRAN on the uplink DCCH logical channel. An example LTE-based UL-DCCH-Message is shown by table 6.

TABLE 6

UL-DCCH-Message (LTE implementations)

```
-- ASN1START
UL-DCCH-Message ::= SEQUENCE {
    message           UL-DCCH-MessageType
}
UL-DCCH-MessageType ::= CHOICE {
    c1                          CHOICE {
        csfbParametersRequestCDMA2000           CSFBParametersRequestCDMA2000,
        measurementReport                       MeasurementReport,
        rrcConnectionReconfigurationComplete    RRCConnectionReconfigurationComplete,
        rrcConnectionReestablishmentComplete    RRCConnectionReestablishmentComplete,
        rrcConnectionSetupComplete              RRCConnectionSetupComplete,
        securityModeComplete                    SecurityModeComplete,
        securityModeFailure                     SecurityModeFailure,
        ueCapabilityInformation                 UECapabilityInformation,
        ulHandoverPreparationTransfer           ULHandoverPreparationTransfer,
        ulInformationTransfer                   ULInformationTransfer,
        counterCheckResponse                    CounterCheckResponse,
        ueInformationResponse-r9                UEInformationResponse-r9,
        proximityIndication-r9                  ProximityIndication-r9,
        rnReconfigurationComplete-r10           RNReconfigurationComplete-r10,
        mbmsCountingResponse-r10                MBMSCountingResponse-r10,
        interFreqRSTDMeasurementIndication-r10  InterFreqRSTDMeasurementIndication-r10
    },
    messageClassExtensionCHOICE {
        c2                          CHOICE {
            ueAssistanceInformation-r11         UEAssistanceInformation-r11,
            inDeviceCoexIndication-r11          InDeviceCoexIndication-r11,
            mbmsInterestIndication-r11          MBMSInterestIndication-r11,
            scgFailureInformation-r12           SCGFailureInformation-r12,
            sidelinkUEInformation-r12           SidelinkUEInformation-r12,
            wlanConnectionStatusReport-r13      WLANConnectionStatusReport-r13,
            rrcConnectionResumeComplete-r13     RRCConnectionResumeComplete-r13,
            ulInformationTransferMRDC-r15       ULInformationTransferMRDC-r15,
            scgFailureInformationNR-r15         SCGFailureInformationNR-r15,
            measReportAppLayer-r15              MeasReportAppLayer-r15,
            failureInformation-r15              FailureInformation-r15,
            spare5 NULL, spare4 NULL, spare3 NULL, spare2 NULL, spare1 NULL
        },
        messageClassExtensionFuture-r11     SEQUENCE { }
    }
}
-- ASN1STOP
```

The purpose of the UEAssistanceInformation procedure for NR implementations is to inform the network of the UE's 101/101 delay budget report carrying desired increment/decrement in the Uu air interface delay, connected mode DRX cycle length or overheating assistance information. Table 7 shows an example NR-based UEAssistanceInformation message, and table 8 shows field descriptions for the NR-based UEAssistanceInformation message.

TABLE 7

UEAssistanceInformation message (NR implementations)

```
-- ASN1START
-- TAG-UEASSISTANCEINFORMATION-START
UEAssistanceInformation ::=     SEQUENCE {
    criticalExtensions    CHOICE {
        ueAssistanceInformation   UEAssistanceInformation-IEs,
        criticalExtensionsFuture     SEQUENCE { }
    }
}
UEAssistanceInformation-IEs ::=      SEQUENCE {
    delayBudgetReport      DelayBudgetReport      OPTIONAL,
    lateNonCriticalExtension   OCTET STRING         OPTIONAL,
    nonCriticalExtension     UEAssistanceInformation-v1540-IEs OPTIONAL
}
DelayBudgetReport::=    CHOICE {
    type1             ENUMERATED {
                msMinus1280, msMinus640, msMinus320, msMinus160,msMinus80, msMinus60, msMinus40,
                msMinus20, ms0, ms20,ms40, ms60, ms80, ms160, ms320, ms640, ms1280},
    ...
}
UEAssistanceInformation-v1540-IEs ::= SEQUENCE {
    overheatingAssistance     OverheatingAssistance     OPTIONAL,
    nonCriticalExtension    SEQUENCE { }        OPTIONAL
}
```

TABLE 7-continued

UEAssistanceInformation message (NR implementations)

```
OverheatingAssistance ::=     SEQUENCE {
    reducedMaxCCs       SEQUENCE {
        reducedCCsDL    INTEGER (0..31),
        reducedCCsUL    INTEGER (0..31)
    } OPTIONAL,
    reducedMaxBW-FR1        SEQUENCE {
        reducedBW-FR1-DL    ReducedAggregatedBandwidth,
        reducedBW-FR1-UL    ReducedAggregatedBandwidth
    } OPTIONAL,
    reducedMaxBW-FR2        SEQUENCE {
        reducedBW-FR2-DL    ReducedAggregatedBandwidth,
        reducedBW-FR2-UL    ReducedAggregatedBandwidth
    } OPTIONAL,
    reducedMaxMIMO-LayersFR1       SEQUENCE {
        reducedMIMO-LayersFR1-DL   MIMO-LayersDL,
        reducedMIMO-LayersFR1-UL   MIMO-LayersUL
    } OPTIONAL,
    reducedMaxMIMO-LayersFR2       SEQUENCE {
        reducedMIMO-LayersFR2-DL   MIMO-LayersDL,
        reducedMIMO-LayersFR2-UL   MIMO-LayersUL
    } OPTIONAL
}
ReducedAggregatedBandwidth ::= ENUMERATED {mhz0, mhz10, mhz20, mhz30, mhz40, mhz50, mhz60,
mhz80, mhz100, mhz200, mhz300, mhz400}
-- TAG-UEASSISTANCEINFORMATION-STOP
-- ASN1STOP
```

TABLE 8

UEAssistanceInformation field descriptions (NR implementations)
UEAssistanceInformation field descriptions delayBudgetReport
Indicates the UE-preferred adjustment to connected mode DRX.
reducedBW-FR1-DL
Indicates the UE's preference on reduced configuration corresponding to the maximum aggregated bandwidth across all downlink carriers of FR1 indicated by the field, to address overheating. This field is allowed to be reported only when UE is configured with serving cells operating on FR1.
reducedBW-FR1-UL
Indicates the UE's preference on reduced configuration corresponding to the maximum aggregated bandwidth across all uplink carriers of FR1 indicated by the field, to address overheating. This field is allowed to be reported only when UE is configured with serving cells operating on FR1.
reducedBW-FR2-DL
Indicates the UE's preference on reduced configuration corresponding to the maximum aggregated bandwidth across all downlink carriers of FR2 indicated by the field, to address overheating. This field is allowed to be reported only when UE is configured with serving cells operating on FR2. mhz0 is only applicable for FR2.
reducedBW-FR2-UL
Indicates the UE's preference on reduced configuration corresponding to the maximum aggregated bandwidth across all uplink carriers of FR2 indicated by the field, to address overheating. This field is allowed to be reported only when UE is configured with serving cells operating on FR2. mhz0 is only applicable for FR2.
reducedCCsDL
Indicates the UE's preference on reduced configuration corresponding to the maximum number of downlink SCells indicated by the field, to address overheating.
reducedCCsUL
Indicates the UE's preference on reduced configuration corresponding to the maximum number of uplink SCells indicated by the field, to address overheating.
reducedMIMO-LayersFR1-DL
Indicates the UE's preference on reduced configuration corresponding to the maximum number of downlink MIMO layers of each serving cell operating on FR1 indicated by the field, to address overheating. This field is allowed to be reported only when UE is configured with serving cells operating on FR1.
reducedMIMO-LayersFR1-UL
Indicates the UE's preference on reduced configuration corresponding to the maximum number of uplink MIMO layers of each serving cell operating on FR1 indicated by the field, to address overheating. This field is allowed to be reported only when UE is configured with serving cells operating on FR1.
reducedMIMO-LayersFR2-DL
Indicates the UE's preference on reduced configuration corresponding to the maximum number of downlink MIMO layers of each serving cell operating on FR2 indicated by the field, to address overheating. This field is allowed to be reported only when UE is configured with serving cells operating on FR2.
reducedMIMO-LayersFR2-UL
Indicates the UE's preference on reduced configuration corresponding to the maximum number of uplink MIMO layers of each serving cell operating on FR2 indicated by the field, to address overheating. This field is allowed to be reported only when UE is configured with serving cells operating on FR2.
type1
Indicates the preferred amount of increment/decrement to the long DRX cycle length with respect to the current TABLE 8-continued UEAssistanceInformation field descriptions (NR implementations)
UEAssistanceInformation field descriptions configuration. Value in number of milliseconds. Value ms40 corresponds to 40 milliseconds, msMinus40 corresponds to −40 milliseconds and so on.

When the UE 101/101 is capable of providing delay budget report in RRC_CONNECTED, the UE 101/101 may initiate the UEAssistanceInformation procedure in several cases, including upon being configured to provide delay budget report and upon change of delay budget preference. When the UE 101/101 is capable of providing overheating assistance information in RRC_CONNECTED, the UE 101/101 may initiate the UEAssistanceInformation procedure if the UE 101/101 was configured to do so, upon detecting internal overheating, or upon detecting that it is no longer experiencing an overheating condition. In NR implementations, the UEAssistanceInformation message may be included in an UL-DCCH-Message. The UL-DCCH-Message class is the set of RRC messages that may be sent from the UE to the network on the uplink DCCH logical channel. An example NR-based UL-DCCH-Message is shown by table 9.

TABLE 9

UL-DCCH-Message

```
-- ASN1START
-- TAG-UL-DCCH-MESSAGE-START
UL-DCCH-Message ::=      SEQUENCE {
   message      UL-DCCH-MessageType
}
UL-DCCH-MessageType ::=      CHOICE {
   c1         CHOICE {
     measurementReport        MeasurementReport,
     rrcReconfigurationComplete      RRCReconfigurationComplete,
     rrcSetupComplete        RRCSetupComplete,
     rrcReestablishmentComplete      RRCReestablishmentComplete,
     rrcResumeComplete        RRCResumeComplete,
     securityModeComplete        SecurityModeComplete,
     securityModeFailure        SecurityModeFailure,
     ulInformationTransfer        ULInformationTransfer,
     locationMeasurementIndication   LocationMeasurementIndication,
     ueCapabilityInformation       UECapabilityInformation,
     counterCheckResponse        CounterCheckResponse,
     ueAssistanceInformation       UEAssistanceInformation,
     failureInformation        FailureInformation,
     spare3 NULL,
     spare2 NULL, spare1 NULL
   },
   messageClassExtension      SEQUENCE { }
}
-- TAG-UL-DCCH-MESSAGE-STOP
-- ASN1STOP
```

The NAS 1057 forms the highest stratum of the control plane between the UE 101 and the AMF (e.g., over the N1 reference point). The NAS 1057 may support the mobility of the UEs 101 and the session management procedures to establish and maintain IP connectivity between the UE 101 and a P-GW in LTE systems.

According to various embodiments, one or more protocol entities of arrangement 1000 may be implemented in UEs 101, RAN nodes 111, AMF in NR implementations or MME in LTE implementations, UPF in NR implementations or S-GW and P-GW in LTE implementations, or the like to be used for control plane or user plane communications protocol stack between the aforementioned devices. In such embodiments, one or more protocol entities that may be implemented in one or more of UE 101, gNB 111, AMF, etc. may communicate with a respective peer protocol entity that may be implemented in or on another device using the services of respective lower layer protocol entities to perform such communication. In some embodiments, a gNB-CU of the gNB 111 may host the RRC 1055, SDAP 1047, and PDCP 1040 of the gNB that controls the operation of one or more gNB-DUs, and the gNB-DUs of the gNB 111 may each host the RLC 1030, MAC 1020, and PHY 810 of the gNB 111.

In a first example, a control plane protocol stack may comprise, in order from highest layer to lowest layer, NAS 1057, RRC 1055, PDCP 1040, RLC 1030, MAC 1020, and PHY 1110. In this example, upper layers 1060 may be built on top of the NAS 857, which includes an IP layer 1061, an SCTP 1062, and an application layer signaling protocol (AP) 1063.

In NR implementations, the AP 1063 may be an NGAP 1063 for the NG interface 113 defined between the NG-RAN node 111 and the AMF, or the AP 1063 may be an XnAP 1063 for the Xn interface 112 that is defined between two or more RAN nodes 111. The NGAP 1063 may support the functions of the NG interface 113 and may comprise Elementary Procedures (EPs). An NGAP EP may be a unit of interaction between the NG-RAN node 111 and the AMF. The NGAP 1063 services may comprise two groups: UE-associated services (e.g., services related to a UE 101) and non-UE-associated services (e.g., services related to the whole NG interface instance between the NG-RAN node 111 and AMF). These services may include functions including, but not limited to: a paging function for the sending of paging requests to NG-RAN nodes 111 involved in a particular paging area; a UE context management function for allowing the AMF to establish, modify, and/or release a UE context in the AMF and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF; a NAS node selection function for determining an association between the AMF and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement data, etc.) between two RAN nodes 111 via CN 120; and/or other like functions.

The XnAP 1063 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 110), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, NG-RAN update procedures, cell activation procedures, and the like.

In LTE implementations, the AP 1063 may be an S1AP 1063 for the S1 interface 113 defined between an E-UTRAN node 111 and an MME, or the AP 1063 may be an X2AP 1063 for the X2 interface 112 that is defined between two or more E-UTRAN nodes 111. The S1AP 1063 may support the functions of the S1 interface, and similar to the NGAP discussed previously, the S1AP may comprise S1AP EPs. An S1AP EP may be a unit of interaction between the E-UTRAN node 111 and an MME within EPC 120. The S1AP 1063 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1063 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 1062 may provide guaranteed delivery of application layer messages (e.g., NGAP or XnAP messages in NR implementations, or S1AP or X2AP messages in LTE implementations). The SCTP 1062 may ensure reliable delivery of signaling messages between the RAN node 111 and the AMF/MME based, in part, on the IP protocol, supported by the IP 1061. The Internet Protocol layer (IP) 1061 may be used to perform packet addressing and routing functionality. In some implementations the IP layer 1061 may use point-to-point transmission to deliver and convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 1047, PDCP 1040, RLC 1030, MAC 1020, and PHY 1010. The user plane protocol stack may be used for communication between the UE 101, the RAN node 111, and UPF in NR implementations or an S-GW and P-GW in LTE implementations. In this example, upper layers 1051a may be built on top of the SDAP 1047, and may include UDP/IP 1052, a GTP-U 1053, and a User Plane PDU layer (UP PDU) 1063. The transport layer 1054 (also referred to as a "transport network layer") may be built on IP transport. The IP layer (also referred to as the "Internet layer") may be used to perform packet addressing and routing functionality. The IP layer may assign IP addresses to user data packets in any of IPv4, IPv6, or PPP formats, for example.

The GTP-U 1053 may be used on top of the UDP/IP layer 1052 (comprising a UDP layer and IP layer) to carry UP-PDUs. The GTP-U 1053 may be used for carrying user data within the GPRS core network and between the radio access network and the core network. The user data transported can be packets in any of IPv4, IPv6, or PPP formats, for example. The UDP/IP 1052 may provide checksums for data integrity, port numbers for addressing different functions at the source and destination, and encryption and authentication on the selected data flows. The RAN node 111 and the S-GW may utilize an S1-U interface to exchange user plane data via a protocol stack comprising an L1 layer (e.g., PHY 1010), an L2 layer (e.g., MAC 1020, RLC 1030, PDCP 1040, and/or SDAP 1047), the UDP/IP layer 1052, and the GTP-U 1053. The S-GW and the P-GW may utilize an S5/S8a interface to exchange user plane data via a protocol stack comprising an L1 layer, an L2 layer, the UDP/IP layer 1052, and the GTP-U 1053. As discussed previously, NAS protocols may support the mobility of the UE 101 and the session management procedures to establish and maintain IP connectivity between the UE 101 and the P-GW.

In various embodiments, real-time user plane media data is sent over RTP/UDP/IP layers, and non-real-time media may use other transport protocols such as UDP/IP 1052 or TCP/IP. In these embodiments, upper layers 1051b may include UDP/IP 1052, RTP layer 1074, RTCP/SIP/SDP layer 1075, one or mode media codecs 1076, and conversational multimedia application layer 1077. In some embodiments, upper layers 1051b may be built on top of SDAP 1047 or PDCP 1040. As shown in FIG. 10, RTP 1074 and RTCP/SIP/SDP run on top of UDP, but these layers can also run on top of TCP in other embodiments.

The conversational multimedia application layer 1077 includes the media application(s) that presents or outputs media to the user. The media codecs 1076 may be any of the codecs discussed herein (e.g., speech, video, real-time text, etc.). The RTCP/SIP/SDP 1075 involve SIP, SDP, and the SDPCapNeg for session control, media negotiation, and configuration functionality as discussed herein. RTP 1074 is used for the transport of packetized media data. RTP provides real-time delivery of media data, including functionalities such as packet sequence numbering and time stamping. The time stamping provides for inter-media synchronization in the receiving MTSI client. RTP may include RTCP 1075, which provides QoS monitoring, where each endpoint receives and sends quality reports from/to the other endpoint including radio capabilities and radio-based reports according to the embodiments herein.

SIP 1075 performs the logical bound between the media streams of two MTSI clients. SIP uses SDP to describe the session properties (e.g., IP addresses, ports, payload formats, type of media (e.g., audio, video, etc.), media codecs, and session bandwidth). Mobile applications based on the IETF SIP can be implemented on top of non-IMS networks. In this case, only the applications resident in mobile terminals run the SIP protocol, while the network considers SIP as transport protocol. In 3GPP IMS networks, where SIP has been selected to govern the core call control mechanism, both the network and the mobile terminal implement the SIP protocol and exchange SIP messages for establishing and releasing calls. This choice has been made to enable the transition towards ALL-IP mobile networks.

Moreover, although not shown by FIG. 10, an application layer may be present above the AP 1063 and/or the transport network layer 1054. The application layer may be a layer in which a user of the UE 101, RAN node 111, or other network element interacts with software applications being executed, for example, by application circuitry 605 or application circuitry 705, respectively. The application layer may also provide one or more interfaces for software applications to interact with communications systems of the UE 101 or RAN node 111, such as the baseband circuitry 910. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

FIGS. 12-13 show example procedures 1200-1300, respectively, in accordance with various embodiments. For illustrative purposes, the various operations of processes 1200-1300 is described as being performed by a local UE 101, or elements thereof, with respect to a remote UE 101, or elements thereof (e.g., components discussed with regard to platform 700 of FIG. 7). Additionally, the various messages/signaling communicated between the UEs 101 may be sent/received over the various interfaces and between various intermediary nodes as discussed herein with respect to FIGS. 1-11, and using the various mechanisms discussed herein including those discussed herein with respect to FIGS. 1-11. While particular examples and orders of operations are illustrated FIGS. 12-13, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

FIG. 12 depicts an example procedure 1200 for indicating support of one or more radio capabilities according to various embodiments. Process 1200 begins at operation 1205 where the local UE 101 identifies one or more capabilities supported by the local UE 101. The one or more radio capabilities include one or more of a delay budget reporting capability, a TTI bundling capability, a RAN frame aggregation capability, and a RAN-assisted codec adaptation capability or an ANBR signaling capability. At operation 1210, the local UE 101 generates an SDP message to indicate the one or more radio capabilities. In some embodiments, the SDP message may include a session level attribute "a=RANCapabilities", where the RANCapabilities includes individual bits to indicate a corresponding one of the one or more radio capabilities. In other embodiments, the SDP message may include an individual session level attribute for each supported radio capability such as "a=anbr" to indicate that the local UE 101 supports the ANBR signaling capability. At operation 1215, the local UE 101 transmits the SDP message to a remote UE 101*b* via a RAN node 121. After operation 1215, process 1200 may end or repeat as necessary.

FIG. 13 depicts an example procedure 1300 for adjusting a bit rate or bandwidth for consuming media according to various embodiments. Process 1300 may be performed by a local UE 101. Process 1300 begins at operation 1305 where a local UE 101 receives an SDP message from a remote UE 101, and at operation 1310, the local UE 101 identifies one or more capabilities supported by the remote UE 101 based on the contents of the SDP message. The one or more radio capabilities include one or more of a delay budget reporting capability, a TTI bundling capability, a RAN frame aggregation capability, and a RAN-assisted codec adaptation capability or an ANBR signaling capability. At operation 1315, the local UE 101 determines whether a change in radio conditions has been detected, and if not, continues to monitor the radio conditions with its local RAN node 111. If the radio conditions have changed, the local UE 101 proceeds to operation 1320 to generate an SDP message to request a change of one or more radio link parameters. The particular radio link parameters to be changed, and the extent to which those parameters are changed may depend on the detected radio conditions and the one or more radio capabilities supported by the remote UE 101. At operation 1325, the local UE 101 transmits the SDP message to its local RAN node 111 to have the radio link parameters changed. In some embodiments, the RAN node 111 may send a suitable ACK message to the local UE 101 to indicate the changed radio link parameters. After operation 1325, process 1300 may end or repeat as necessary.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 includes a method to be performed by a first UE, the method comprising: generating or causing to generate a SDP message to indicate one or more radio capabilities of the first UE; and transmitting or causing to transmit the SDP message to a second UE via a RAN node.

Example 2 includes the method of example 1 and/or some other example(s) herein, wherein the SDP message is a first SDP message, the one or more radio capabilities of the first UE are first radio capabilities, and the method comprises: identifying or causing to identify one or more second radio capabilities of the second UE within a second SDP message obtained from the second UE; and determining or causing to determine one or more desired radio level adaptations based on the one or more second radio capabilities.

Example 3 includes the method of example 2 and/or some other example(s) herein, wherein the method comprises: determining or causing to determine the one or more desired radio level adaptations based on the one or more second radio capabilities and based on detected radio conditions.

Example 4 includes the method of example 3 and/or some other example(s) herein, wherein the detected radio conditions are one or both of conditions of a radio link between the first UE and the RAN node and conditions of a radio link between the second UE and another RAN node.

Example 5 includes the method of examples 3-4 and/or some other example(s) herein, wherein the method comprises: generating or causing to generate an RRC message to indicate a desired radio level adaptation; and transmitting or causing to transmit the RRC message to the RAN node. Example 6 includes the method of example 5 and/or some other example(s) herein, wherein the desired radio level adaptation is to turn off cDRX when the one or more second radio capabilities indicate support of DBI signaling and TTI bundling, the detected radio conditions are better than threshold radio conditions, and an e2e packet loss rate is below a threshold e2e packet loss rate. Example 7 includes the method of examples 5-6 and/or some other example(s) herein, wherein the RRC message is to include a UE Assistance Information (UEAssistanceInformation) IE, and the UEAssistanceInformation IE is to indicate the desired radio level adaptation.

Example 8 includes the method of examples 2-3 and/or some other example(s) herein, wherein the method comprises: generating or causing to generate a first recommended bit rate MAC CE, the first recommended bit rate MAC CE to query for a recommended bit rate or indicate a desired radio level adaptation; transmitting or causing to transmit the first recommended bit rate MAC CE to the RAN node; and receiving a second recommended bit rate MAC CE from the RAN node, the second recommended bit rate MAC CE to include ANBR information.

Example 9 includes the method of example 8 and/or some other example(s) herein, wherein the method comprises: adapting or causing to adapt a bit rate based on the ANBR information; generating or causing to generate a CMR or an RTCP-APP for voice rate adaptation based on the ANBR information; and/or generating or causing to generate a TMMBR or a TMMBN message for video rate adaptation based on the ANBR information.

Example 10 includes the method of examples 2-9 and/or some other example(s) herein, wherein the first SDP message is an SDP offer message and the second SDP message is an SDP answer message, or the second SDP message is an SDP offer message and the first SDP message is an SDP answer message.

Example 11 includes the method of example 10, wherein the method comprises: generating or causing to generate the first SDP message to include a first radio capabilities attribute to indicate the one or more first radio capabilities; and identifying or causing to identify the one or more second radio capabilities within a second radio capabilities attribute in the second SDP message.

Example 12 includes the method of examples 1-11 and/or some other example(s) herein, wherein the one or more radio capabilities include one or more of a delay budget reporting capability, a TTI bundling capability, a RAN frame aggregation capability, and a RAN-assisted codec adaptation capability or an ANBR signaling capability.

Example 13 includes a method to be performed by a first MTSI client in terminal, the method comprising: generating or causing to generate a SDP message to indicate one or more RAN-level radio capabilities of the first UE; and transmitting or causing to transmit the SDP message to a second MTSI client in terminal via a radio link between the first MTSI client in terminal and a RAN node.

Example 14 includes the method of example 13 and/or some other example(s) herein, wherein the SDP message is a first SDP message, the one or more radio capabilities of the first MTSI client in terminal are first radio capabilities, and the method comprises: identifying or causing to identify one or more second radio capabilities of the second MTSI client in terminal within a second SDP message obtained from the second MTSI client in terminal; and determining or causing to determine one or more desired radio level adaptations based on the one or more second radio capabilities and based on detected radio conditions, wherein the detected radio conditions are one or both of conditions of the radio link between the first MTSI client in terminal and the RAN node and conditions of a radio link between the second MTSI client in terminal and another RAN node.

Example 15 includes the method of example 14 and/or some other example(s) herein, wherein the method comprises: generating or causing to generate a RRC message to indicate a desired radio level adaptation; and transmitting or causing to transmit the RRC message to the RAN node.

Example 16 includes the method of example 15 and/or some other example(s) herein, wherein the desired radio level adaptation is to turn off cDRX when the one or more second radio capabilities indicate support of DBI signaling and TTI bundling, the detected radio conditions are better than threshold radio conditions, or an e2e packet loss rate is below a threshold e2e packet loss rate. Example 17 includes the method of examples 15-16 and/or some other example(s) herein, wherein the RRC message is to include a UEAssistanceInformation IE, and the UEAssistanceInformation IE is to indicate the desired radio level adaptation.

Example 18 includes the method of example 14 and/or some other example(s) herein, wherein the method comprises: generating or causing to generate a recommended bit rate MAC CE to include a recommended bit rate query, the recommended bit rate query to query for a recommended bit rate or indicate a desired radio level adaptation; transmitting or causing to transmit the recommended bit rate MAC CE including the recommended bit rate query to the RAN node; and receiving, from the RAN node, a recommended bit rate MAC CE that includes a recommended bit rate message, the recommended bit rate message to indicate an ANBR, and the ANBR is based on the recommended bit rate query.

Example 19 includes the method of example 18 and/or some other example(s) herein, wherein the method comprises: adapting or causing to adapt a bit rate based on the ANBR; generating or causing to generate a CMR or an RTCP-APP for voice rate adaptation based on the ANBR; or generating or causing to generate a TMMBR or a TMMBN message for video rate adaptation based on the ANBR.

Example 20 includes the method of examples 13-19 and/or some other example(s) herein, wherein the first SDP message is an SDP offer message and the second SDP message is an SDP answer message, or the second SDP message is an SDP offer message and the first SDP message is an SDP answer message, and wherein the method comprises: generating or causing to generate the first SDP message to include a first radio capabilities attribute to indicate the one or more first radio capabilities; and identifying or causing to identify the one or more second radio capabilities within a second radio capabilities attribute in the second SDP message.

Example 21 includes the method of examples 13-20 and/or some other example(s) herein, wherein the one or more radio capabilities include one or more of a delay budget reporting capability, a TTI bundling capability, a RAN frame aggregation capability, and a RAN-assisted codec adaptation capability or an ANBR signaling capability.

Example 22 includes a method to be performed by a MTSI client in terminal comprising: identifying or causing to identify radio capabilities of a remote device based on a session description protocol (SDP) offer message obtained from the remote device; and generating or causing to generate an SDP answer message to include a radio capabilities attribute, the radio capabilities attribute to indicate one or more radio capabilities of the apparatus.

Example 23 includes the method of example 22 and/or some other example(s) herein, further comprising: receiving the SDP offer message from the remote device, wherein the SDP offer message is to include another radio capabilities attribute of the remote device; and transmitting or causing to transmit the SDP answer message to the remote device. Example 24 includes the method of example 23 and/or some other example(s) herein, wherein the radio capabilities attribute of the apparatus is to indicate whether the apparatus supports one or more of a delay budget reporting, TTI bundling, RAN frame aggregation, and RAN-assisted codec adaptation or an ANBR signaling capability; and the other radio capabilities attribute of the remote device is to indicate whether the remote device supports one or more of a delay budget reporting, TTI bundling, RAN frame aggregation, and RAN-assisted codec adaptation or an ANBR signaling capability.

Example 25 includes the method of example 24 and/or some other example(s) herein, further comprising: detecting or causing to detect radio conditions local to the MTSI client in terminal, wherein the detected radio conditions are one or both of conditions of the radio link between the MTSI client in terminal and the RAN node and conditions of a radio link between the remote device and another RAN node; and generating or causing to generate a message to indicate one or more desired radio level adaptations based on the radio capabilities of the remote device and based on the detected radio conditions.

Example 26 includes the method of example 25 and/or some other example(s) herein, wherein the message is an RRC message, and the method comprises: transmitting or causing to transmit the RRC message to a local RAN node; receiving another message from the RAN node based on the RRC message; and adjusting or causing to adjust a bit rate based on the message received from the RAN node. Example 27 includes the method of example 26 and/or some other example(s) herein, wherein when the detected radio conditions include a relatively long packet delay and jitter, the other message is a recommended bit rate MAC CE; and when the detected radio conditions include a relatively large number of packet losses, the other message is a delay budget information acknowledgement indicating that additional budget has been granted by the RAN node.

Example 28 includes the method of example 25 and/or some other example(s) herein, wherein the message is a recommended bit rate query MAC CE for querying the recommended bitrate or indicating a desired bit rate, and the method comprises receiving a recommended bit rate message MAC CE, the recommended bit rate message MAC CE including an ANBR based on the recommended bit rate query MAC CE.Example 29 includes the method of example 28 and/or some other example(s) herein, further comprising: adapting or causing to adapt a bit rate based on the ANBR. Example 30 includes the method of examples 28-29 and/or some other example(s) herein, wherein the method comprises: generating or causing to generate a CMR or an Application-defined RTCP-APP for voice rate adaptation based on the ANBR; and/or generating or causing to generate a TMMBR or a TMMBN message for video rate adaptation based on the ANBR.

Example 31 may include an apparatus comprising means to perform one or more elements of a method described in or related to any of examples 1-30, or any other method or process described herein. Example 32 may include one or more non-transitory computer-readable media comprising instructions to cause an electronic device, upon execution of the instructions by one or more processors of the electronic device, to perform one or more elements of a method described in or related to any of examples 1-30, or any other method or process described herein. Example 33 may include an apparatus comprising logic, modules, or circuitry to perform one or more elements of a method described in or related to any of examples 1-30, or any other method or process described herein. Example 34 may include a method, technique, or process as described in or related to any of examples 1-30, or portions or parts thereof. Example 35 may include an apparatus comprising: one or more processors and one or more computer-readable media comprising instructions that, when executed by the one or more processors, cause the one or more processors to perform the method, techniques, or process as described in or related to any of examples 1-30, or portions thereof. Example 36 may include a signal as described in or related to any of examples 1-30, or portions or parts thereof. Example 37 includes a packet, frame, segment, PDU, or message as described in or related to any of examples 1-30, or portions or parts thereof, or otherwise described in the present disclosure. Example 38 may include a signal in a wireless network as shown and described herein. Example 39 may include a method of communicating in a wireless network as shown and described herein. Example 40 may include a system for providing wireless communication as shown and described herein. Example 41 may include a device for providing wireless communication as shown and described herein.

In the preceding detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments. Also, it is noted that example embodiments may be described as a process depicted as successive operations and/or with a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in a figure. A process may correspond to a method, a function, a procedure, a subroutine, a subprogram, and the like. When a process corresponds to a function, its termination may correspond to a return of the function to the calling function a main function.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. The singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous. Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group) that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. The term "processor circuitry" refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes. The term "module" may refer to one or more independent electronic circuits packaged onto a circuit board, System-on-Chip (SoC), System-in-Package (SiP), Multi-Chip-Package (MCP), etc., configured to provide a basic function within a computer system. The term "module" may refer to, be part of, or include an FPGA, ASIC, a processor (shared, dedicated, or group) and/or memory (shared, dedicated, or group) that execute one or more software or firmware programs, a combinational logic circuit, and/or other suitable components that provide the described functionality. The term "interface circuitry" may refer to, is part of, or includes circuitry providing for the exchange of information between two or more components or devices. The term "interface circuitry" may refer to one or more hardware interfaces (e.g., buses, I/O interfaces, peripheral component interfaces, network interface cards, and/or the like). The term "memory" and/or "memory circuitry" may represent one or more hardware devices for storing data, including RAM, magnetic RAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "device" refers to a physical entity embedded inside, or attached to, another physical entity in its vicinity, with capabilities to convey digital information from or to that physical entity. The term "element" refers to a unit that is indivisible at a given level of abstraction and has a clearly defined boundary, wherein an element may be any type of entity. The term "controller" refers to an element or entity that has the capability to affect a physical entity, such as by changing its state or causing the physical entity to move. The term "entity" refers to a distinct component of an architecture or device, and/or information transferred as a payload. The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like. The terms "access node," "access point," or the like may describe equipment that provides the radio baseband functions for data and/or voice connectivity between a network and one or more users.

The term "computer system" refers to any type interconnected electronic devices, computer devices, or components thereof. Additionally, the term "computer system" and/or "system" refers to various components of a computer that are communicatively coupled with one another, or otherwise organized to accomplish one or more functions. Furthermore, the term "computer system" and/or "system" refers to multiple computer devices and/or multiple computing systems that are communicatively coupled with one another and configured to share computing and/or networking resources. The term "architecture" refers to a fundamental organization of a system embodied in its components, their relationships to one another, and to an environment, as well as to the principles guiding its design and evolution. The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information. The term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The terms "instantiate," "instantiation," and the like refers to the creation of an instance, and an "instance" refers to a concrete occurrence of an object, which may occur, for example, during execution of program code. The term "information element" refers to a structural element containing one or more fields. The term "field" refers to individual contents of an information element, or a data element that contains content. The term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, I/O operations, ports or network sockets, channel/link allocation, throughput, memory usage, storage, network, database and applications, workload units, and/or the like. The term "service" refers to a particular functionality or a set of functions to be performed on behalf of a requesting party, such as any of the computing systems or devices discussed herein. A service may include or involve the retrieval of specified information or the execution of a set of operations. The term "session" refers to a set of senders and receivers, and the data streams flowing from the senders to receivers. The term "session description" refers to a format for conveying sufficient information to discover and participate in a multimedia session. A "media stream" refers to a single media instance, for example, an audio stream or a video stream, as well as a single whiteboard or shared application group.

For the purposes of the present document, the abbreviations listed in table 10 may apply to the examples and embodiments discussed herein.

TABLE 10

| | |
|---|---|
| 3GPP | Third Generation Partnership Project |
| 4G | Fourth Generation |
| 5G | Fifth Generation |
| 5GC | 5G Core Network |
| ACK | Acknowledgement |
| AF | Application Function |
| AM | Acknowledged Mode |
| AMF | Access and Mobility Management Function |
| AMR | Adaptive Multi-Rate |
| AMR-NB | Adaptive Multi-Rate - NarrowBand |
| AMR-WB | Adaptive Multi-Rate - WideBand |
| AMR-WB IO | Adaptive Multi-Rate - WideBand Inter-operable Mode |
| AN | Access Network |
| ANBR | Access Network Bitrate Recommendation |
| ANBRQ | Access Network Bitrate Recommendation Query |
| AP | Application Protocol, Antenna Port, Access Point |
| API | Application Programming Interface |
| APP | Application-defined RTCP packet |
| ARQ | Automatic Repeat Request |
| AS | Access Stratum |
| AS | Application Server |
| ASN.1 | Abstract Syntax Notation One |
| AUSF | Authentication Server Function |
| AVC | Advanced Video Coding |
| AVP | Audio-Visual Profile |
| AVPF | AVP with Feedback |
| BER | Bit Error Ratio |
| BLER | Block Error Rate |
| BS | Base Station |
| BW | Bandwidth |
| CA | Carrier Aggregation, Certification Authority |
| CAMEL | Customised Application Mobile Enhanced Logic |
| CAP | Camel Application Part |
| CAPEX | CAPital Expenditure |
| CCM | Codec Control Messages |
| CDF | Cumulative Distribution Function |
| CDMA | Code-Division Multiple Access |
| CDR | Charging Data Record |
| cDRX | Connected Mode DRX |
| CID | Cell-ID (e.g., positioning method) |
| CM | Connection Management, Conditional Mandatory |
| CMR | Codec Mode Request |
| CPU | CSI processing unit, Central Processing Unit |
| CRAN | Cloud Radio Access Network, Cloud RAN |
| CS | Circuit Switched |
| CS-ACELP | Conjugate-Structure Algebraic-Code-Excited Linear Prediction |
| CSCF | Call Session Control Function |

TABLE 10-continued

| | |
|---|---|
| D2D | Device-to-Device |
| DBI | Delay Budget Information |
| DECT | Digital Enhanced Cordless Telecommunications |
| DF | Deployment Flavour |
| DL | Downlink |
| DMTF | Distributed Management Task Force |
| DN | Data network |
| DRX | Discontinuous Reception |
| DSR | Distributed Speech Recognition |
| DTMF | Dual Tone Multi-Frequency |
| DTX | Discontinuous Transmission |
| e2e | End-to-End |
| ECN | Explicit Congestion Notification |
| ECN-CE | ECN Congestion Experienced |
| ECT | ECN Capable Transport |
| eNB | evolved NodeB, E-UTRAN Node B |
| EPC | Evolved Packet Core |
| EPS | Evolved Packet System |
| E-UTRA | Evolved UTRA |
| E-UTRAN | Evolved UTRAN |
| EVRC | Enhanced Variable Rate Codec |
| EVS | Enhanced Voice Services |
| FDD | Frequency Division Duplex |
| FDM | Frequency Division Multiplex |
| FDMA | Frequency Division Multiple Access |
| FEM | Front End Module |
| FPGA | Field-Programmable Gate Array |
| FR | Frequency Range |
| GBR | Guaranteed Bit Rate |
| GERAN | GSM EDGE RAN, GSM EDGE Radio Access Network |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit |
| gNB-DU | gNB-distributed unit |
| GNSS | Global Navigation Satellite System |
| GPRS | General Packet Radio Service |
| GRUU | Globally Routable UA URI |
| GSM | Global System for Mobile Communications, Groupe Special Mobile |
| GTP | GPRS Tunneling Protocol |
| GTP-U | GPRS Tunnelling Protocol for User Plane |
| HARQ | Hybrid ARQ, Hybrid Automatic Repeat Request |
| HEVC | High Efficiency Video Coding |
| HSS | Home Subscriber Server |
| HTTP | Hyper Text Transfer Protocol |
| HTTPS | Hyper Text Transfer Protocol Secure (https is http/1.1 over SSL, e.g., port 443) |
| I-CSCF | Interrogating CSCF |
| IM-SSF | IMS Service Switching Function |
| ICM | Initial Codec Mode |
| ID | Identity, identifier |
| IE | Information Element |
| IEEE | Institute of Electrical and Electronics Engineers |
| IETF | Internet Engineering Task Force |
| IM | Interference Measurement, Intermodulation, IP Multimedia |
| IMC | IMS Credentials |
| IMS | IP Multimedia Subsystem |
| IoT | Internet of Things |
| I/O | Input/Output |
| IP | Internet Protocol |
| IPsec | IP Security, Internet Protocol Security |
| IP-CAN | IP-Connectivity Access Network |
| IPv4 | Internet Protocol Version 4 |
| IPv6 | Internet Protocol Version 6 |
| IR | Infrared |
| ISO | International Organisation for Standardisation |
| IWF | Interworking-Function |
| I-WLAN | Interworking WLAN |
| JBM | Jitter Buffer Management |
| kB | Kilobyte (1000 bytes) |
| kbps | kilo-bits per second |
| ksps | kilo-symbols per second |
| L1 | Layer 1 (physical layer) |
| L2 | Layer 2 (data link layer) |
| L3 | Layer 3 (network layer) |
| LAN | Local Area Network |
| LLC | Logical Link Control, Low Layer Compatibility |
| LPLMN | Local PLMN |
| LSB | Least Significant Bit |
| LTE | Long Term Evolution |
| LWA | LTE-WLAN aggregation |

TABLE 10-continued

| | |
|---|---|
| LWIP | LTE/WLAN Radio Level Integration with IPsec Tunnel |
| LTE | Long Term Evolution |
| M2M | Machine-to-Machine |
| MAC | Medium Access Control, Media Access Control (protocol layering context) |
| MBR | Maximum Bit Rate |
| MFRC | Media Resource Function Controller |
| MFRP | Media Resource Function Processor |
| MGW | Media Gateway |
| MIB | Master Information Block, Management Information Base |
| MIMO | Multiple Input Multiple Output |
| MM | Mobility Management |
| MME | Mobility Management Entity |
| MPDCCH | MTC Physical Downlink Control CHannel |
| MPEG | Moving Picture Experts Group |
| MPLS | MultiProtocol Label Switching |
| MSB | Most Significant Bit |
| MSMTSI | Multi-Stream Multimedia Telephony Service for IMS |
| MTSI | Multimedia Telephony Service for IMS |
| MTC | Machine-Type Communications |
| mMTC | massive MTC, massive Machine-Type Communications |
| N3GPP | Non-3GPP, Non-Third Generation Partnership Project |
| N3IWF | Non-3GPP InterWorking Function |
| NACK | Negative Acknowledgement |
| NAS | Non-Access Stratum |
| NEF | Network Exposure Function |
| NF | Network Function |
| NFV | Network Functions Virtualization |
| NFVI | NFV Infrastructure |
| NFVO | NFV Orchestrator |
| NG | Next Generation, Next Gen |
| NGAP | NG Application Protocol |
| NG-DECT | New Generation DECT |
| NGEN-DC | NG-RAN E-UTRA-NR Dual Connectivity |
| NR | New Radio, Neighbour Relation |
| NSSAI | Network Slice Selection Assistance Information |
| S-NNSAI | Single-NSSAI |
| NSSF | Network Slice Selection Function |
| NW | Network |
| OFDM | Orthogonal Frequency Division Multiplexing |
| OFDMA | Orthogonal Frequency Division Multiple Access |
| OSA | Open Services Architecture, Open Services Access |
| OTA | Over-the-Air |
| P-GRUU | Public GRUU |
| PCC | Policy and Charging Control (IMS contexts) |
| PCEF | Policy and Charging Enforcement Function |
| PCF | Policy Control Function |
| PCRF | Policy Control and Charging Rules Function |
| PDCP | Packet Data Convergence Protocol |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| P-GW | PDN Gateway |
| P-CSCF | Proxy CSCF |
| PHY | Physical layer |
| PLMN | Public Land Mobile Network |
| PLR | Packet Loss Rate |
| POC | PTT over Cellular |
| PP, PTP | Point-to-Point |
| PPP | Point-to-Point Protocol |
| ProSe | Proximity Services, Proximity-Based Service |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PTT | Push-to-Talk |
| PUCCH | Physical Uplink Control Channel |
| PUSCH | Physical Uplink Shared Channel |
| QoS | Quality of Service |
| RAN | Radio Access Network |
| RAT | Radio Access Technology |
| Rel | Release |
| RF | Radio Frequency |
| RLC | Radio Link Control |
| RNC | Radio Network Controller |
| RRC | Radio Resource Control |
| RSU | Road Side Unit |
| RTCP | RTP Control Protocol, Real-Time Transport Control Protocol |
| RTP | Real Time Protocol |

TABLE 10-continued

| | |
|---|---|
| RTSP | RTP Streaming Protocol |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | Serving CSCF |
| S-GW | Serving Gateway |
| SAE | System Architecture Evolution |
| SAP | Service Access Point |
| SC-FDMA | Single Carrier Frequency Division Multiple Access |
| SCS | Service Capability Servers |
| SCTP | Stream Control Transmission Protocol |
| SDAP | Service Data Adaptation Protocol, Service Data Adaptation Protocol layer |
| SDP | Service Description Protocol |
| SDPCapNeg | SDP Capability Negotiation |
| SEAF | Security Anchor Function |
| SEPP | Security Edge Protection Proxy |
| SGSN | Serving GPRS Support Node |
| S-GW | Serving Gateway |
| SI | System Information |
| SIB | System Information Block |
| SIP | Session Initiation Protocol |
| SL | Sidelink |
| SM | Session Management |
| SMF | Session Management Function |
| SMS | Short Message Service |
| SPS | Semi-Persistent Scheduling |
| SRTP | Secure RTP |
| SRVCC | Single Radio Voice Call Continuity |
| T-GRUU | Temporary GRUU |
| TBD | To Be Defined |
| TCP | Transmission Communication Protocol |
| TLS | Transport Layer Security |
| TM | Transparent Mode |
| TMMBN | Temporary Maximum Media Bit-rate Notification |
| TMMBR | Temporary Maximum Media Bit-rate Request |
| TR | Technical Report |
| TRP, TRxP | Transmission Reception Point |
| TRx | Transceiver |
| TS | Technical Specifications, Technical Standard |
| TTI | Transmission Time Interval |
| Tx | Transmission, Transmitting, Transmitter |
| UA | User Agent |
| UE | User Equipment |
| UDM | Unified Data Management |
| UDP | User Datagram Protocol |
| UDSF | Unstructured Data Storage Network Function |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| USB | Universal Serial Bus |
| USIM | Universal Subscriber Identity Module |
| UTRA | UMTS Terrestrial Radio Access |
| UTRAN | Universal Terrestrial Radio Access Network |
| V2X | Vehicle-to-everything |
| vBBUP | virtual baseband unit pool |
| ViLTE | Video-over-LTE |
| VoIP | Voice-over-IP, Voice-over-Internet Protocol |
| VoLTE | Voice-over-LTE |
| VM | Virtual Machine |
| VNF | Virtualized Network Function |
| VPLMN | Visited Public Land Mobile Network |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2AP | X2 Application Protocol |
| X2-C | X2 Control plane |
| X2-U | X2 User plane |
| XnAP | Xn Application Protocol |
| Xn-C | Xn Control plane |
| Xn-U | Xn User plane |
| XML | eXtensible Markup Language |

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. It should be understood that there is no intent to limit the concepts of the present disclosure to the particular forms disclosed, but on the contrary, the intention is to cover all modifications, equivalents, and alternatives consistent with the present disclosure and the appended claims.

The invention claimed is:

1. A user equipment (UE) comprising:
   memory circuitry to store program code of a Multimedia Telephony Service for Internet Protocol Multimedia Subsystem (MTSI) client; and
   processor circuitry coupled with the memory circuitry, the processor circuitry to operate the MTSI client to:
   generate a Session Description Protocol (SDP) offer message to include a media-level SDP attribute "anbr" to indicate a UE capability of the UE to use Access Network Bitrate Recommendation (ANBR) as an adaptation trigger and a UE capability of the UE to receive ANBR information from an access network,
   control transmission of the SDP offer message to another MTSI client operated by another UE, and
   receive an SDP answer message from the other MTSI client operated by the other UE, the SDP answer message to include another media-level SDP attribute "anbr" to indicate a UE capability of the other UE to use ANBR as an adaptation trigger and a UE capability of the other UE to receive ANBR information from an access network.

2. The UE of claim 1, wherein the SDP offer message further includes a media-level SDP attribute "DBI" to indicate a Delay Budget Information (DBI) signaling capability of the UE.

3. The UE of claim 2, wherein the processor circuitry is further to operate the MTSI client to:
   identify one or more radio capabilities of the other UE within the SDP answer message; and
   determine one or more desired radio level adaptations based on the determined one or more radio capabilities.

4. The UE of claim 3, wherein the processor circuitry is further to operate the MTSI client to:
   determine the one or more desired radio level adaptations based on the one or more radio capabilities and based on detected radio conditions.

5. The UE of claim 4, further comprising baseband circuitry communicatively coupled with the processor circuitry, the baseband circuitry to:
   detect the radio conditions local to the UE, wherein the detected radio conditions are one or both of conditions of a radio link between the UE and a Radio Access Network (RAN) node and conditions of another radio link between the other UE and another RAN node, and
   generate a Radio Resource Control (RRC) message to indicate the one or more desired radio level adaptations based on the one or more radio capabilities and based on the detected radio conditions.

6. The UE of claim 5, wherein the baseband circuitry is further to adjust a bitrate based on another RRC message received from the RAN node.

7. The UE of claim 1, wherein an ANBR capability is to indicate that the UE is capable to query and receive ANBR information.

8. The UE of claim 1, wherein the SDP message is a first SDP message, the one or more radio capabilities are first radio capabilities, and wherein the processor circuitry is further to operate the MTSI client to:
   identify one or more second radio capabilities of the other UE within a second SDP message obtained from the other UE; and
   determine whether the other UE supports an ANBR capability based on the one or more second radio capabilities.

9. The UE of claim 1, further comprising baseband circuitry communicatively coupled with the processor circuitry, the baseband circuitry to:
   receive a message from a Radio Access Network (RAN) node, the message to include ANBR information; and
   adapt a bitrate based on the ANBR information and based on whether the SDP answer message includes the ANBR capability.

10. One or more non-transitory computer-readable media (NTCRM) comprising instructions, wherein execution of the instructions by one or more processors of a first user equipment (UE) is to cause the first UE to:
    generate a Session Description Protocol (SDP) offer message to include a media-level SDP attribute "anbr" to indicate a UE capability of the first UE to use Access Network Bitrate Recommendation (ANBR) as an adaptation trigger and a UE capability of the first UE to receive ANBR information from an access network;
    send the SDP offer message to a second UE;
    receive an SDP answer message from the second UE, the SDP answer message to include another media-level SDP attribute "anbr" to indicate a UE capability of the second UE to use ANBR as an adaptation trigger and a UE capability of the second UE to receive ANBR information from an access network.

11. The one or more NTCRM of claim 10, wherein the the SDP offer message further includes a media-level SDP attribute "DBI" to indicate a Delay Budget Information (DBI) signaling capability of the first UE, and the SDP answer message further includes a media-level SDP attribute "DBI" to indicate a Delay Budget Information (DBI) signaling capability of the second UE.

12. The one or more NTCRM of claim 11, wherein execution of the instructions is to cause the first UE to:
    identify one or more radio capabilities of the second UE within the SDP answer message obtained from the second UE; and
    determine one or more desired radio level adaptations based on the one or more radio capabilities.

13. The one or more NTCRM of claim 12, wherein execution of the instructions is to cause the first UE to:
    determine the one or more desired radio level adaptations based on the one or more radio capabilities and based on detected radio conditions.

14. The one or more NTCRM of claim 13, wherein execution of the instructions is to cause the first UE to:
    detect the radio conditions local to the first UE, wherein the detected radio conditions are one or both of conditions of a radio link between the first UE and a first Radio Access Network (RAN) node and conditions of another radio link between the second UE and a second RAN node;
    generate a Radio Resource Control (RRC) message to indicate the one or more desired radio level adaptations based on the one or more radio capabilities and based on the detected radio conditions; and adjust a bitrate based on another RRC message received from the first RAN node.

15. The one or more NTCRM of claim 12, wherein, when the SDP offer message indicates support for an ANBR capability, execution of the instructions is to cause the first UE to:
   determine the one or more desired radio level adaptations based on the one or more radio capabilities and based on ANBR information obtained from a RAN node.

16. The one or more NTCRM of claim 15, wherein execution of the instructions is to cause the first UE to:
   receive a message from the RAN node, the message to include the ANBR information; and
   adapt a bitrate based on the ANBR information and based on whether the SDP answer message indicates support for the ANBR capability.

17. A user equipment (UE) comprising:
   memory circuitry to store program code of a Multimedia Telephony Service for Internet Protocol Multimedia Subsystem (MTSI) client in terminal; and
   processor circuitry coupled with the memory circuitry, the processor circuitry to operate the MTSI client in terminal to:
      identify one or more radio capabilities of a remote device based on a session description protocol (SDP) offer message obtained from the remote device, the one or more radio capabilities include an Access Network Bitrate Recommendation (ANBR) capability of the remote device,
      generate an SDP answer message to include a radio capabilities attribute, the radio capabilities attribute to indicate one or more radio capabilities of the UE, the one or more radio capabilities include an ANBR capability of the UE, and
      send the SDP answer message to the remote device.

18. The UE of claim 17, wherein the one or more radio capabilities of the remote device and the one or more radio capabilities of the UE include a Delay Budget Information (DBI) signaling capability.

19. The UE of claim 18, further comprising baseband circuitry communicatively coupled with the processor circuitry, the baseband circuitry to:
   adjust a bitrate based on the one or more radio capabilities of the remote device and the one or more radio capabilities of the UE.

* * * * *

UNITED STATES PATENT AND TRADEMARK OFFICE
CERTIFICATE OF CORRECTION

PATENT NO. : 11,140,581 B2  
APPLICATION NO. : 16/408360  
DATED : October 5, 2021  
INVENTOR(S) : Ozgur Oyman et al.

Page 1 of 1

It is certified that error appears in the above-identified patent and that said Letters Patent is hereby corrected as shown below:

In the Claims

Column 80  
Line 37, remove the first "the" after "claim 10, wherein" and before "the SDP offer".

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*